(12) United States Patent
Nogi et al.

(10) Patent No.: US 8,192,893 B2
(45) Date of Patent: Jun. 5, 2012

(54) MEMBRANE-MEMBRANE REINFORCING MEMBRANE ASSEMBLY, MEMBRANE-CATALYST LAYER ASSEMBLY, MEMBRANE-ELECTRODE ASSEMBLY, AND POLYMER ELECTROLYTE FUEL CELL

(75) Inventors: Atsushi Nogi, Osaka (JP); Takeou Okanishi, Osaka (JP); Yoichiro Tsuji, Osaka (JP); Aoi Muta, Osaka (JP); Haruhiko Shintani, Osaka (JP); Yasuo Takebe, Kyoto (JP)

(73) Assignee: Panasonic Corporation, Osaka (JP)

( * ) Notice: Subject to any disclaimer, the term of this patent is extended or adjusted under 35 U.S.C. 154(b) by 446 days.

(21) Appl. No.: 12/447,855

(22) PCT Filed: Nov. 6, 2007

(86) PCT No.: PCT/JP2007/071550
§ 371 (c)(1),
(2), (4) Date: Apr. 29, 2009

(87) PCT Pub. No.: WO2008/056661
PCT Pub. Date: May 15, 2008

(65) Prior Publication Data
US 2010/0068588 A1    Mar. 18, 2010

(30) Foreign Application Priority Data
Nov. 7, 2006  (JP) .................................. 2006-301140
Nov. 7, 2006  (JP) .................................. 2006-301834
Feb. 21, 2007  (JP) .................................. 2007-040737

(51) Int. Cl.
*H01M 8/10* (2006.01)
(52) U.S. Cl. .......................... 429/492; 429/480; 429/508
(58) Field of Classification Search .................. 429/479, 429/481, 484, 491–494
See application file for complete search history.

(56) References Cited

U.S. PATENT DOCUMENTS

| 2005/0181249 A1 | 8/2005 | Logan | |
| 2005/0181267 A1* | 8/2005 | Mitsuta et al. | 429/40 |
| 2005/0227132 A1 | 10/2005 | Hori et al. | |
| 2006/0046121 A1* | 3/2006 | Shimohira et al. | 429/30 |

FOREIGN PATENT DOCUMENTS
JP    62-005569    1/1987
(Continued)

*Primary Examiner* — Ula C Ruddock
*Assistant Examiner* — Scott J Chmielecki
(74) *Attorney, Agent, or Firm* — McDermott Will & Emery LLP

(57) ABSTRACT

A membrane-membrane reinforcing member assembly includes: a polymer electrolyte membrane (1) having a substantially square shape; a pair of membrane-like first membrane reinforcing members (10a) disposed on one main surface of the polymer electrolyte membrane (1) so as to extend along a pair of opposed sides, respectively, of four sides of said one main surface; and a pair of membrane-like second membrane reinforcing members (10b) disposed on another main surface of the polymer electrolyte membrane (1) so as to extend along a pair of opposed sides, respectively, of four sides of said another main surface, wherein: portions of the polymer electrolyte membrane (1) at which portions the first membrane reinforcing members (10a, 10a) and the second membrane reinforcing members (10b, 10b) are disposed are concave; and the first membrane reinforcing members (10a, 10a) and the second membrane reinforcing members (10b, 10b) are disposed such that main surfaces thereof are exposed, and the first membrane reinforcing members (10a, 10a) and the second membrane reinforcing members (10b, 10b) surround a peripheral portion of the polymer electrolyte membrane (1) as a whole.

15 Claims, 44 Drawing Sheets

FOREIGN PATENT DOCUMENTS

| | | |
|---|---|---|
| JP | 05-021077 | 1/1993 |
| JP | 05-242897 | 9/1993 |
| JP | 07-220742 | 8/1995 |
| JP | 08-259710 | 10/1996 |
| JP | 10-154521 | 6/1998 |
| JP | 2001-236971 | 8/2001 |
| JP | 2003-082488 | 3/2003 |
| JP | 2006-338938 | 12/2006 |
| WO | WO 99/26304 | 5/1999 |
| WO | WO 2005/081343 A1 | 9/2005 |
| WO | WO 2005/086264 A1 | 9/2005 |
| WO | WO 2006/025335 A1 | 3/2006 |
| WO | WO 2006/137203 A1 | 12/2006 |
| WO | WO 2007/032442 A1 | 3/2007 |

* cited by examiner

MEMBRANE-MEMBRANE REINFORCING MEMBRANE ASSEMBLY, MEMBRANE-CATALYST LAYER ASSEMBLY, MEMBRANE-ELECTRODE ASSEMBLY, AND POLYMER ELECTROLYTE FUEL CELL

RELATED APPLICATIONS

This application is the U.S. National Phase under 35 U.S.C. §371 of International Application No. PCT/JP2007/071550, filed on Nov. 6, 2007, which in turn claims the benefit of Japanese Application Nos. 2006-301140, 2006-301834 and 2007-040737, filed on Nov. 7, 2006, Nov. 7, 2006, and Feb. 21, 2007 respectively, the disclosures of which Applications are incorporated by references herein.

TECHNICAL FIELD

The present invention relates to a membrane-membrane reinforcing membrane assembly, a membrane-catalyst layer assembly, a membrane-electrode assembly, and a polymer electrolyte fuel cell, and particularly to a configuration of the membrane-membrane reinforcing membrane assembly.

BACKGROUND ART

A fuel cell is configured to electrochemically react a hydrogen-containing fuel gas obtained by reforming a material gas, such as a city gas, with an oxygen-containing oxidizing gas, such as air, to generate electric power and heat at the same time. A unit cell (cell) of the fuel cell includes an MEA (Membrane-Electrode-Assembly) constituted by a polymer electrolyte membrane and a pair of gas diffusion electrodes, gaskets, and electrically-conductive separators. A groove-like gas channel which allows the fuel gas or the oxidizing gas (each of these is referred to as a "reactant gas") to flow therethrough is formed on a main surface of each separator which surface contacts the gas diffusion electrode. Then, the gaskets are disposed around a peripheral portion of the MEA, and a pair of separators sandwich the MEA. Thus, the cell is configured.

Known as a method for manufacturing such cell of the fuel cell is a method for manufacturing the polymer electrolyte fuel cell which is improved in assembling (see Patent Document 1 for example).

FIG. 15 is a schematic diagram showing an outline of a step (a catalyst layer applying step 310 and a diffusion layer integrating step 320) of manufacturing the cell disclosed in Patent Document 1.

As shown in FIG. 15, in the catalyst layer applying step 310 in this fuel cell manufacturing method, catalyst layers 331 are formed on a polymer electrolyte membrane 330, and a catalyst layer-polymer electrolyte assembly 332 is integrated using hot rolls 380. Then, in the diffusion layer integrating step 320 in this fuel cell manufacturing method, diffusion layers 333 are disposed on both surfaces, respectively, of the catalyst layer-polymer electrolyte assembly 332, and the diffusion layers are joined to the catalyst layer-polymer electrolyte assembly 332 by hot rolls 390. With this, an operation of assembling the cell is simplified.

A common fuel cell is a so-called stack-type fuel cell in which the cells are stacked and fastened, and adjacent MEAs are electrically connected to each other in series. When manufacturing a cell stack, the stacked cells are sandwiched between end plates, and the end plates and the cells are fastened by fasteners. Therefore, the polymer electrolyte membrane has to have an adequate strength in order to endure pressure of the fastening and to avoid physical damages caused by, for example, abrasion in long-term use.

To such needs, known is a seal structure of a solid polymer electrolyte fuel cell in which a frame-shaped protective membrane is attached to the polymer electrolyte membrane (see Patent Document 2 for example).

FIG. 16 is a schematic diagram showing an outline of the seal structure of the solid polymer electrolyte fuel cell disclosed in Patent Document 2.

As shown in FIG. 16, a frame-shaped protective membrane 220 formed by a fluorocarbon resin-based sheet is disposed on a main surface of the solid polymer electrolyte membrane 210 such that an inner peripheral portion thereof is covered with an electrode 213. In addition, a gas sealing member 212 is disposed to surround the electrode 213 such that a gap 214 is formed between the gas sealing member 212 and the electrode 213. With this, since the protective membrane 220 is sandwiched between the gas sealing member 212 and the solid polymer electrolyte membrane 210 and between the electrode 213 and the solid polymer electrolyte membrane 210, and the protective membrane 220 reinforces the solid polymer electrolyte membrane 210 at the gap 214, it is possible to prevent the solid polymer electrolyte membrane 210 from being damaged without increasing the thickness of the solid polymer electrolyte membrane 210.

Patent Document 1: Japanese Laid-Open Patent Application Publication 2001-236971
Patent Document 2: Japanese Laid-Open Patent Application Publication Hei 5-21077

DISCLOSURE OF THE INVENTION

Problems to be Solved by the Invention

The seal structure of the solid polymer electrolyte fuel cell disclosed in Patent Document 2 is based on the premise that the MEA is manufactured by so-called batch, i.e., the frame-shaped protective membrane 220 is preformed, and the solid polymer electrolyte membrane 210, the protective membrane 220, and the electrode 214 are integrated with one another. Therefore, in the case of further reducing the cost and further improving the productivity (achieving effective mass production) by the fuel cell manufacturing method disclosed in Patent Document 1, there is still room for improvement.

The present invention was made to solve the above problems, and an object of the present invention is to provide a membrane-catalyst layer assembly, a membrane-electrode assembly, and a polymer electrolyte fuel cell, each capable of securing adequate durability and each having a configuration suitable for reduction in cost and mass production of the fuel cell.

Means for Solving the Problems

In order to solve the above problems, a membrane-membrane reinforcing member assembly according to the present invention includes: a polymer electrolyte membrane having a substantially square shape; a pair of membrane-like first membrane reinforcing members disposed on one main surface of the polymer electrolyte membrane so as to extend along a pair of opposed sides, respectively, of four sides of the above-described one main surface; and a pair of membrane-like second membrane reinforcing members disposed on another main surface of the polymer electrolyte membrane so as to extend along a pair of opposed sides, respectively, of four sides of the above-described another main surface, wherein: portions of the polymer electrolyte membrane at which portions the first membrane reinforcing members and the second membrane reinforcing members are disposed are concave; and the first membrane reinforcing members and the second membrane reinforcing members are disposed such that main surfaces thereof are exposed, and the first membrane reinforcing members and the second membrane reinforcing members surround a peripheral portion of the polymer electrolyte membrane as a whole.

As described above, in the membrane-membrane reinforcing member assembly according to the present invention, the first membrane reinforcing members are disposed to extend along a pair of opposed sides of four sides of the main surface of the polymer electrolyte membrane, and the second membrane reinforcing members are disposed to extend along a pair of opposed sides of four sides of the main surface of the polymer electrolyte membrane. Therefore, a method for manufacturing the cell disclosed in Patent Document 1, that is, a method for stacking the tape-shape membrane reinforcing member on the polymer electrolyte membrane to manufacture a roll formed by a stack body of the polymer electrolyte membrane and the membrane reinforcing member can be easily applied to the membrane-membrane reinforcing member assembly according to the present invention. Moreover, the membrane-membrane reinforcing member assembly according to the present invention can reduce the material cost more than the polymer electrolyte fuel cell disclosed in Patent Document 2 in which the protective membrane 220 is disposed on the entire peripheral portion of the main surface of the polymer electrolyte membrane 210 as shown in FIG. 16.

Moreover, in the membrane-membrane reinforcing member assembly according to the present invention, the first membrane reinforcing members and the second membrane reinforcing members may be disposed to sandwich four corner portions of the polymer electrolyte membrane.

Moreover, in the membrane-membrane reinforcing member assembly according to the present invention, the first membrane reinforcing members and the second membrane reinforcing members may be disposed on the peripheral portion of the polymer electrolyte membrane so as not to overlap each other when viewed from a thickness direction of the polymer electrolyte membrane as a whole, and the polymer electrolyte membrane may be bent in a step shape such that the exposed main surfaces of the first membrane reinforcing members and a portion of the above-described one main surface of the polymer electrolyte membrane which portion is located between the first membrane reinforcing members are located on a substantially same flat plane.

With this, the pressure applied to a portion of one main surface of the polymer electrolyte membrane of the membrane-membrane reinforcing member assembly which portion is located between the first membrane reinforcing members and the pressure applied to the exposed main surfaces of the membrane-membrane reinforcing members when fastening the fuel cell can be equalized. Moreover, since the pressures can be equalized, the damage of the membrane-membrane reinforcing member can be reduced.

Moreover, in the membrane-membrane reinforcing member assembly according to the present invention, the first membrane reinforcing members may be disposed to extend along the pair of opposed sides, respectively, over entire lengths of the pair of opposed sides.

Moreover, in the membrane-membrane reinforcing member assembly according to the present invention, the second membrane reinforcing members may be disposed such that both ends of each of the second membrane reinforcing members contact step portions, respectively, of the polymer electrolyte membrane.

Moreover, in the membrane-membrane reinforcing member assembly according to the present invention, each of the second membrane reinforcing members may have such a thickness that the main surface of the second membrane reinforcing member which surface is opposite to a main surface contacting the polymer electrolyte membrane and portions of the above-described another main surface of the polymer electrolyte membrane which portions are located outside both ends of the second membrane reinforcing member are located on a substantially same flat plane.

Moreover, in the membrane-membrane reinforcing member assembly according to the present invention, the first membrane reinforcing members may be disposed on the polymer electrolyte membrane such that exposed main surfaces thereof are located on a substantially same flat plane as the above-described one main surface of the polymer electrolyte membrane, and the second membrane reinforcing members may be disposed on the polymer electrolyte membrane such that exposed main surfaces thereof are located on a substantially same flat plane as the above-described another main surface of the polymer electrolyte membrane.

With this, the pressure applied to a portion of one main surface of the polymer electrolyte membrane of the membrane-membrane reinforcing member assembly which portion is located between the first membrane reinforcing members and the exposed main surfaces of the first membrane-membrane reinforcing members and the pressure applied to a portion of another main surface of the polymer electrolyte membrane which portion is located between the second membrane reinforcing members and the exposed main surfaces of the second membrane-membrane reinforcing members when fastening the fuel cell can be further equalized. Moreover, since the pressures applied to both main surfaces of the membrane-membrane reinforcing member assembly can be further equalized, the damage of the membrane-membrane reinforcing member can be reduced.

Moreover, in the membrane-membrane reinforcing member assembly according to the present invention, lap portions may be formed at both end portions, respectively, of each of the first membrane reinforcing members and the second membrane reinforcing members, and the lap portions of the first membrane reinforcing members and the lap portions of the second membrane reinforcing members may be joined to each other in a lap joint so as to sandwich four corner portions of the polymer electrolyte membrane.

Moreover, in the membrane-membrane reinforcing member assembly according to the present invention, the lap portions of the first membrane reinforcing members and the lap portions of the second membrane reinforcing members may be joined to each other in the lap joint by causing the polymer electrolyte membrane to be bent in a step shape such that the main surfaces of the first membrane reinforcing members which surfaces are opposite to main surfaces contacting the polymer electrolyte membrane and at least a portion of the above-described one main surface of the polymer electrolyte membrane which portion overlaps portions of the second membrane reinforcing members other than the lap portions of the second membrane reinforcing members are located on a substantially same flat plane.

Moreover, in the membrane-membrane reinforcing member assembly according to the present invention, the first membrane reinforcing members may be disposed to extend along the pair of opposed sides, respectively, over entire lengths of the pair of opposed sides, and the second membrane reinforcing members may be disposed to extend along the pair of opposed sides, respectively, over entire lengths of the pair of opposed sides.

Moreover, in the membrane-membrane reinforcing member assembly according to the present invention, the lap portions of the first membrane reinforcing members and the lap portions of the second membrane reinforcing members may be joined to each other in the lap joint by causing the polymer electrolyte membrane to be bent in a step shape such that the main surfaces of the second membrane reinforcing members which surfaces are opposite to main surfaces contacting the polymer electrolyte membrane and at least a portion of the above-described another main surface of the polymer electrolyte membrane which portion overlaps portions of the first membrane reinforcing members other than the lap portions of the first membrane reinforcing members are located on a substantially same flat plane.

Further, in the membrane-membrane reinforcing member assembly according to the present invention, the polymer electrolyte membrane may include an inner reinforcing membrane having therein a through hole that serves as an ion conduction path.

With this, the mechanical strength of the polymer electrolyte membrane can be improved as a whole. Moreover, even if the polymer electrolyte membrane is damaged, the cross leakage of the reactant gas can be surely prevented by the inner reinforcing membrane.

Moreover, a membrane-catalyst layer assembly according to the present invention includes: the membrane-membrane reinforcing member assembly; a first catalyst layer disposed to cover the above-described one main surface of the polymer electrolyte membrane; and a second catalyst layer disposed to cover the above-described another main surface of the polymer electrolyte membrane, wherein: the first catalyst layer is disposed to cover a part of each of the exposed main surfaces of the first membrane reinforcing members and a portion of the above-described one main surface of the polymer electrolyte membrane which portion is located between the first membrane reinforcing members; and the second catalyst layer is disposed to cover a part of each of the exposed main surfaces of the second membrane reinforcing members and a portion of the above-described another main surface of the polymer electrolyte membrane which portion is located between the second membrane reinforcing members.

As described above, in the membrane-catalyst layer assembly according to the present invention, the end portion of the catalyst layer, to which the pressure is most strongly applied when fastening the fuel cell, of the polymer electrolyte membrane contacts the membrane reinforcing member (the membrane reinforcing member covers the end portion of the catalyst layer). Therefore, the damage of the polymer electrolyte membrane can be prevented. Moreover, even if a portion contacting the end portion of the catalyst layer is damaged on one main surface of the polymer electrolyte membrane, the cross leakage of the reactant gas can be prevented since the membrane reinforcing member is disposed on a portion of another main surface which portion corresponds to the damaged portion.

As above, the membrane-catalyst layer assembly according to the present invention can easily further reduce the cost and further improve the productivity while securing adequate durability.

Moreover, in the membrane-catalyst layer assembly according to the present invention, it is preferable that a first catalyst layer and a second catalyst layer be disposed such that peripheral portions thereof overlap the first membrane reinforcing members and the second membrane reinforcing members over entire peripheries of the first catalyst layer and the second catalyst layer when viewed from a thickness direction of the polymer electrolyte membrane.

Moreover, a membrane-electrode assembly according to the present invention includes: the membrane-catalyst layer assembly; a first gas diffusion layer disposed to cover the first catalyst layer of the membrane-catalyst layer assembly; and a second gas diffusion layer disposed to cover the second catalyst layer of the membrane-catalyst layer assembly.

Moreover, a polymer electrolyte fuel cell according to the present invention includes the membrane-electrode assembly.

With this, since the fuel cell according to the present invention includes the membrane-membrane reinforcing member assembly according to the present invention, it can easily further reduce the cost and further improve the productivity.

The above object, other objects, features and advantages of the present invention will be made clear by the following detailed explanation of preferred embodiments with reference to the attached drawings.

Effects of the Invention

In accordance with the membrane-membrane reinforcing member assembly, the membrane-catalyst layer assembly, the membrane-electrode assembly, and the polymer electrolyte fuel cell of the present invention, it is possible to provide the membrane-membrane reinforcing member assembly, the membrane-catalyst layer assembly, the membrane-electrode assembly, and the polymer electrolyte fuel cell, each capable of securing adequate durability and each suitable for reduction in cost and mass production.

Figure 1:
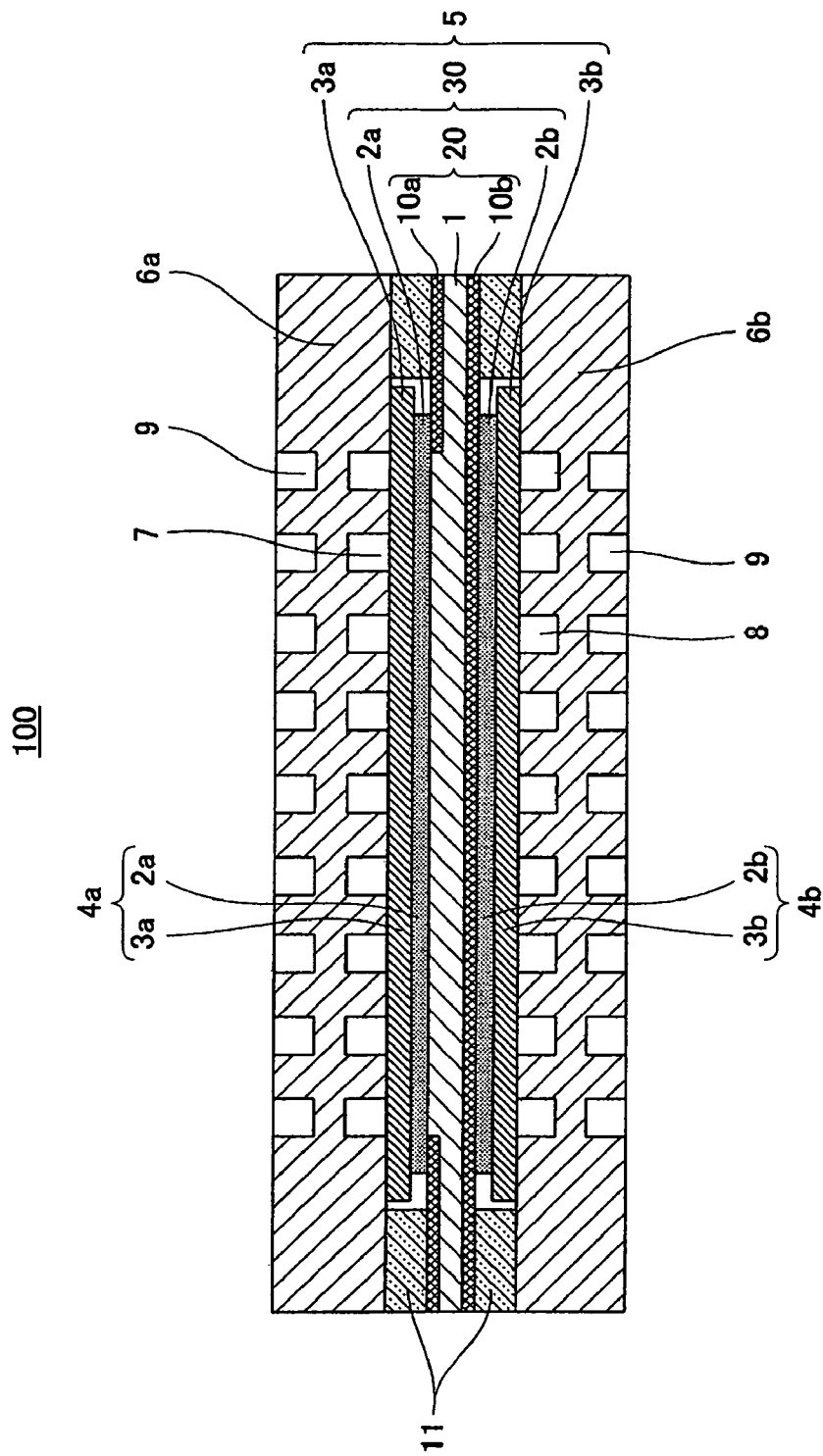
FIG. 1 is a schematic diagram showing a schematic configuration of a cell of a polymer electrolyte fuel cell according to Embodiment 1 of the present invention.

EXPLANATION OF REFERENCE NUMBERS 1 polymer electrolyte membrane
1a first concave portion
1b second concave portion
2 catalyst layer
2a anode catalyst layer
2b cathode catalyst layer
3 gas diffusion layer
3a anode gas diffusion layer
3b cathode gas diffusion layer
4 electrode
4a anode
4b cathode
5 MEA (membrane-electrode assembly)
6a anode separator
6b cathode separator
7 fuel gas channel
8 oxidizing gas channel
9 heat medium channel
10a first membrane reinforcing member
10b second membrane reinforcing member
11 gasket
12 step portion 15 polymer electrolyte membrane-inner reinforcing membrane complex
  15a polymer electrolyte membrane
  15b polymer electrolyte membrane
  15c inner reinforcing membrane
16 opening
17 cutout portion
18 lap portion
19 gap
20 membrane-membrane reinforcing member assembly
30 membrane-catalyst layer assembly
40 polymer electrolyte membrane roll
41a polymer electrolyte membrane sheet
41b cast membrane
41c polymer electrolyte membrane sheet
42 membrane-membrane reinforcing member stack body
43 concave portion
44 polymer electrolyte solution (coating liquid)
45 blade
46 membrane-membrane reinforcing member sheet
47 mask
48 opening
49 catalyst layer forming device
50 membrane-catalyst layer sheet
51 base material-polymer electrolyte membrane sheet
60 membrane reinforcing member roll
60a membrane reinforcing member roll
60b membrane reinforcing member roll
61 membrane reinforcing member tape
61a first membrane reinforcing member tape
61b first membrane reinforcing member tape
62 membrane-membrane reinforcing member assembly roll
63a base material tape
63b base material tape
64a membrane reinforcing member tape
64b membrane reinforcing member tape
65a base material-membrane reinforcing member stack body
65b base material-membrane reinforcing member stack body
66a base material-membrane reinforcing member roll
66b base material-membrane reinforcing member roll
67 membrane reinforcing member assembly
68 base material-membrane reinforcing member assembly tape
69 membrane reinforcing member roll
70 second membrane reinforcing member tape
74 base material tape
75 base material tape
76 base material-membrane reinforcing member stack body
76a base material-membrane reinforcing member stack body
76b base material-membrane reinforcing member stack body
77 base material-membrane reinforcing member roll
77b base material-membrane reinforcing member roll
80 roller
81 roller
82 roller
83 roller
84 base material sheet
85 base material-membrane reinforcing member roll
86 base material-membrane reinforcing member assembly sheet
90 concave portion
91 concave portion
92 rotating roll
93 applicator roll
94 liquid dam portion
95 roll knife coater
96 roll knife
96a knife portion
97 cutout portion
97a side surface
98 concave portion
100 cell
210 solid polymer electrolyte membrane
212 gasket
213 electrode
214 gap portion
220 protective membrane
222 opening
250 protective membrane
252 protective membrane roll
260 solid polymer electrolyte membrane
262 polymer electrolyte membrane roll
280 membrane-protective membrane roll
290 roll
310 catalyst layer applying step
320 diffusion layer integrating step
330 polymer electrolyte membrane
331 catalyst layer
332 catalyst layer-polymer electrolyte assembly
333 diffusion layer
380 hot roll
390 hot roll
D1 proceeding direction
D10 proceeding direction
E1 side
E2 side
E3 side
E4 side
F1 main surface
F2 main surface
P1 bonding step
P2 heat treatment step
P3 thermocompression bonding step
P4 coating step
P5 cutting step
P12 second step
P13 third step
P14 fourth step
P15 fifth step
P16 sixth step
R200 portion

BEST MODE FOR CARRYING OUT THE INVENTION

Hereinafter, preferred embodiments of the present invention will be explained in reference to the drawings. In all the drawings, same reference numbers are used for same or corresponding members, and a repetition of the same explanation may be avoided.

Embodiment 1

FIG. 1 is a cross-sectional view schematically showing a schematic configuration of a cell of a polymer electrolyte fuel cell (hereinafter referred to as "PEFC") according to Embodiment 1 of the present invention.

As shown in FIG. 1, a cell 100 of the PEFC according to Embodiment 1 includes an MEA (Membrane-Electrode-Assembly) 5, a first membrane reinforcing member 10a, a second membrane reinforcing member 10b, gaskets 11, an anode separator 6a, and a cathode separator 6b. The MEA 5 includes: a polymer electrolyte membrane 1 which selectively transports hydrogen ions; an anode 4a including an anode catalyst layer (first catalyst layer) 2a and an anode gas diffusion layer (first gas diffusion layer) 3a; and a cathode 4b including a cathode catalyst layer (second catalyst layer) 2b and a cathode gas diffusion layer (second gas diffusion layer) 3b. Herein, an assembly including the polymer electrolyte membrane 1, the first membrane reinforcing member 10a, and the second membrane reinforcing member 10b is referred to as a membrane-membrane reinforcing member assembly 20, and an assembly including the membrane-membrane reinforcing member assembly 20, the anode catalyst layer 2a, and the cathode catalyst layer 2b is referred to as a membrane-catalyst layer assembly 30.

First, the polymer electrolyte membrane 1 and the membrane-membrane reinforcing member assembly 20 will be explained.

Figure 2:
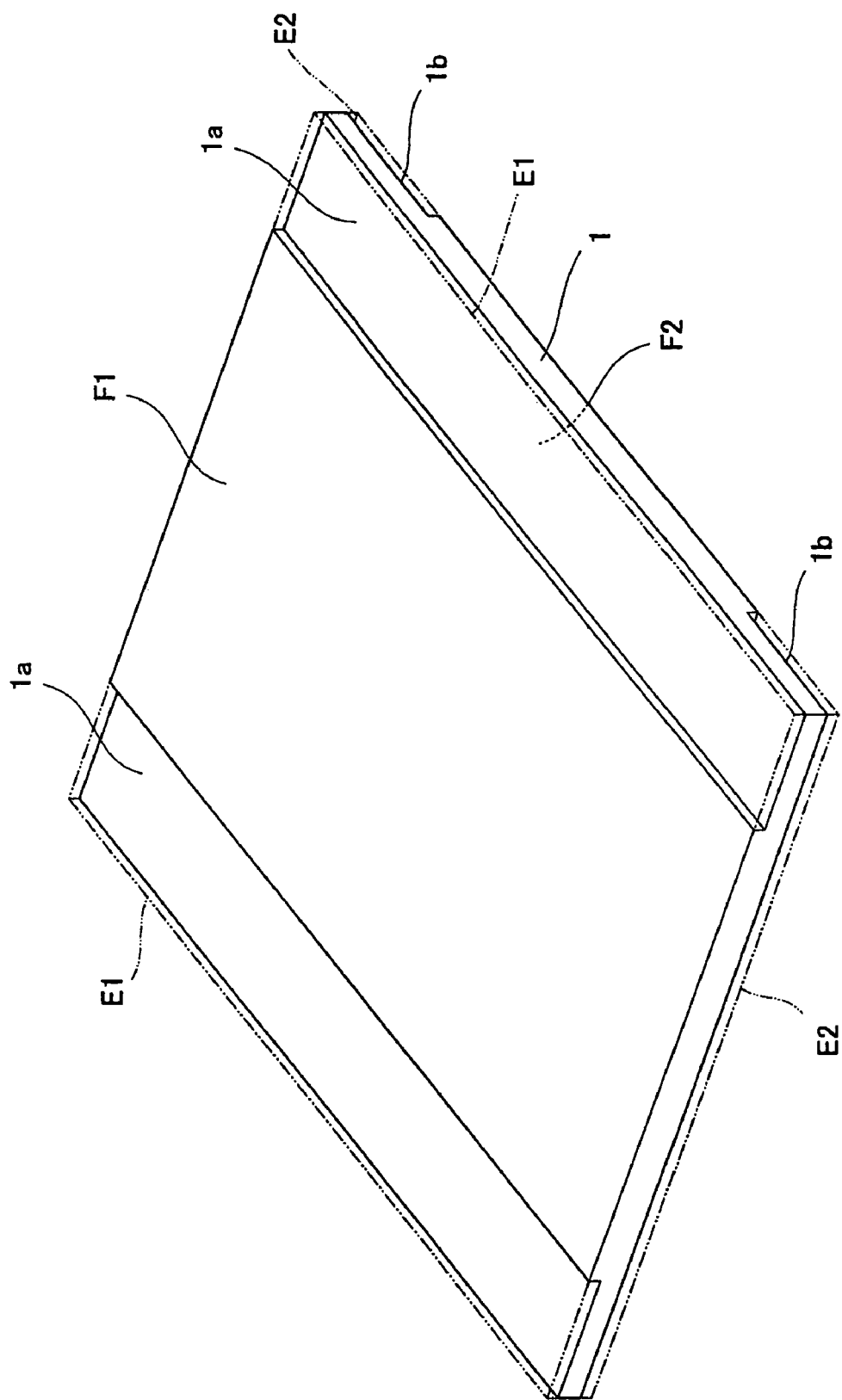
FIG. 2 is a perspective view schematically showing a schematic configuration of a polymer electrolyte membrane in the cell of the polymer electrolyte fuel cell shown in FIG. 1.
Figure 3:
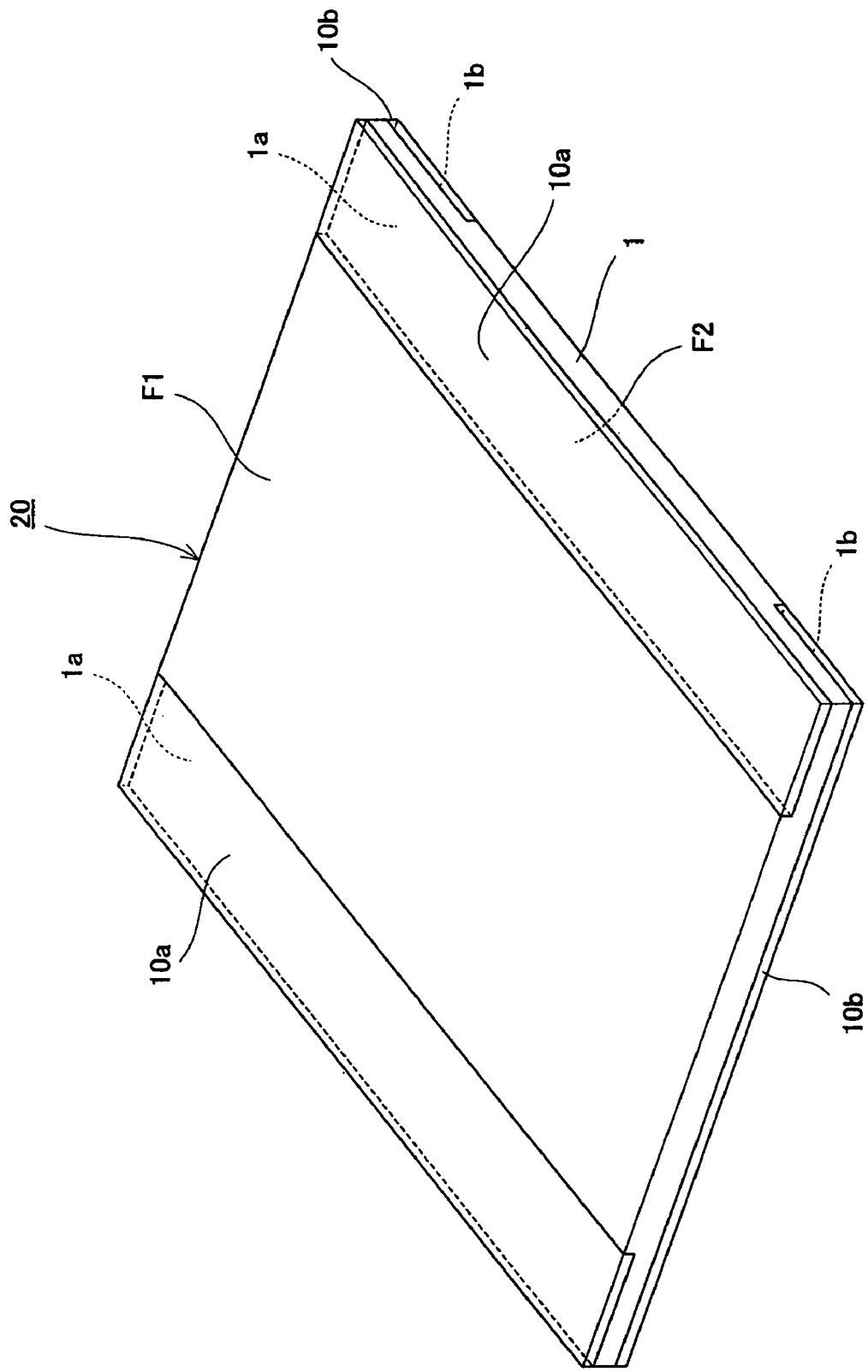
FIG. 3 is a perspective view schematically showing a state where membrane reinforcing members are disposed on the polymer electrolyte membrane shown in FIG. 2 (i.e., showing a membrane-membrane reinforcing member assembly).

FIG. 2 is a perspective view schematically showing a schematic configuration of the polymer electrolyte membrane 1 in the cell 100 of the PEFC shown in FIG. 1. FIG. 3 is a perspective view schematically showing a state where the first membrane reinforcing member 10a and the second membrane reinforcing member 10b are disposed on the polymer electrolyte membrane 1 shown in FIG. 2 (i.e., showing the membrane-membrane reinforcing member assembly 20).

As shown in FIG. 2, the polymer electrolyte membrane 1 has a substantially square (herein, rectangular) shape, and a pair of first concave portions 1a and a pair of second concave portions 1b are formed at an edge portion of the polymer electrolyte membrane 1 (a peripheral portion of the polymer electrolyte membrane 1 is concave). Specifically, a pair of first concave portions 1a are formed to extend along a pair of opposed sides E1, respectively, of one main surface F1 of the polymer electrolyte membrane 1 over the entire lengths of the sides E1. Moreover, a pair of second concave portions 1b are formed to extend along a pair of opposed sides E2, respectively, of another main surface F2 of the polymer electrolyte membrane 1 over the entire lengths of the sides E2.

As shown in FIG. 3, the first membrane reinforcing members 10a each of which has a strip shape and a film shape are disposed to be fittingly accommodated in the first concave portions 1a, respectively, of the polymer electrolyte membrane 1. In other words, the first membrane reinforcing members 10a are embedded in the polymer electrolyte membrane 1 such that main surfaces thereof are exposed. Moreover, the second membrane reinforcing members 10b each of which has a strip shape and a film shape are disposed to be fittingly accommodated in the second concave portions 1b, respectively, of the polymer electrolyte membrane 1. In other words, the second membrane reinforcing members 10b are embedded in the polymer electrolyte membrane 1 such that main surfaces thereof are exposed. The first membrane reinforcing members 10a and the second membrane reinforcing members 10b are disposed on the main surface F1 and the main surface F2, respectively, so as to alternately exist. Moreover, the first membrane reinforcing members 10a and the second membrane reinforcing members 10b are disposed to extend along four sides, respectively, of the polymer electrolyte membrane 1 and sandwich four corner portions of the polymer electrolyte membrane 1 as a whole (this state is hereinafter referred to as "parallel-cross manner"). Moreover, the first membrane reinforcing members 10a are disposed such that main surfaces thereof are flush with the main surface F1 of the polymer electrolyte membrane 1 (such that main surfaces thereof are located on the same flat plane as the main surface F1 of the polymer electrolyte membrane 1). Moreover, the second membrane reinforcing members 10b are disposed such that main surfaces thereof are flush with the main surface F2 of the polymer electrolyte membrane 1 (such that main surfaces thereof are located on the same flat plane as the main surface F2 of the polymer electrolyte membrane 1).

Here, being flush with each other denotes being located on a substantially same flat plane, i.e., denotes that the depth of each of the first and second concave portions 1a and 1b of the polymer electrolyte membrane 1 is substantially the same as the height of each of the first and second membrane reinforcing members 10a and 10b.

With this, the pressures applied to the main surfaces of the first membrane reinforcing members 10a and the pressure applied to the main surface F1 of the polymer electrolyte membrane 1 when fastening the fuel cell (cell stack) can be equalized, and the pressures applied to the main surfaces of the second membrane reinforcing members 10b and the pressure applied to the main surface F2 of the polymer electrolyte membrane 1 can be equalized.

The thickness and width of each of the first membrane reinforcing members 10a disposed in the first concave portions 1a and the thickness and width of each of the second membrane reinforcing members 10b disposed in the second concave portions 1b are not especially limited as long as the effects of the present invention can be obtained. However, in order to surely obtain the effects of the present invention, it is preferable that the thickness and width of the first membrane reinforcing member 10a and the thickness and width of the second membrane reinforcing member 10b be the same as each other.

Next, respective components of the membrane-membrane reinforcing member assembly 20 will be explained.

The polymer electrolyte membrane 1 has proton conductivity. It is preferable that the polymer electrolyte membrane 1 contain a sulfonic acid group, a carboxylic acid group, a phosphonic acid group, or a sulfonimide group as a positive ion exchange group. In light of the proton conductivity, it is especially preferable that the polymer electrolyte membrane 1 contain the sulfonic acid group.

As resin which constitutes the polymer electrolyte membrane 1 and contains the sulfonic acid group, dry resin having the ion exchange capacity of 0.5 to 1.5 meq/g is preferable. It is preferable that the ion exchange capacity of the dry resin constituting the polymer electrolyte membrane 1 be 0.5 meq/g or more, since the increase in the resistance value of the polymer electrolyte membrane 1 at the time of power generation can be adequately decreased, and it is preferable that the ion exchange capacity of the dry resin be 1.5 meq/g or less, since the water content of the polymer electrolyte membrane 1 does not increase, the polymer electrolyte membrane 1 hardly swell, and fine holes of the below-described catalyst layer 2 do not clog. From the same view point as above, it is more preferable that the ion exchange capacity of the dry resin be 0.8 to 1.2 meq/g.

It is preferable that the polymer electrolyte be a copolymer containing a polymerization unit based on a perfluorovinyl compound expressed by $CF_2=CF-(OCF_2CFX)_m-O_p-(CF_2)_n-SO_3H$ (m is an integer from 0 to 3, n is an integer from 1 to 12, p is 0 or 1, and X is a fluorine atom or a trifluoromethyl group), and a polymerization unit based on tetrafluoroethylene.

Preferable examples of the above fluorovinyl compound are compounds expressed by Formulas (4) to (6) below. In the following formulas, q is an integer from 1 to 8, r is an integer from 1 to 8, and t is an integer from 1 to 3.

$$CF_2=CFO(CF_2)_q—SO_3H \quad (4)$$

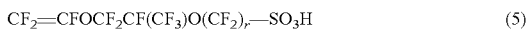

$$CF_2=CFOCF_2CF(CF_3)O(CF_2)_r—SO_3H \quad (5)$$

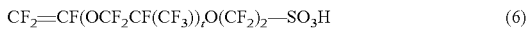

$$CF_2=CF(OCF_2CF(CF_3))_tO(CF_2)_2—SO_3H \quad (6)$$

Moreover, it is preferable that a constituent material of each of the first membrane reinforcing members 10a and the second membrane reinforcing members 10b be synthetic resin having bendability and flexibility such that each of the first membrane reinforcing members 10a and the second membrane reinforcing members 10b can be rolled at the time of manufacturing and can be unrolled to return to an original shape.

Further, in light of the durability, the above synthetic resin be synthetic resin made of at least one resin selected from the group consisting of polyethylene naphthalate, polytetrafluoroethylene, polyethylene terephthalate, fluoroethylene-propylene copolymer, tetrafluoroethylene-perfluoro alkoxy ethylene copolymer, polyethylene, polypropylene, polyether amide, polyether imide, polyether ether ketone, polyether sulfone, polyphenylene sulfide, polyarylate, polysulfide, polyimide, and polyimide amide.

Next, the membrane-catalyst layer assembly 30 will be explained.

Figure 4A:
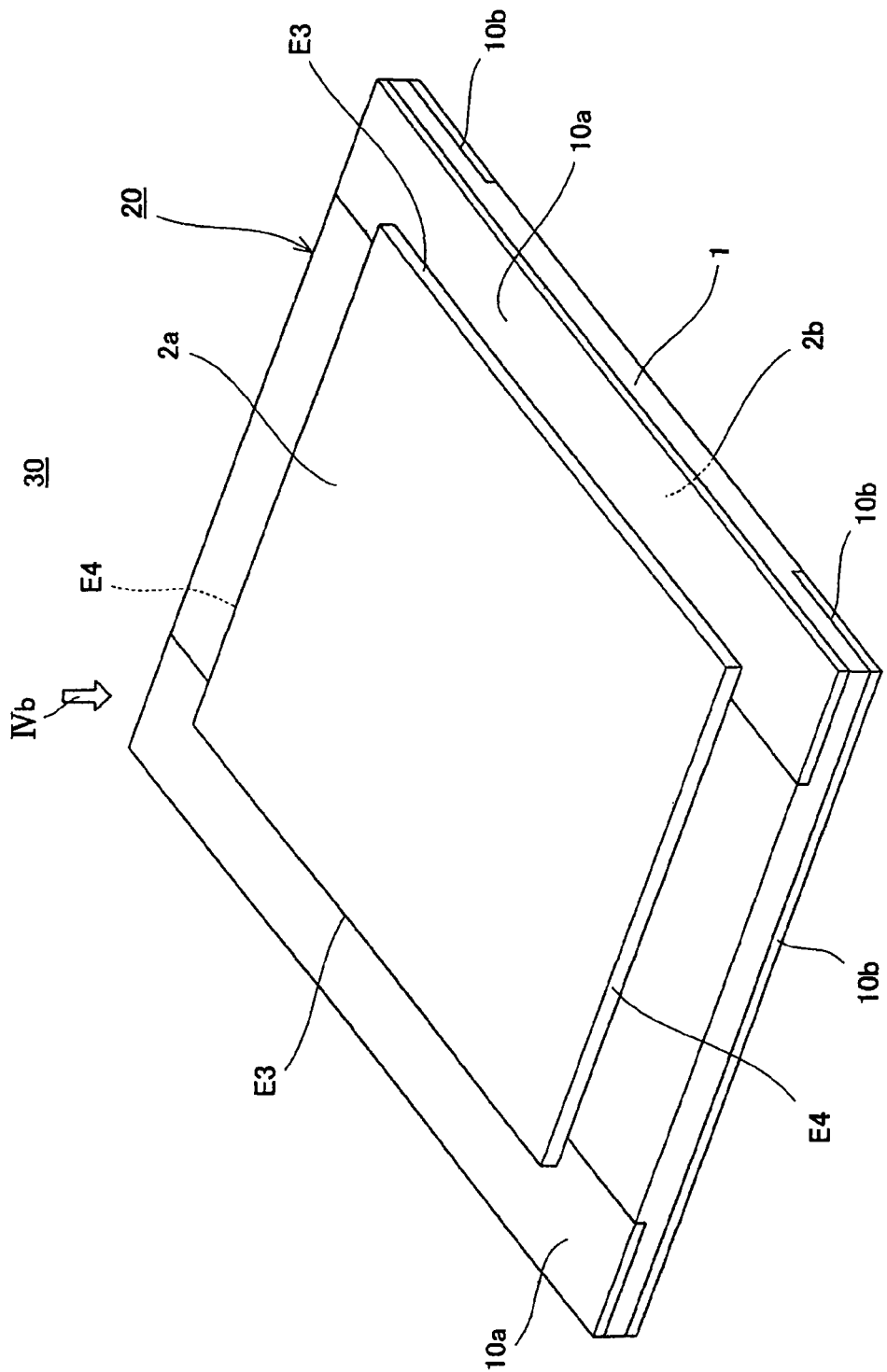
FIG. 4(a) is a schematic diagram showing a schematic configuration of a membrane-catalyst layer assembly in the cell of the polymer electrolyte fuel cell shown in FIG. 1.
Figure 4B:
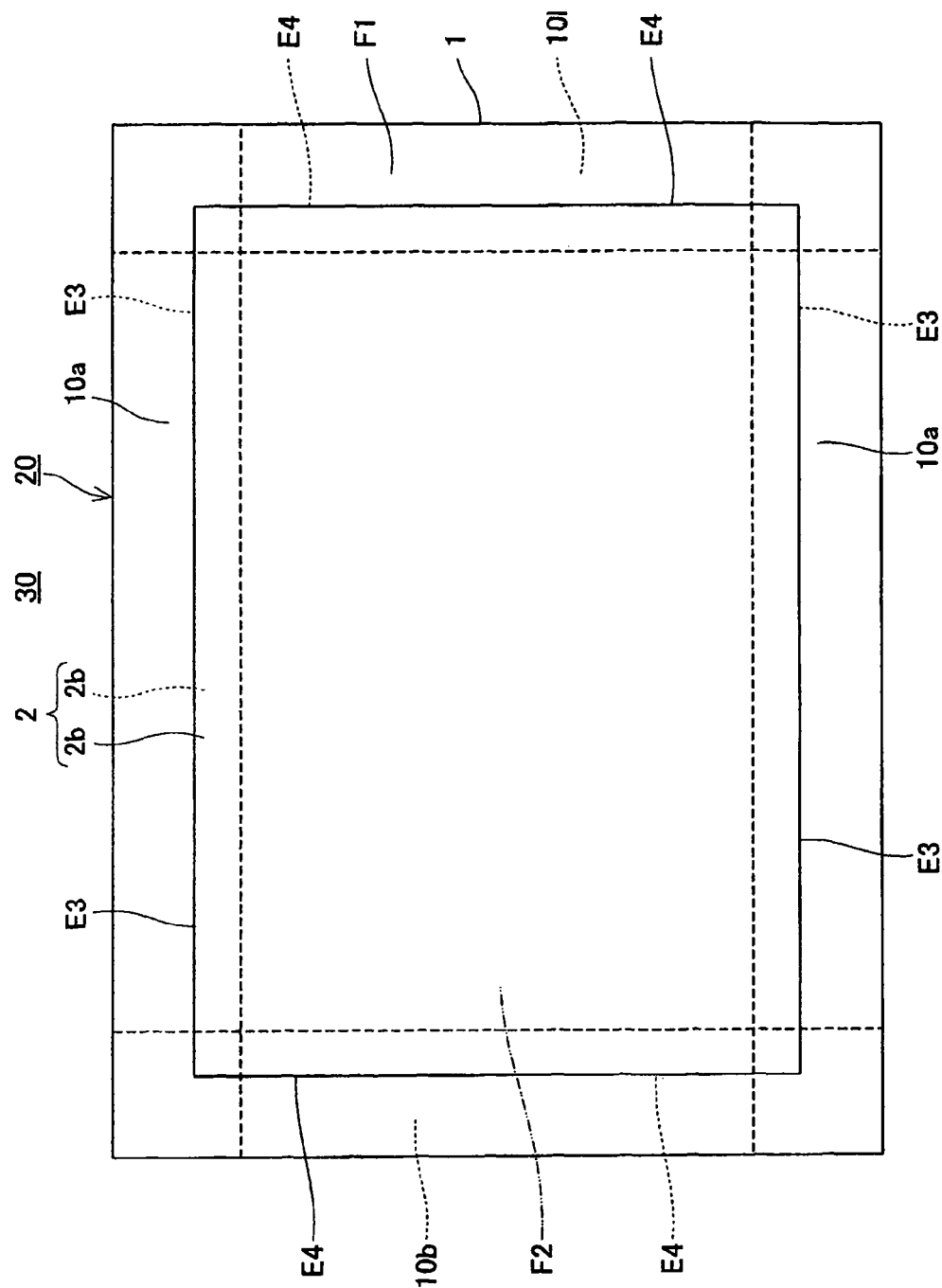
FIG. 4(b) is a schematic diagram when viewed from a direction indicated by an arrow IVb shown in FIG. 4(a).

FIG. 4(a) is a perspective view schematically showing a schematic configuration of the membrane-catalyst layer assembly 30 in the cell 100 of the PEFC shown in FIG. 1. FIG. 4(b) is a schematic diagram when viewed from a direction indicated by an arrow IVb shown in FIG. 4(a).

As shown in FIG. 4(a), the membrane-catalyst layer assembly 30 includes the membrane-membrane reinforcing member assembly 20 and the catalyst layer 2 (the anode catalyst layer 2a or the cathode catalyst layer 2b). The anode catalyst layer 2a is disposed to cover a portion of the main surface F1 of the polymer electrolyte membrane 1 which portion is located between the first membrane reinforcing members 10a, and the exposed main surfaces of the first membrane reinforcing members 10a. Moreover, the cathode catalyst layer 2b is disposed to cover a portion of the main surface F2 of the polymer electrolyte membrane 1 which portion is located between the second membrane reinforcing members 10b, and the exposed main surfaces of the second membrane reinforcing members 10b (see FIG. 4(b)). As shown in FIG. 4(b), herein, each of the anode catalyst layer 2a and the cathode catalyst layer 2b is formed in the same rectangular shape as the polymer electrolyte membrane 1. In addition, the anode catalyst layer 2a and the cathode catalyst layer 2b are disposed such that respective peripheral portions thereof overlap the first membrane reinforcing members 10a and the second membrane reinforcing members 10b over the entire periphery when viewed in a thickness direction (direction indicated by an arrow VIb) of the polymer electrolyte membrane 1.

With this, a pair of opposed sides E3 of four sides of the main surface of the anode catalyst layer 2a contact the first membrane reinforcing members 10a, respectively, and do not directly contact the main surface F1 of the polymer electrolyte membrane 1. Therefore, the polymer electrolyte membrane 1 is not damaged. Similarly, a pair of opposed sides E4 of four sides of the main surface of the cathode catalyst layer 2b contact the second membrane reinforcing members 10b, respectively, and do not directly contact the main surface F2 of the polymer electrolyte membrane 1. Therefore, the polymer electrolyte membrane 1 is not damaged.

In contrast, the opposed sides E4 of the main surface of the anode catalyst layer 2a directly contact the main surface F1 of the polymer electrolyte membrane 1. Therefore, the polymer electrolyte membrane 1 may be damaged at these contacting portions. However, even in this case, since the second membrane reinforcing members 10b are disposed at portions of the main surface F2 of the polymer electrolyte membrane 1 which portions correspond to the above contacting portions, the cross leakage of the reactant gas does not occur. Similarly, the opposed sides E3 of the main surface of the cathode catalyst layer 2b directly contact the main surface F2 of the polymer electrolyte membrane 1. Therefore, the polymer electrolyte membrane 1 may be damaged at these contacting portions. Even in this case, since the first membrane reinforcing members 10a are disposed at portions of the main surface F1 of the polymer electrolyte membrane 1 which portions correspond to the above contacting portions, the cross leakage of the reactant gas does not occur.

The configuration of the catalyst layer 2 is not especially limited as long as the effects of the present invention can be obtained. The catalyst layer 2 may have the same configuration as a catalyst layer of a gas diffusion electrode of a known fuel cell. For example, the catalyst layer 2 may be configured to contain electrically-conductive carbon particles (powder) supporting electrode catalyst and a polymer electrolyte having positive ion (hydrogen ion) conductivity, or may be configured to further contain a water-repellent material, such as polytetrafluoroethylene. The anode catalyst layer 2a and the cathode catalyst layer 2b may be the same in configuration as each other or may be different in configuration from each other.

The catalyst layer 2 may be formed by using a method for manufacturing the catalyst layer of the gas diffusion electrode of the known fuel cell. For example, the catalyst layer 2 may be formed by preparing and using a liquid (catalyst layer forming ink) containing at least a constituent material (for example, the electrically-conductive carbon particle supporting the electrode catalyst, and the polymer electrolyte) of the catalyst layer 2 and a dispersion medium.

The polymer electrolyte may be the same as or different from the material of the above-described polymer electrolyte membrane 1. As the electrode catalyst, it is possible to use a metallic particle. The metallic particle is not especially limited, and various metals can be used. However, in light of an electrode reaction activity, it is preferable that the metallic particle be at least one metal selected from the group consisting of platinum, gold, silver, ruthenium, rhodium, palladium, osmium, iridium, chromium, iron, titanium, manganese, cobalt, nickel, molybdenum, tungsten, aluminum, silicon, zinc, and tin. Among these, platinum or an alloy of platinum and at least one metal selected from the above group are preferable, and an alloy of platinum and ruthenium is especially preferable since the activity of the catalyst becomes stable in the anode catalyst layer 2a.

Moreover, it is preferable that the average diameter of the metallic particles of the electrode catalyst be 1 to 5 nm. The electrode catalyst having the average diameter of 1 nm or more is preferable since it is industrially easy to prepare such electrode catalyst. Moreover, the electrode catalyst having the average diameter of 5 nm or less is preferable since it becomes easy to more adequately secure the activity per unit mass of the electrode catalyst and this leads to the cost reduction of the fuel cell.

It is preferable that the specific surface area of the electrically-conductive carbon particle be 50 to 1500 m$^2$/g. The specific surface area of 50 m²/g or more is preferable since the supporting rate of the electrode catalyst can be easily increased, and the output characteristics of the obtained catalyst layer 2 can be more adequately secured. Moreover, the specific surface area of 1500 m²/g or less is preferable since adequate-size fine holes can be more easily secured, the covering by the polymer electrolyte can be more easily carried out, and the output characteristics of the catalyst layer 2 can be more adequately secured. From the same viewpoint as above, it is more preferable that the specific surface area be 200 to 900 m²/g.

Moreover, it is preferable that the average diameter of the electrically-conductive carbon particle be 0.1 to 1.0 μm. The average diameter of 0.1 μm or more is preferable since it becomes easy to more adequately secure the gas diffusivity in the catalyst layer 2, and flooding can be more surely prevented. Moreover, the average diameter of 1.0 μm or less is preferable since it becomes easy to more easily make the covering state of the electrode catalyst by the polymer electrolyte satisfactory, and it becomes easy to more adequately secure the covering area of the electrode catalyst by the polymer electrolyte, thereby being able to more easily secure adequate electrode performance.

Next, the MEA (membrane-electrode assembly) 5 will be explained.

Figure 5A:
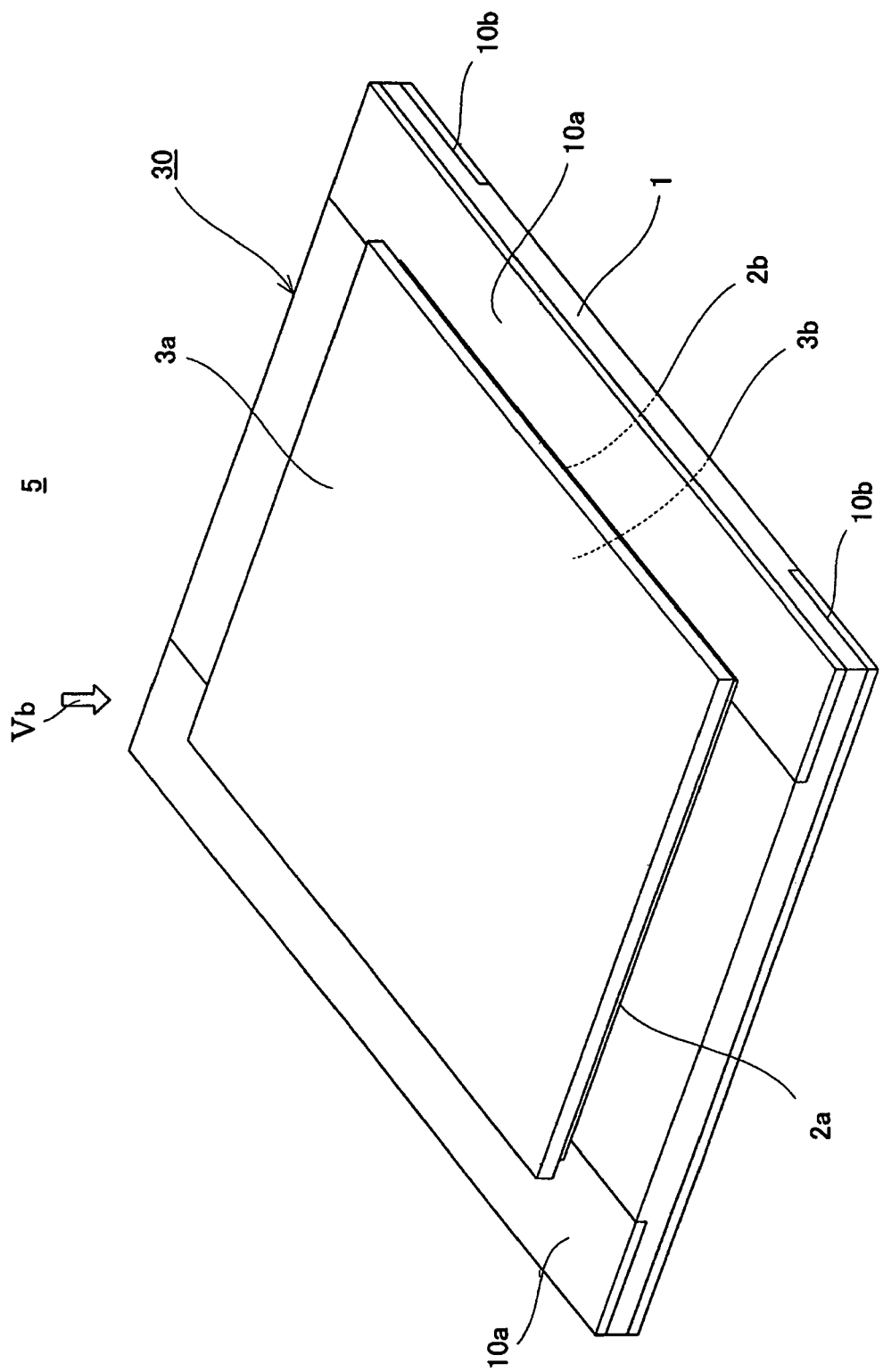
FIG. 5(a) is a schematic diagram showing a schematic configuration of an MEA in the cell of the polymer electrolyte fuel cell shown in FIG. 1.
Figure 5B:
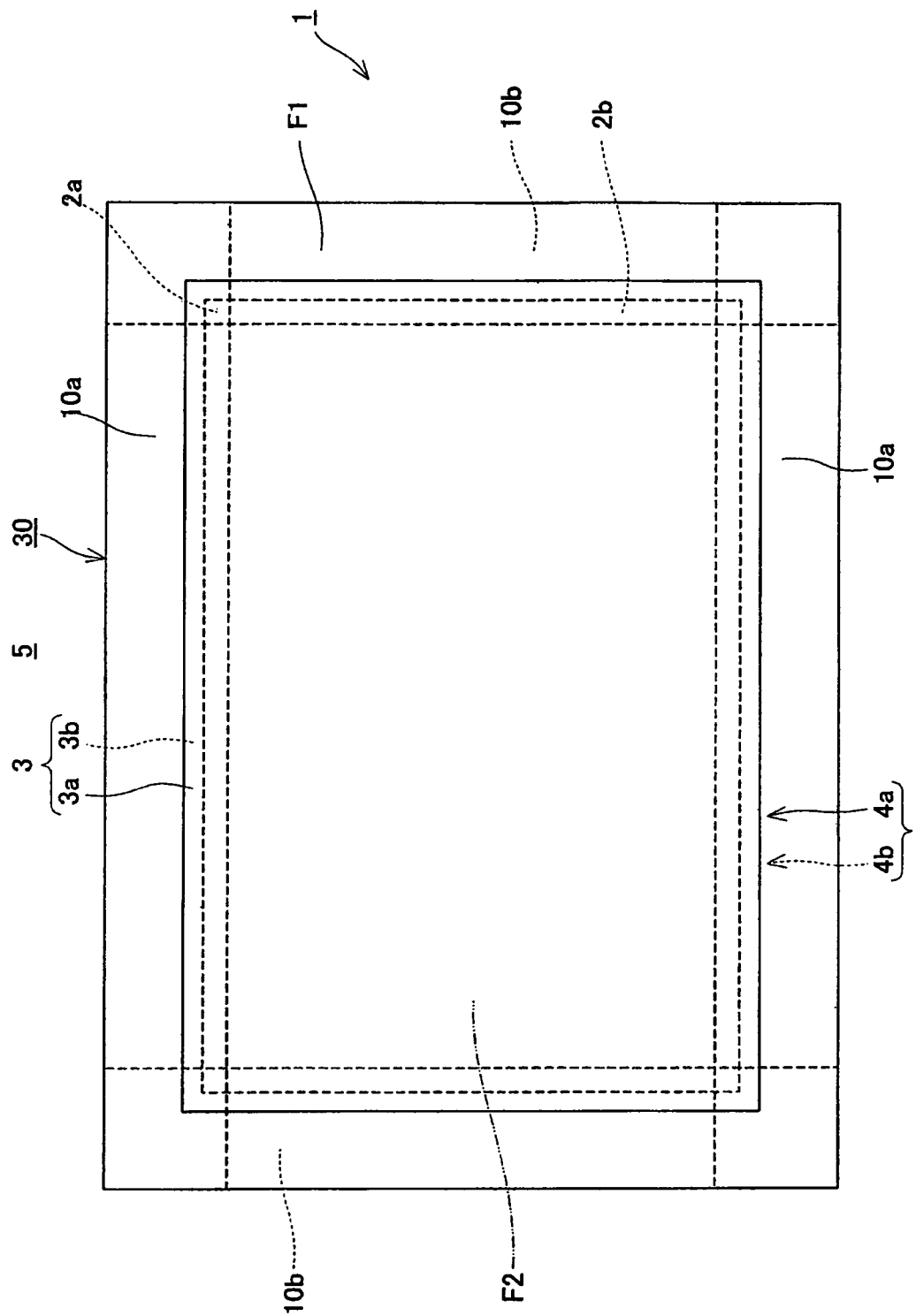
FIG. 5(b) is a schematic diagram when viewed from a direction indicated by an arrow Vb shown in FIG. 5(a).

FIG. 5(*a*) is a schematic diagram showing a schematic configuration of the MEA 5 in the cell 100 of the PEFC shown in FIG. 1. FIG. 5(*b*) is a schematic diagram when viewed from a direction indicated by an arrow Vb shown in FIG. 5(*a*).

As shown in FIG. 5, in the MEA 5, the anode gas diffusion layer 3*a* is disposed to cover the main surface of the anode catalyst layer 2*a* of the membrane-catalyst layer assembly 30, and similarly, the cathode gas diffusion layer 3*b* is disposed to cover the main surface of the cathode catalyst layer 2*b* of the membrane-catalyst layer assembly 30. The anode catalyst layer 2*a* and the anode gas diffusion layer 3*a* constitute the anode 4*a*, and the cathode catalyst layer 2*b* and the cathode gas diffusion layer 3*b* constitute the cathode 4*b*. Moreover, the anode 4*a* and the cathode 4*b* constitute an electrode 4. Herein, each of the main surface of the anode gas diffusion layer 3*a* and the main surface of the cathode gas diffusion layer 3*b* is formed to have the same rectangular shape as each of the main surface of the anode catalyst layer 2*a* and the main surface of the cathode catalyst layer 2*b*, and is configured to be larger than each of the main surface of the anode catalyst layer 2*a* and the main surface of the cathode catalyst layer 2*b*. However, the present embodiment is not limited to this, and respective main surfaces may be the same as each other.

The configuration of each of the anode gas diffusion layer 3*a* and the cathode gas diffusion layer 3*b* (hereinafter referred to as "gas diffusion layers 3") is not especially limited as long as the effects of the present invention can be obtained. Each of the anode gas diffusion layer 3*a* and the cathode gas diffusion layer 3*b* may have the same configuration as a gas diffusion layer of the gas diffusion electrode of the known fuel cell. Moreover, the gas diffusion layers 3 may be the same in configuration as each other or different in configuration from each other.

For example, in order that the gas diffusion layer 3 has gas permeability, an electrically-conductive base material having a porous structure, which is manufactured using high surface area carbon fine powder, pore-forming material, carbon paper, carbon cloth, or the like, may be used as the gas diffusion layer 3. Moreover, in order to obtain adequate drainage property, for example, water-repellent polymer, typically fluorocarbon resin, may be dispersed in the gas diffusion layer 3. Further, in order to obtain adequate electron conductivity, the gas diffusion layer 3 may be formed by an electron conductive material, such as carbon fiber, metal fiber, or carbon fine powder.

Moreover, a water-repellent carbon layer formed by water-repellent polymer and carbon powder may be disposed between the anode gas diffusion layer 3*a* and the anode catalyst layer 2*a*, and between the cathode gas diffusion layer 3*b* and the cathode catalyst layer 2*b*. With this, water control in the MEA 5 (retention of water necessary for maintaining satisfactory properties of the MEA 5, and quick discharge of unnecessary water) can be carried out more easily and more surely.

Next, the other components of the cell 100 will be explained.

Figure 17:
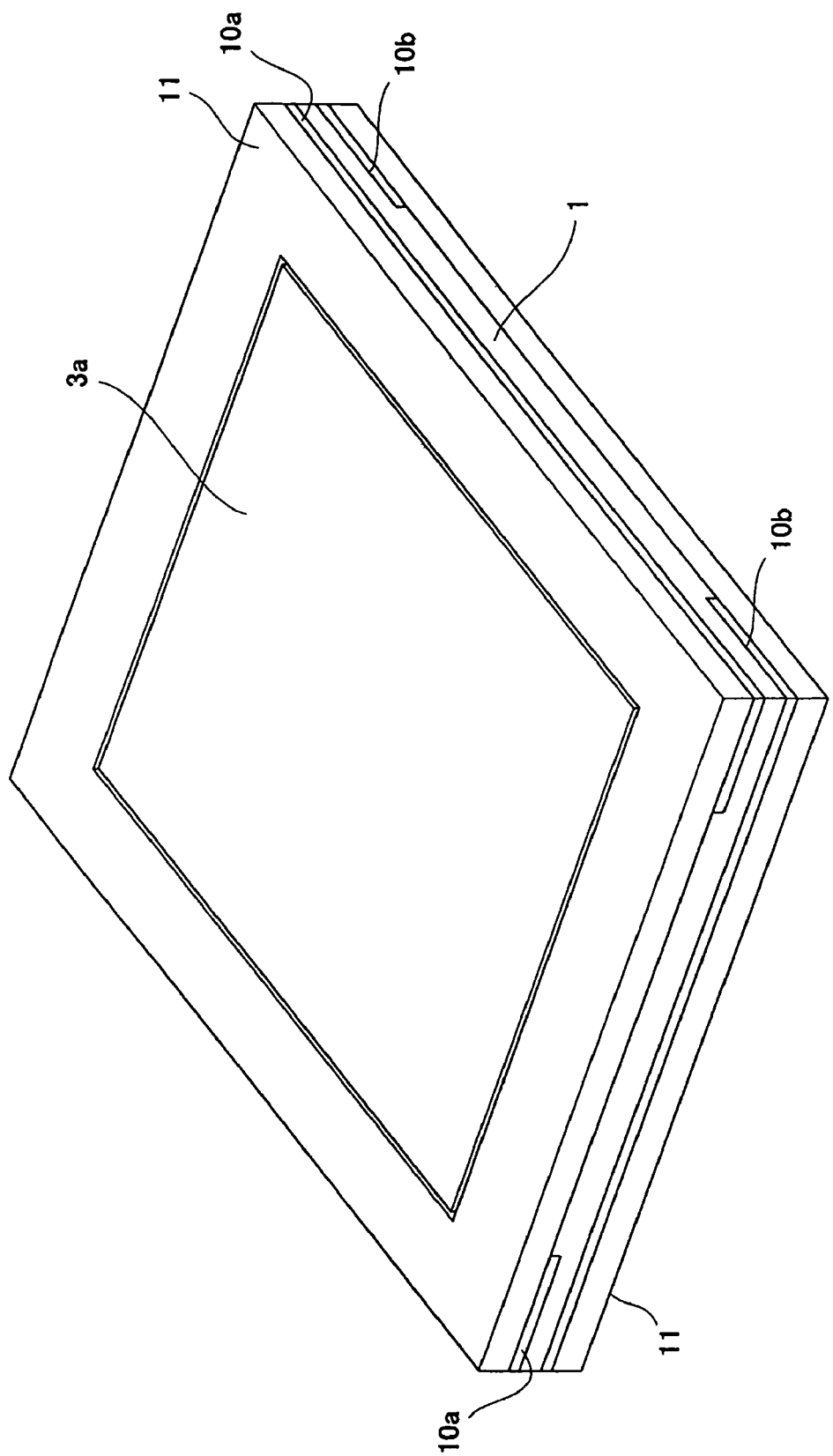
FIG. 17 is a perspective view schematically showing schematic configurations of an MEA 5 and gaskets 11 in a cell 100 of the PEFC shown in FIG. 1.

FIG. 17 is a perspective view schematically showing schematic configurations of the MEA 5 and the gaskets 11 in the cell 100 of the PEFC shown in FIG. 1.

As shown in FIGS. 1 and 17, a pair of gaskets 11 made of fluorocarbon rubber are disposed around the anode 4*a* and the cathode 4*b*, respectively, of the MEA 5 configured as above so as to sandwich the polymer electrolyte membrane 1. The gasket 11 is formed in a substantially rectangular ring shape. Specifically, the gasket 11 is formed to have substantially the same square shape as the polymer electrolyte membrane 1, and is provided with an opening on a main surface thereof. The opening of the gasket 11 is formed to be slightly larger than the main surface of the anode 4*a* or the cathode 4*b* (to be precise, the main surface of the gas diffusion layer 3). Then, the gasket 11 is formed such that in a case where a plurality of cells 100 are stacked and fastened, the main surface of the gasket 11 becomes the same in height as the main surface of the anode 4*a* or the cathode 4*b*. The gasket 11 may be manufactured by cutting by a laser beam or the like a sheet formed by a material of the gasket 11. Moreover, an assembly of the gaskets 11 and the MEA 5 may be manufactured by manufacturing a die capable of forming the shape of the gasket 11, putting the MEA 5 in this die, and carrying out injection molding.

This prevents the fuel gas, the air, and the oxidizing gas from leaking to an outside of the cell, and prevents these gases from being mixed with each other in the cell 100. Manifold holes (not shown), such as a fuel gas supplying manifold hole, formed by through holes extending in the thickness direction are formed on a peripheral portion of each of the polymer electrolyte membrane 1, the membrane reinforcing member 10, and the gaskets 11.

Moreover, as shown in FIG. 1, the anode separator 6*a* and the cathode separator 6*b* both of which are electrically conductive are disposed to sandwich the MEA 5 and the gaskets 11. Used as each of these separators 6*a* and 6*b* is a resin-impregnated graphite plate obtained by impregnating a graphite plate with phenol resin and hardening the graphite plate. Moreover, a separator made of a metallic material, such as SUS, may be used as each of the separators 6*a* and 6*b*. The MEA 5 is mechanically fixed by the anode separator 6*a* and the cathode separator 6*b*, and adjacent MEAs 5 are electrically connected to each other in series.

A groove-like fuel gas channel 7 through which the fuel gas flows is formed in a serpentine shape on an inner surface (surface contacting the MEA 5) of the anode separator 6*a*. Meanwhile, a groove-like heat medium channel 9 through which the heat medium flows is formed in a serpentine shape on an outer surface of the anode separator 6*a*. Moreover, the manifold holes (not shown), such as the fuel gas supplying manifold hole, formed by the through holes extending in the thickness direction are formed on the peripheral portion of the anode separator 6*a*.

Meanwhile, a groove-like oxidizing gas channel 8 through which the oxidizing gas flows is formed in a serpentine shape on an inner surface of the cathode separator 6b, and the groove-like heat medium channel 9 through which the heat medium flows is formed in a serpentine shape on an outer surface of the cathode separator 6b. Moreover, as with the anode separator 6a, the manifold holes (not shown), such as the fuel gas supplying manifold hole, formed by the through holes extending in the thickness direction are formed on a peripheral portion of the cathode separator 6b.

Herein, each of the fuel gas channel 7, the oxidizing gas channel 8, and the heat medium channel 9 is formed in a serpentine shape. However, the present embodiment is not limited to this, and any shape is acceptable as long as the reactant gas or the heat medium flows through substantially the entire main surface of each of the separators 6a and 6b.

The cells 100 formed as above are stacked in the thickness direction to form a cell stack body. At this time, the manifold holes, such as the fuel gas supplying manifold hole, formed on the anode separator 6a, the cathode separator 6b, and the gasket 10 are connected to one another in the thickness direction by stacking the cells 100 to form manifolds, such as a fuel gas supplying manifold. Then, a current collector and an insulating plate are disposed on each of both ends of the cell stack body, an end plate is disposed on each of both insulating plates, and these components are fastened by fastener. Thus, a cell stack (PEFC) is formed.

Next, a method for manufacturing the cell in the PEFC according to Embodiment 1 will be explained. A method for manufacturing the cell and the cell stack (PEFC) using the MEA 5 manufactured as explained below is not especially limited, and known techniques for manufacturing the PEFC can be adopted. Therefore, a detailed explanation of the method is omitted.

First, a method for manufacturing the membrane-catalyst layer stack body 30 will be explained.

Figure 6:
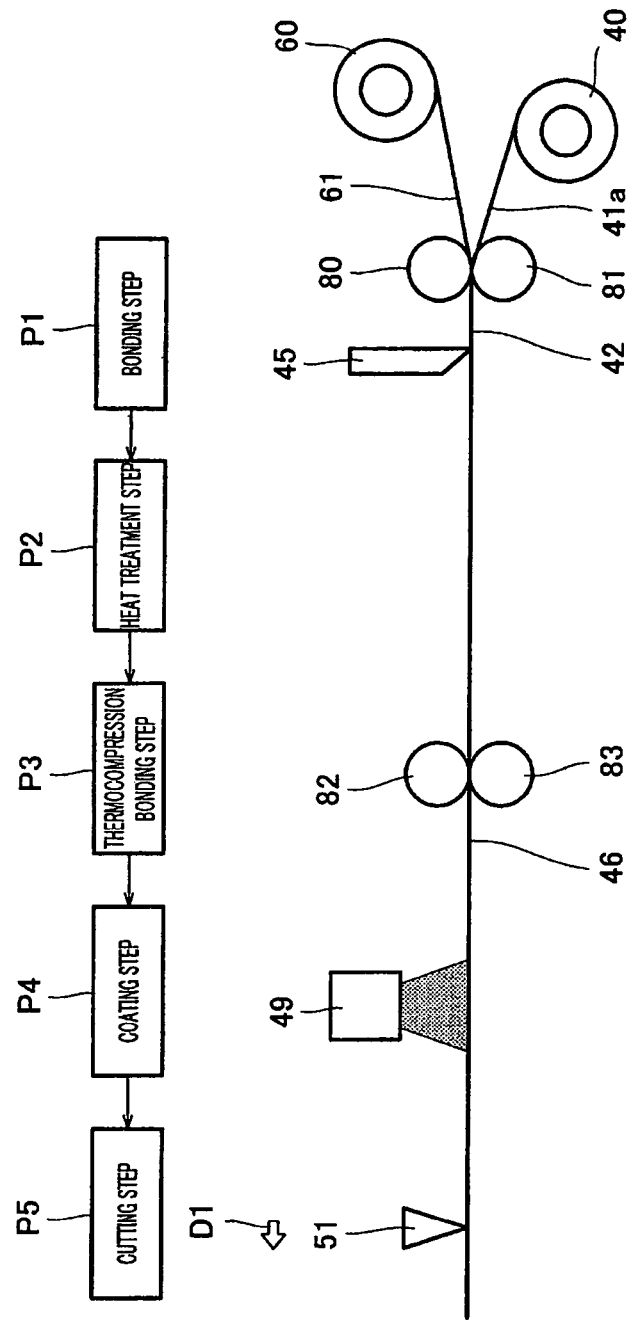
FIG. 6 is a schematic diagram schematically showing a part of a series of steps of manufacturing a membrane-catalyst layer stack body shown in FIG. 4.

FIG. 6 is a schematic diagram schematically showing a part of a series of steps (treatment areas) of manufacturing the membrane-catalyst layer stack body 30 shown in FIG. 4, and a part of a manufacturing line for the membrane-catalyst layer stack body 30.

As shown in FIG. 6, the membrane-catalyst layer stack body 30 is manufactured through: a bonding step P1 of bonding a polymer electrolyte membrane sheet and a membrane reinforcing member tape to form a membrane-membrane reinforcing member stack body; a heat treatment step P2 of drying a membrane-membrane reinforcing member assembly sheet; a thermocompression bonding step P3 of carrying out thermocompression bonding of the membrane-membrane reinforcing member stack body; a coating step P4 of coating the membrane-membrane reinforcing member assembly sheet with the catalyst layer; and a cutting step P5 of cutting a membrane-catalyst layer sheet. With this, the MEA 5 can be easily mass-produced at low cost.

First, the bonding step P1 will be explained.

Figure 7:
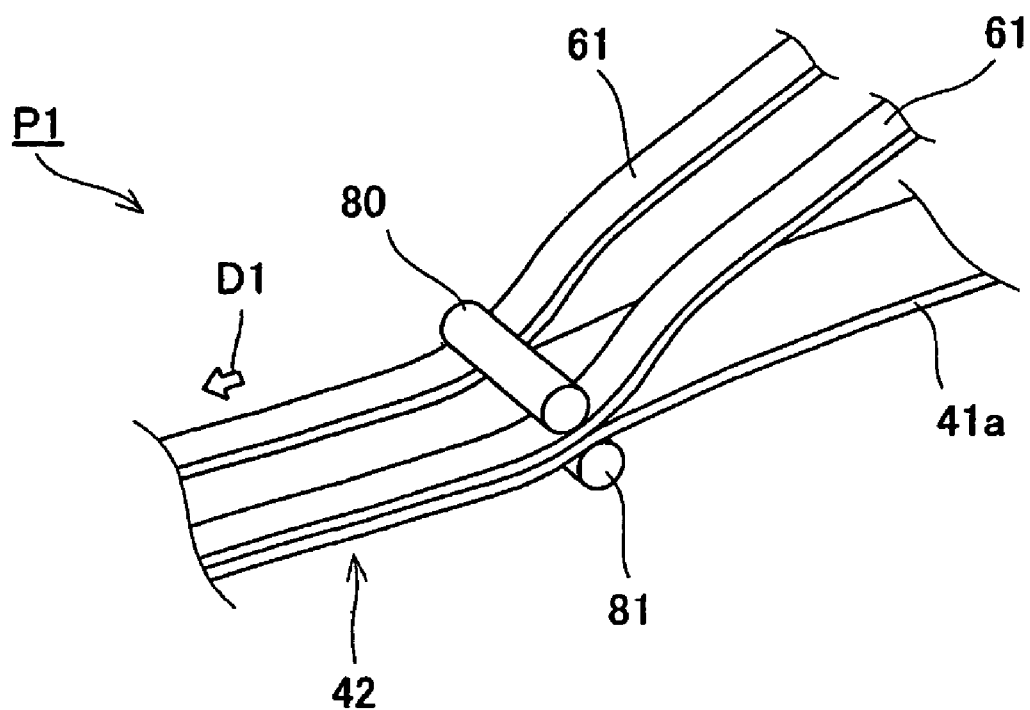
FIG. 7 is a schematic diagram for explaining a bonding step in a step of manufacturing the membrane-catalyst layer stack body shown in FIG. 6.
Figure 8:
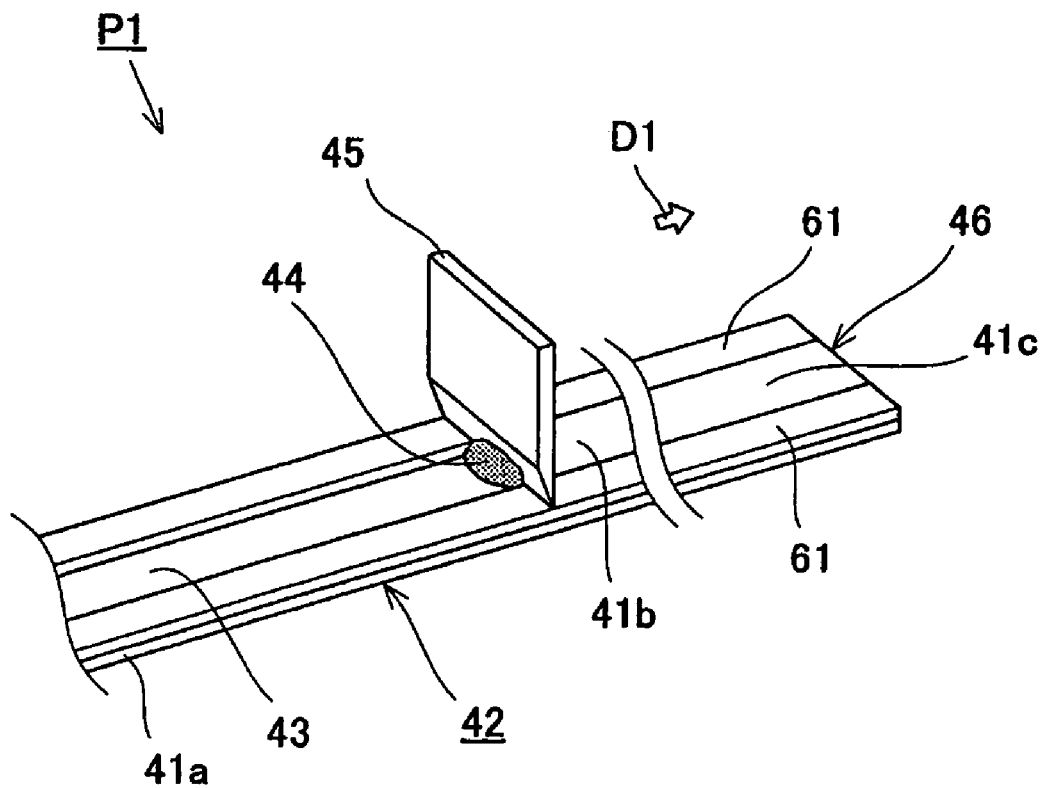
FIG. 8 is a schematic diagram for explaining the bonding step in the step of manufacturing the membrane-catalyst layer stack body shown in FIG. 6.

FIGS. 7 and 8 are schematic diagrams for explaining the bonding step P1 in the step of manufacturing the membrane-catalyst layer stack body 30 shown in FIG. 6.

First, a polymer electrolyte membrane roll 40 and a membrane reinforcing member roll 60 are manufactured by using a known thin film manufacturing technique. The polymer electrolyte membrane roll 40 is manufactured by rolling a long polymer electrolyte membrane sheet 41a (that is a member from which the polymer electrolyte membrane 1 shown in FIG. 1 is obtained by cutting), and the membrane reinforcing member roll 60 is manufactured by rolling a membrane reinforcing member tape 61 (that is a member from which the first membrane reinforcing member 10a (or the second membrane reinforcing member 10b) is obtained by cutting).

Next, as shown in FIG. 7, the polymer electrolyte membrane sheet 41a is pulled out from the polymer electrolyte membrane roll 40, and a pair of membrane reinforcing member tapes 61 are pulled out from a pair of membrane reinforcing member rolls 60. Then, these are introduced into a thermocompression bonding device (not shown) including a pair of rollers 80 and 81. At this time, the polymer electrolyte membrane sheet 41a and the membrane reinforcing member tapes 61 are positioned such that the membrane reinforcing member tapes 61 are located at both side end portions, respectively, of the polymer electrolyte membrane sheet 41a. Then, the polymer electrolyte membrane sheet 41a and the membrane reinforcing member tapes 61 are joined to each other in the thermocompression bonding device while they are proceeding in a proceeding direction D1 between the rollers 80 and 81 preheated. Thus, a tape-shape membrane-membrane reinforcing member stack body 42 is formed.

Before causing the polymer electrolyte membrane sheet 41a and the pair of membrane reinforcing member tapes 61 to contact each other, a pretreatment of applying an adhesive to the surfaces (contact surfaces) of the membrane reinforcing member tapes 61 may be carried out. In this case, a pressure treatment may be carried out with the rollers 80 and 81 preheated as above, or the pressure treatment may be carried out without preheating the rollers 80 and 81. Moreover, it is preferable that the adhesive does not deteriorate the battery characteristics. For example, it may be possible to use a dispersion medium or a solvent containing a polymer electrolyte material (shown above as the constituent material of the polymer electrolyte membrane 1 for example) that is the same type as or different type (having an affinity so as to be able to be adequately integrated with the polymer electrolyte membrane sheet 41a) from the polymer electrolyte membrane sheet 41a.

Next, as shown in FIG. 8, a polymer electrolyte cast membrane 41b is formed using a blade 45 in a groove-like concave portion 43 formed by the polymer electrolyte membrane sheet 41a and the membrane reinforcing member tapes 61 of the membrane-membrane reinforcing member stack body 42. Specifically, the polymer electrolyte is changed into a liquid state by water displacement, alcohol dispersion, or the like, and its viscosity is adjusted to be suitable. Thus, a polymer electrolyte solution 44 is prepared. An appropriate amount of the polymer electrolyte solution 44 is poured in the concave portion 43. A lower end surface of the blade 45 is caused to contact main surfaces of the membrane reinforcing member tapes 61 of the membrane-membrane reinforcing member stack body 42. Then, the membrane-membrane reinforcing member stack body 42 is moved in the proceeding direction D1. Thus, the polymer electrolyte cast membrane 41b is formed between the lower end surface of the blade 45 and the concave portion 43.

Next, the heat treatment step P2 will be explained.

In the heat treatment step P2, liquid contained in the polymer electrolyte cast membrane 41b formed in the bonding step P1 is removed by carrying out a heat treatment (For example, the polymer electrolyte cast membrane 41b is dried by causing the membrane-membrane reinforcing member stack body 42 to pass through a drying furnace which is adjusted to have such a temperature that a dispersing agent in which polymer electrolyte is dispersed vaporizes) using a suitable means. Thus, a polymer electrolyte membrane sheet 41c is formed on a main surface (in the concave portion 43) of the polymer electrolyte membrane sheet 41a. The surface of the polymer electrolyte membrane sheet 41c is flush with the surfaces of the membrane reinforcing member tapes 61 of the membrane-membrane reinforcing member stack body 42.

Next, the thermocompression bonding step P3 will be explained.

In the thermocompression bonding step P3, the thermocompression bonding is carried out to completely integrating the polymer electrolyte membrane sheet 41c formed in the heat treatment step P2 and the polymer electrolyte membrane sheet 41a. Specifically, the membrane-membrane reinforcing member stack body 42 and the polymer electrolyte membrane sheet 41c are caused to pass through a thermocompression bonding device (not shown) having a pair of rollers 82 and 83. The rollers 82 and 83 are preheated to have a temperature equal to or higher than a glass transition temperature of the polymer electrolyte constituting the polymer electrolyte membrane sheet 41a and the polymer electrolyte membrane sheet 41c. While the membrane-membrane reinforcing member stack body 42 and the polymer electrolyte membrane sheet 41c proceed between the rollers 82 and 83 in the thermocompression bonding device in the proceeding direction D1, the polymer electrolyte membrane sheet 41a and the polymer electrolyte membrane sheet 41c are joined to each other to be completely integrated with each other. Thus, a long membrane-membrane reinforcing member assembly sheet 46 is formed.

The membrane-membrane reinforcing member assembly sheet 46 may be formed as below.

Figure 9:
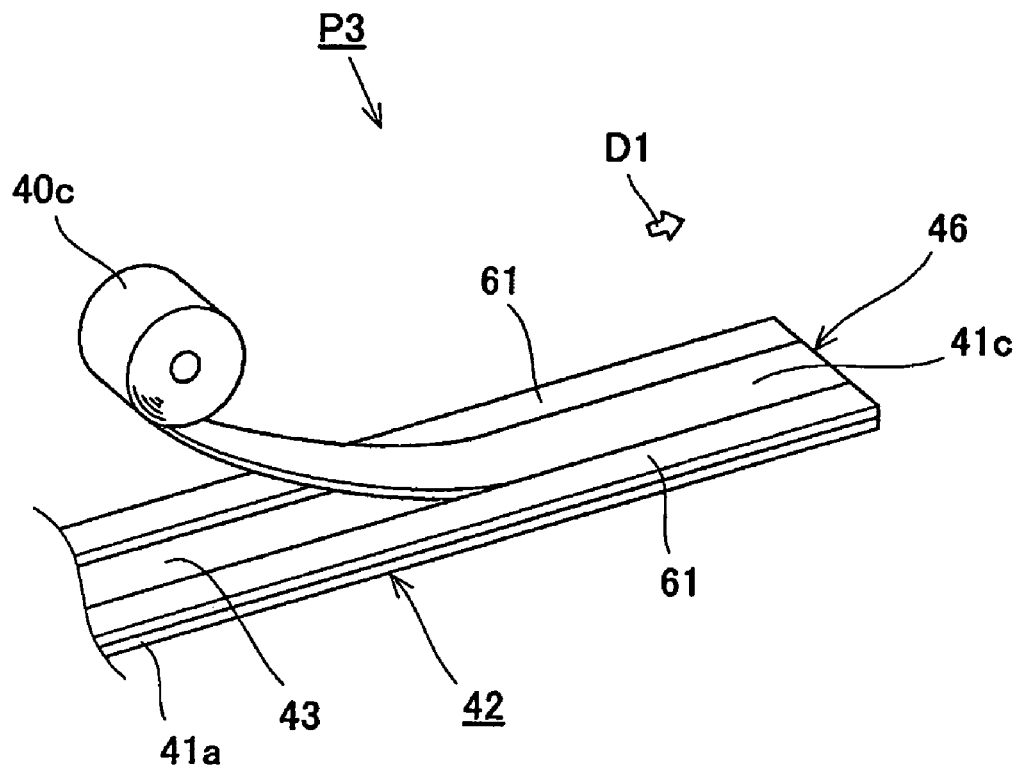
FIG. 9 is a schematic diagram for explaining a thermocompression bonding step in the step of manufacturing the membrane-catalyst layer stack body shown in FIG. 6.

FIG. 9 is a schematic diagram showing another manufacturing method for forming the membrane-membrane reinforcing member assembly sheet 46.

First, a polymer electrolyte membrane roll 40c formed by rolling the long polymer electrolyte membrane sheet 41c is manufactured by using a known thin film manufacturing technique. At this time, the polymer electrolyte membrane sheet 41c is formed to have the same width as the concave portion of the membrane-membrane reinforcing member stack body 42.

Next, as shown in FIG. 9, the polymer electrolyte membrane sheet 41c is pulled out from the polymer electrolyte membrane roll 40c and is fitted in the concave portion 43 of the membrane-membrane reinforcing member stack body 42. Then, the membrane-membrane reinforcing member stack body 42 and the polymer electrolyte membrane sheet 41c are introduced into a thermocompression bonding device, not shown. In the thermocompression bonding device, the polymer electrolyte membrane sheet 41a of the membrane-membrane reinforcing member stack body 42 and the polymer electrolyte membrane sheet 41c are joined to each other to be completely integrated with each other. Thus, the long membrane-membrane reinforcing member assembly sheet 46 is formed.

Moreover, the membrane-membrane reinforcing member assembly sheet 46 may be formed as below.

Figure 18:
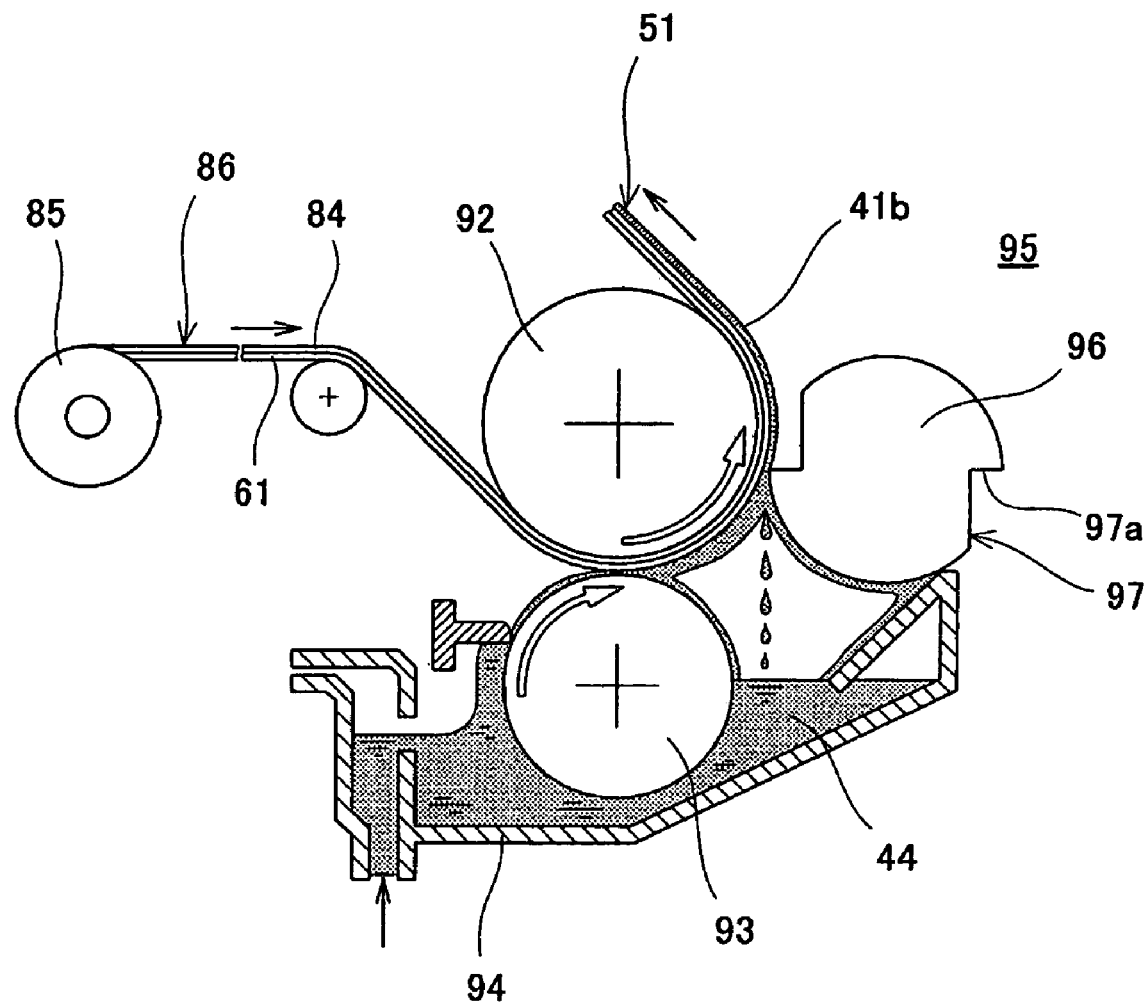
FIG. 18 is a schematic diagram showing another manufacturing method for forming a membrane-membrane reinforcing member assembly sheet.
Figure 19:
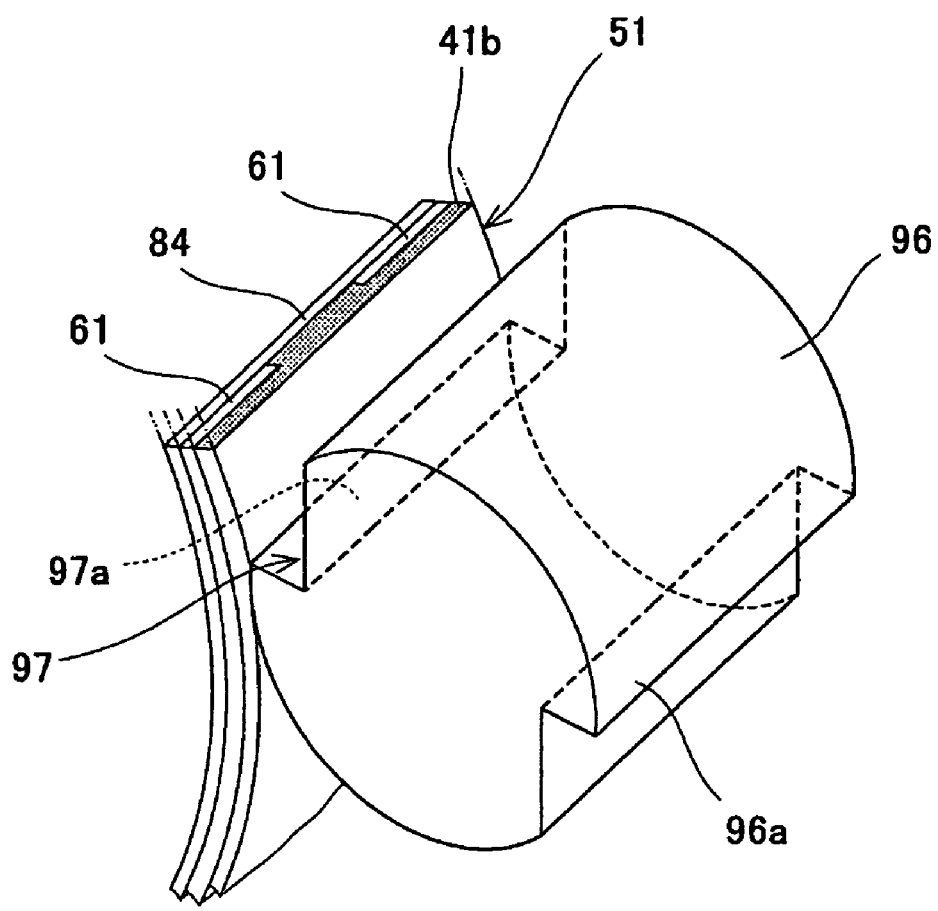
FIG. 19 is a schematic diagram enlarging main parts of a roll knife coater shown in FIG. 18.

FIG. 18 is a schematic diagram showing another manufacturing method (manufacturing method using a roll knife coater (comma coater)) for forming the membrane-membrane reinforcing member assembly sheet 46. FIG. 19 is a schematic diagram enlarging main parts of the roll knife coater shown in FIG. 18.

First, a base material-membrane reinforcing member assembly sheet 86 in which the membrane reinforcing member tapes 61 are attached to both side end portions of a long base material sheet 84 is manufactured using a known thin film manufacturing technique, and the base material-membrane reinforcing member assembly sheet 86 is rolled to form a base material-membrane reinforcing member roll 85. Then, the polymer electrolyte cast membrane 41b having a convex cross section is formed on one main surface (hereinafter referred to as "front surface") of the base material-membrane reinforcing member assembly sheet 86 by using a known roll knife coater 95 shown in FIGS. 18 and 19.

Here, the roll knife coater 95 will be briefly explained.

As shown in FIG. 18, a rotating roll 92 which rotates in a predetermined rotational direction is disposed in a manufacturing line for the cast membrane 41b. The base material-membrane reinforcing member assembly sheet 86 pulled out from the base material-membrane reinforcing member roll 85 is rolled around the rotating roll 92. An applicator roll 93 is disposed under and in parallel with the rotating roll 92, and a predetermined gap is provided between the applicator roll 93 and the base material-membrane reinforcing member assembly sheet 86 rolled around the rotating roll 92. The applicator roll 93 rotates in a direction opposite to the rotational direction of the rotating roll 92. Then, a liquid dam portion 94 is formed to surround the applicator roll 93, and a lower portion of the applicator roll 93 is immersed in coating liquid (herein, a polymer electrolyte solution) 44 stored in the liquid dam portion 94. Moreover, a roll knife 96 is disposed at a position which is located on an obliquely upward side of the applicator roll 93 and downstream of the applicator roll 93 in a proceeding direction of the base material-membrane reinforcing member assembly sheet 86.

As shown in FIGS. 18 and 19, the roll knife 96 is formed such that a pair of V-shaped cutout portions 97 are formed on a peripheral surface of a columnar body over the entire length in an axial direction of the columnar body. The cutout portions 97 are formed to be symmetric about a central axis of the columnar body. A knife portion 96a of the cutout portion 97 is constituted by an edge portion formed by a side surface 97a located on a front side in the proceeding direction of the base material-membrane reinforcing member assembly sheet 86 and the peripheral surface of the columnar body. The roll knife 96 is fixed in parallel with the rotating roll 92 such that a predetermined gap is provided between the knife portion 96a and the base material-membrane reinforcing member assembly sheet 86 rolled around the rotating roll 92.

In the roll knife coater 95 configured as above, the base material-membrane reinforcing member assembly sheet 86 passes through between the rotating roll 92 and the applicator roll 93. While the base material-membrane reinforcing member assembly sheet 86 passes through between the rolls 92 and 93, the polymer electrolyte solution 44 is applied to the front surface of the base material-membrane reinforcing member assembly sheet 86. Then, the base material-membrane reinforcing member assembly sheet 86 to which the polymer electrolyte solution 44 is applied moves along the peripheral surface of the rotating roll 92. At this time, since the concave portion is formed on the base material-membrane reinforcing member assembly sheet 86 by the base material sheet 84 and the membrane reinforcing member tapes 61, the polymer electrolyte cast membrane 41b is formed to have a convex cross section in a thickness direction thereof. Thus, a base material-polymer electrolyte membrane sheet 51 is formed. The thickness of the polymer electrolyte membrane sheet 41d formed on the front surface of the base material-membrane reinforcing member assembly sheet 86 is determined by the gap between the peripheral surface of the rotating roll 92 (to be precise, the front surface of the base material-membrane reinforcing member assembly sheet 86) and the knife portion 96a of the roll knife 96.

Next, as with the heat treatment step P2, liquid contained in the cast membrane 41b of the base material-polymer electrolyte membrane sheet 51 formed as above is removed by carrying out the heat treatment using a suitable means. Then, the base material sheet 84 is removed from the base material-polymer electrolyte membrane sheet 51 by a suitable means. Thus, the membrane-membrane reinforcing member assembly sheet 46 is formed.

Herein, the base material-polymer electrolyte membrane sheet 51 is formed by using the roll knife coater. However, the present embodiment is not limited to this. The base material-polymer electrolyte membrane sheet 51 may be formed by using a known coating device, such as a slot die coater, a lip coater, or a gravure coater.

Next, the coating step P4 will be explained.

Figure 10:
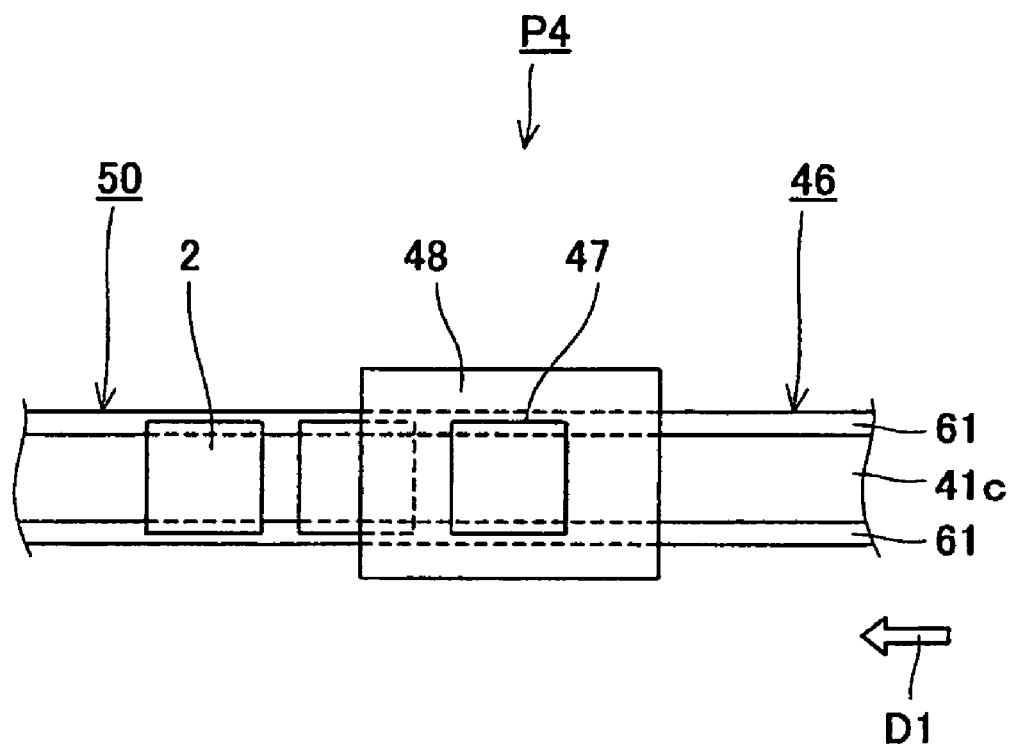
FIG. 10 is a schematic diagram for explaining a coating step in the step of manufacturing the membrane-catalyst layer stack body shown in FIG. 6.

FIG. 10 is a schematic diagram for explaining the coating step P4 in the step of manufacturing the membrane-catalyst layer stack body 30 shown in FIG. 6.

First, the configuration of an area where the coating step P4 is carried out will be explained.

As shown in FIG. 10, in the area where the coating step P4 is carried out, there are provided a mask 47 having an opening 48, a supporting means (supporting base for example), not shown, for supporting the membrane-membrane reinforcing member assembly sheet 46 from a main surface (hereinafter referred to as "rear surface") of the membrane-membrane reinforcing member tape 46 which surface is opposite to the surface on which the membrane reinforcing member tapes 61 are disposed, and a catalyst layer forming device 49 (see FIG. 6). The shape of the opening 48 is designed to correspond to the shape of the main surface of the catalyst layer 2 shown in FIG. 4. Moreover, the catalyst layer forming device has a mechanism which, for example, applies or sprays a catalyst layer forming ink to form the catalyst layer 2 on the main surface of the membrane-membrane reinforcing member sheet 46. As this mechanism, a mechanism adopted for forming the catalyst layer of the gas diffusion layer of the known fuel cell may be adopted. For example, it is possible to adopt a mechanism designed based on a spraying method, a spin coating method, a doctor blade method, a die coating method, or a screen printing.

Next, the treatment of the coating step P4 will be explained.

First, the membrane-membrane reinforcing member assembly sheet 46 formed in the thermocompression bonding step P3 proceeds to the area of the coating step P4 and stops once. Then, the membrane-membrane reinforcing member assembly sheet 46 is sandwiched between the mask 47 and the supporting base, not shown, to be fixed. Next, the catalyst layer forming device 49 starts operating. By, for example, applying the catalyst layer forming ink from above the opening 48 of the mask 47, the catalyst layer 2 is formed to cover the main surface of the polymer electrolyte membrane sheet 41*c* of the membrane-membrane reinforcing member assembly sheet 46 and at least a part of each of the main surfaces of the membrane reinforcing member tapes 61. After the catalyst layer 2 is formed, the mask 47 and the supporting base are separated from the membrane-membrane reinforcing member assembly sheet 46. A membrane-catalyst layer sheet 50 formed in this manner moves in the proceeding direction D1. Thus, the catalyst layers 2 are formed on the membrane-catalyst layer sheet 50 at predetermined intervals in a longitudinal direction of the membrane-catalyst layer sheet 50.

The ingredient composition, the dryness, and the like of the catalyst layer 2 are adjusted so that the catalyst layer 2 has appropriate bendability. In addition, the catalyst layer 2 is subjected to such a treatment (for example, the supporting base is heated, and a dispersing agent of the catalyst layer forming ink is subjected to a drying treatment.) that even in a case where the membrane-catalyst layer sheet 50 is disposed upside down, the catalyst layer 2 does not fall off from the polymer electrolyte membrane sheet 41*c* and the membrane reinforcing members 61. Moreover, the drying treatment (for example, at least one of the heat treatment, an air blow treatment, and a deaeration treatment) may be suitably carried out each time the catalyst layer 2 is formed.

Next, the cutting step P5 will be explained.

First, a pair of membrane-catalyst layer sheets 50 are disposed such that longitudinal directions thereof are substantially perpendicular to each other and rear surfaces thereof are opposed to each other. Then, in a state where the rear surfaces of the membrane-catalyst layer sheets 50 overlap each other, the membrane-catalyst layer sheets 50 are introduced into a cutting device 51 including a thermocompression bonding mechanism and a cutting mechanism. The rear surface (the polymer electrolyte membrane sheet 41*a*) of the membrane-catalyst layer sheet 50 and the rear surface (the polymer electrolyte membrane sheet 41*a*) of the membrane-catalyst layer sheet 50 introduced into the cutting device 51 are subjected to the thermocompression bonding by the thermocompression bonding mechanism. Next, the membrane-catalyst layer sheets 50 are cut by the cutting mechanism such that the obtained piece has a preset size. Thus, the membrane-catalyst layer stack body 30 shown in FIG. 4 is obtained. Note that the membrane-catalyst layer sheet 50 may be cut in advance such that the obtained piece has the preset size, and two pieces obtained from the membrane-catalyst layer sheet 50 may be joined to each other, thereby forming the membrane-catalyst layer assembly 30.

In the manufacturing line for the membrane-catalyst layer assembly shown in FIG. 6, a single sheet moves until the polymer electrolyte membrane sheet 41*a* that is a material becomes the membrane-catalyst layer assembly sheet 50. To appropriately move the sheet in the proceeding direction D1, a towing mechanism, such as a capstan or a pair of rollers, for towing the sheet, a tension applying mechanism, such as a tensioner, for applying an appropriate tension to the sheet, and a sheet temporary holding and feeding mechanism, such as a dancer roller, for temporarily stopping the sheet at a predetermined area (the area of the coating step P4 for example) and then rapidly feeding the sheet are provided at appropriate positions in the manufacturing line. However, since these are known in the art, explanations thereof are omitted. Moreover, at the cutting step (area) P5, this manufacturing line intersects with a second manufacturing line for the membrane-catalyst layer assembly. Then, in the cutting step P5, the membrane-catalyst layer assembly sheet 50 manufactured in the second manufacturing line for the membrane-catalyst layer assembly is turned over, and is positioned perpendicular to the membrane-catalyst layer assembly sheet 50 manufactured in the manufacturing line for the membrane-catalyst layer assembly shown in FIG. 6. Then, these membrane-catalyst layer assembly sheets 50 are processed as described above. Since the second manufacturing line for the membrane-catalyst layer assembly is completely the same as the manufacturing line for the membrane-catalyst layer assembly shown in FIGS. 6 to 10, an explanation thereof is omitted.

Next, a method for manufacturing the MEA 5 will be explained.

The gas diffusion layer 3 (carbon cloth for example) precut to have a suitable size is joined to the main surface of the catalyst layer 2 of the membrane-catalyst layer assembly 30 obtained as above. Thus, the MEA 5 is obtained. The MEA 5 may be formed after the water-repellent carbon layer is formed by, for example, applying an water-repellent carbon layer forming ink to the main surface of the catalyst layer 2 or the main surface of the gas diffusion layer 3 in advance.

Moreover, before the cutting step P5, the MEA 5 may be formed by causing the gas diffusion layer 3 to be joined to the main surface of the catalyst layer 2 of the membrane-catalyst layer sheet 50. In this case, a membrane-electrode sheet may be formed by causing the precut gas diffusion layer 3 to be joined to the main surface of the catalyst layer 2. Moreover, the membrane-electrode sheet may be formed by causing the tape-shape gas diffusion layer to be joined to the main surface of the catalyst layer 2 and cutting it. Then, a pair of obtained membrane-electrode sheets are joined to each other and are cut in the same manner as in the cutting step P5. Thus, the MEA 5 is formed. The MEA 5 may be formed after the water-repellent carbon layer is formed by, for example, applying the water-repellent carbon layer forming ink to the main surface of the catalyst layer 2 or the main surface of the gas diffusion layer 3 in advance.

Next, the following will explain as Comparative Example a manufacturing method typically used in the case of mass-producing the solid polymer electrolyte fuel cell disclosed in Patent Document 2 by using a known technique of manufacturing a thin film stack body.

COMPARATIVE EXAMPLE 1

Figure 11:
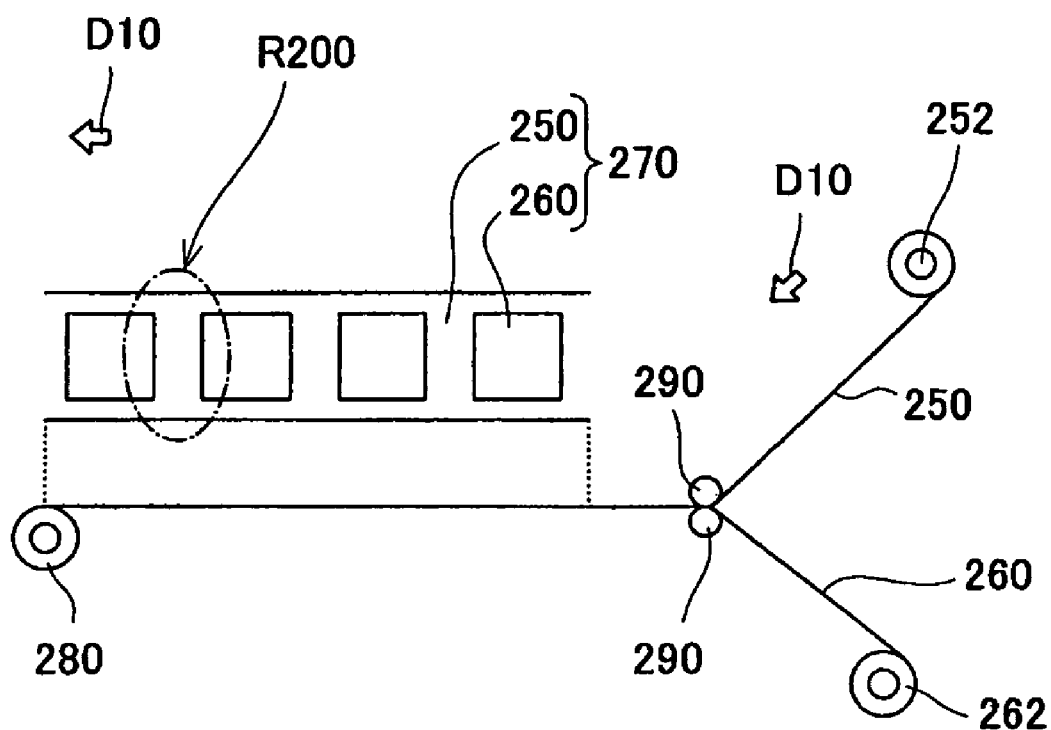
FIG. 11 is an explanatory diagram showing one example of a manufacturing method typically used in the case of mass-producing a solid polymer electrolyte fuel cell disclosed in Patent Document 2 by using a known technique of manufacturing a thin film stack body.

FIG. 11 is an explanatory diagram showing one example of the manufacturing method typically used in the case of mass-producing the solid polymer electrolyte fuel cell disclosed in Patent Document 2 by using the known technique of manufacturing the thin film stack body.

Figure 16:
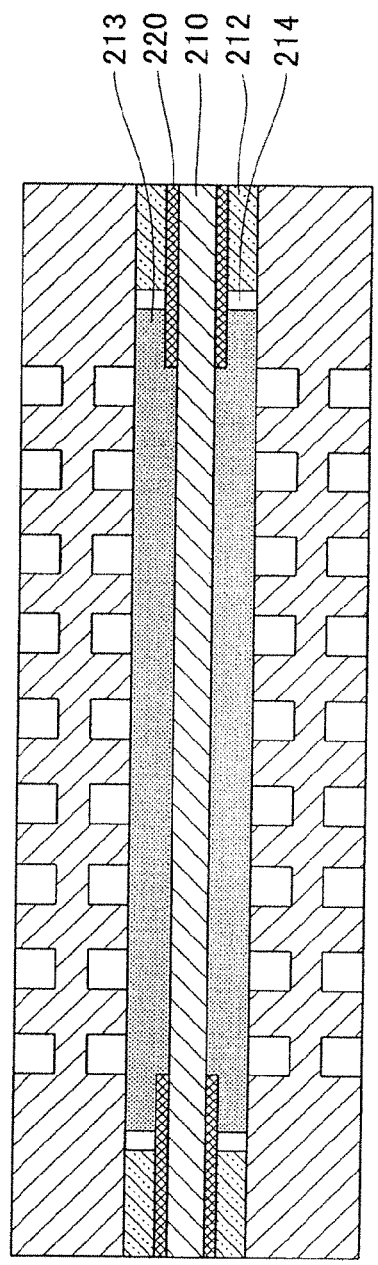
FIG. 16 is a schematic diagram showing an outline of a seal structure of the solid polymer electrolyte fuel cell disclosed in Patent Document 2.

First, as shown in FIG. 11, a tape-shape solid polymer electrolyte membrane 260 is manufactured and rolled, so that a polymer electrolyte membrane roll 262 is obtained, and a tape-shape protective membrane 250 (a tape-shape version obtained by continuously forming the protective membrane 220 shown in FIG. 16) is manufactured and rolled, so that a protective membrane roll 252 is obtained.

Next, as with the bonding step P1 described above, a stack body is manufactured by stacking the tape-shape protective membrane 250 on at least one of the main surfaces of the tape-shape solid polymer electrolyte membrane 260. The tape-shape protective membrane 250 and the tape-shape solid polymer electrolyte membrane 260 are pulled out from the polymer electrolyte membrane roll 252 and the protective membrane roll 262, respectively, and are sandwiched between a pair of rollers 290 to be integrated with each other. This integrated stack body is rolled. Thus, a membrane-protective membrane roll 280 is formed.

When manufacturing the membrane-protective membrane roll 280, tension is applied to the protective membrane 250 in a direction (longitudinal direction of the tape-shape protective membrane 250) D10 in which the protective membrane 250 proceeds. The protective membrane 250 is a very thin membrane (50 μm or less for example), and has an opening 222 inside the main surface thereof. Therefore, if the tension is applied to the protective membrane 250, a portion R200 extending in a direction substantially perpendicular to a direction in which the tension is applied to the protective membrane 250 rises. Therefore, between the rollers 290 and the polymer electrolyte membrane roll 252, there is a high possibility that when the rollers 290 press the protective membrane 250, wrinkling is generated at the portion R200. Moreover, between the rollers 290 and the membrane-protective membrane roll 280, there is a high possibility that the portion R200 of the protective membrane 250 is peeled off from the solid polymer electrolyte membrane 260 by the tension.

For the above reasons, in the case of the solid polymer electrolyte fuel cell disclosed in Patent Document 2, a troublesome, complex, high-cost method for positioning the protective membranes on the solid polymer electrolyte membrane one by one and attaching them to the solid polymer electrolyte membrane one by one by a batch method has to be adopted in order to surely manufacture the solid polymer electrolyte fuel cell while preventing product failure.

In contrast, in the PEFC according to Embodiment 1, there is no portion R200 (portion which extends in the direction substantially perpendicular to the direction in which the tension is applied, and which tends to rise by the tension) of the protective membrane 250 shown in FIG. 11. Therefore, it is possible to adequately prevent displacement and peel-off of the membrane reinforcing member tapes 61 when the membrane reinforcing member tapes 61 are joined to the polymer electrolyte membrane sheet 41*a*.

As above, the PEFC according to Embodiment 1 can adequately prevent the damage of the polymer electrolyte membrane and the occurrence of cross leakage of the reactant gas, and can be mass-produced at low cost.

Embodiment 2

Figure 12:
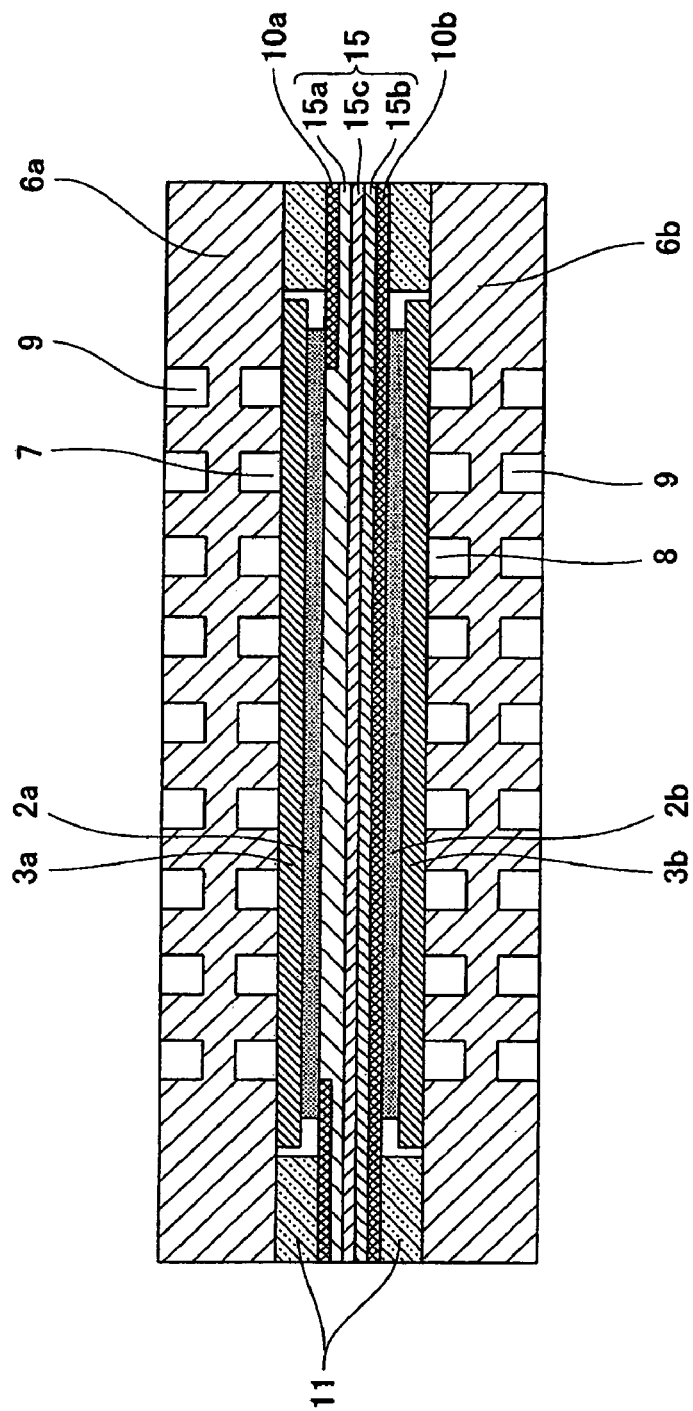
FIG. 12 is a schematic diagram showing a schematic configuration of the cell of the PEFC according to Embodiment 2 of the present invention.
Figure 13:
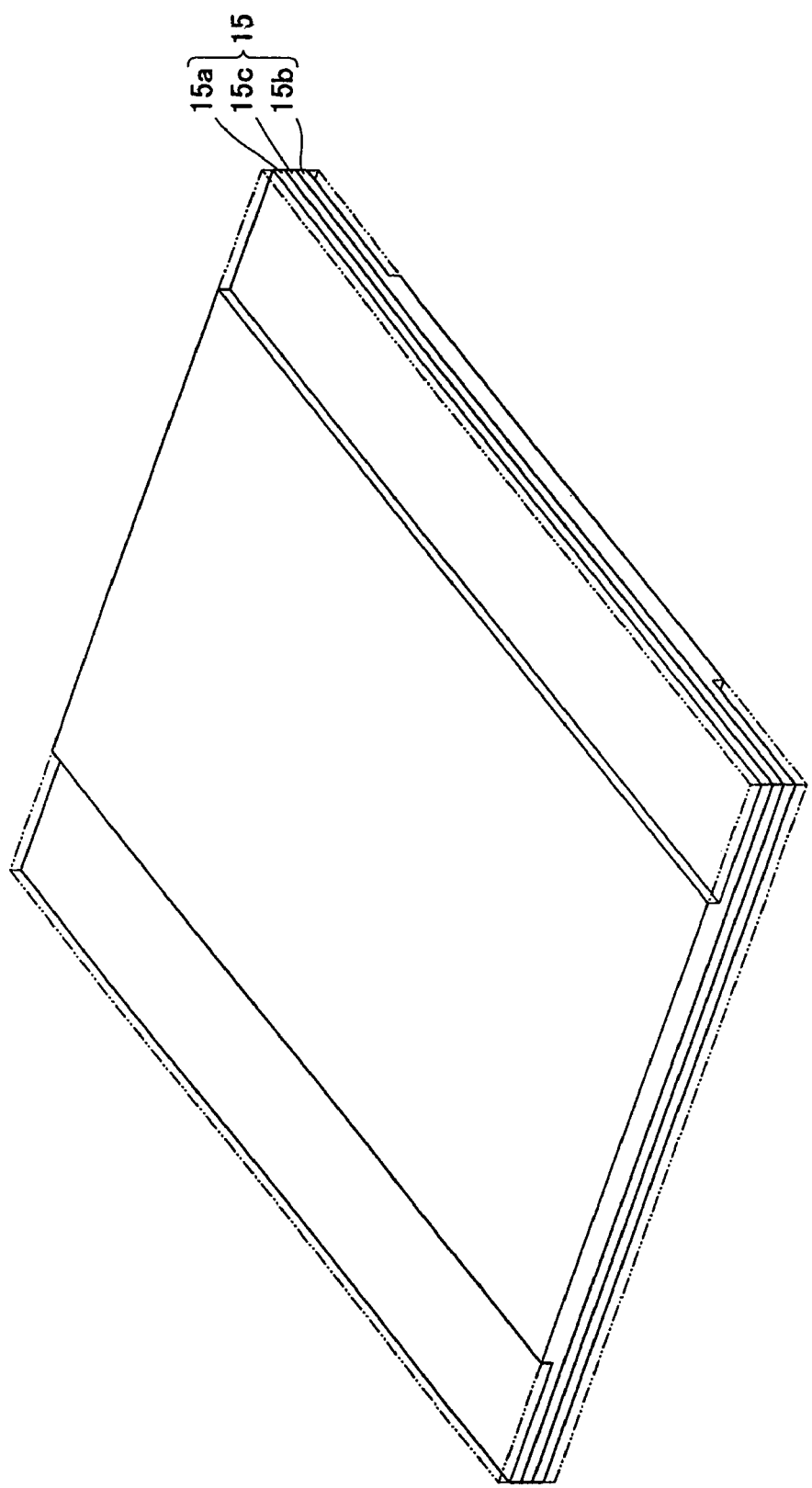
FIG. 13 is a schematic diagram showing a schematic configuration of a polymer electrolyte membrane-inner reinforcing membrane complex of the cell shown in FIG. 12.

FIG. 12 is a schematic diagram showing a schematic configuration of the cell of the PEFC according to Embodiment 2 of the present invention. FIG. 13 is a schematic diagram showing a schematic configuration of a polymer electrolyte membrane-inner reinforcing membrane complex of the cell shown in FIG. 12.

The PEFC according to Embodiment 2 of the present invention and the PEFC according to Embodiment 1 of the present invention are the same in basic configuration as each other, but are different from each other as below.

As shown in FIG. 12, instead of the polymer electrolyte membrane 1, the cell of the PEFC according to Embodiment 2 includes a polymer electrolyte membrane-inner reinforcing membrane complex 15. Note that "polymer electrolyte membrane" recited in claims includes the polymer electrolyte membrane-inner reinforcing membrane complex 15. The polymer electrolyte membrane-inner reinforcing membrane complex 15 includes a pair of small piece-like polymer electrolyte membranes 15*a* and 15*b* and a small piece-like inner reinforcing membrane 15*c*. The polymer electrolyte membranes 15*a* and 15*b* are disposed such that main surfaces thereof are opposed to each other. Concave portions are formed on each of the polymer electrolyte membranes 15*a* and 15*b* to extend along a pair of opposed sides, respectively, of each of the polymer electrolyte membranes 15*a* and 15*b*. The concave portions of the polymer electrolyte membrane 15*a* and the concave portions of the polymer electrolyte membrane 15*b* are formed in a parallel-cross manner when viewed from a thickness direction (normal direction). The inner reinforcing membrane 15*c* is sandwiched between the polymer electrolyte membranes 15*a* and 15*b*.

Next, the inner reinforcing membrane 15*c* will be explained in more detail in reference to FIG. 14.

Figure 14:
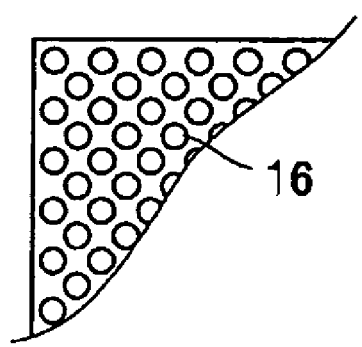
FIG. 14 is a schematic diagram showing a schematic configuration of an inner reinforcing membrane of the polymer electrolyte membrane-inner reinforcing membrane complex shown in FIG. 13.
Figure 15:
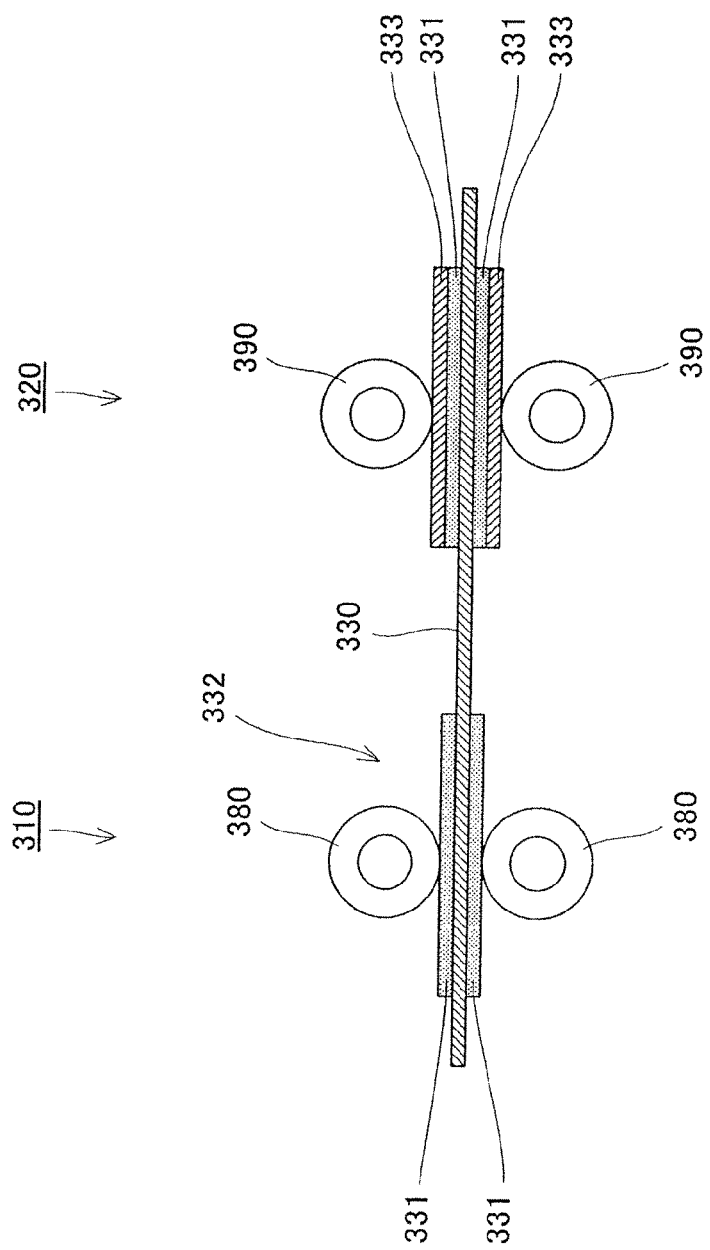
FIG. 15 is a schematic diagram showing an outline of a cell manufacturing step (a catalyst layer applying step and a diffusion layer integrating step) disclosed in Patent Document 1.

FIG. 14 is a schematic diagram showing a schematic configuration of the inner reinforcing membrane 15*c* of the polymer electrolyte membrane-inner reinforcing membrane complex 15 shown in FIG. 13. In FIG. 14, a part of the inner reinforcing membrane 15*c* is omitted.

As shown in FIG. 14, the inner reinforcing membrane 15*c* has a plurality of openings (through holes) 16 penetrating the inner reinforcing membrane 15*c* in the thickness direction. The openings 16 are filled with polymer electrolyte which is the same as or different from the polymer electrolyte of the polymer electrolyte membranes 15*a* and 15*b*. It is preferable that an area ratio (opening degree) of the openings 16 to the main surface of the inner reinforcing membrane 15c be 50% to 90%. If the opening degree is set to 50% or more, adequate ion electrical conductivity can be obtained easily. Meanwhile, if the opening degree is set to 90% or less, adequate mechanical strength of the inner reinforcing membrane 15c can be obtained easily. The opening 16 of the inner reinforcing membrane 15c may be a very fine hole (having a pore diameter of several tens of μm for example). Even in this case, it is preferable that the opening degree (porosity) be 50% to 90% due to the same reason as above.

The inner reinforcing membrane 15c may be a resin film or an extended porous film (not shown: for example, Product Name "Gore-Select (II)" manufactured by Japan Gore-Tex Inc.).

In light of the chemical stability and the mechanical stability, the resin constituting the inner reinforcing membrane 15c is preferably at least one synthetic resin selected from the group consisting of polytetrafluoroethylene, fluoroethylene-propylene copolymer, tetrafluoroethylene-perfluoro alkoxy ethylene copolymer, polyethylene, polypropylene, polyether amide, polyether imide, polyether ether ketone, polyether sulfone, polyphenylene sulfide, polyarylate, polysulfide, polyimide, and polyimide amide.

Moreover, the inner reinforcing membrane 15c may be configured such that at least one of fibrous reinforcing body particles and spherical reinforcing body particles are contained in a plate-like polymer electrolyte membrane to increase the strength of the polymer electrolyte membrane. One example of the constituent material of the reinforcing body particles is the resin constituting the inner reinforcing membrane 15c.

The method for manufacturing the polymer electrolyte membrane-inner reinforcing membrane complex 15 is not especially limited, and the polymer electrolyte membrane-inner reinforcing membrane complex 15 can be manufactured by using a known thin film manufacturing technique. The cell of the PEFC can be manufactured by the same method as the above cell except that the polymer electrolyte membrane-inner reinforcing membrane complex 15 is used.

Embodiment 3

The PEFC according to Embodiment 3 of the present invention is the same in basic configuration as the PEFC according to Embodiment 1 of the present invention. However, the configurations of the membrane-membrane reinforcing member assembly and the membrane-catalyst layer assembly are different as below.

First, the configuration of the membrane-membrane reinforcing member assembly will be explained in reference to FIGS. 20 and 21.

Figure 20:
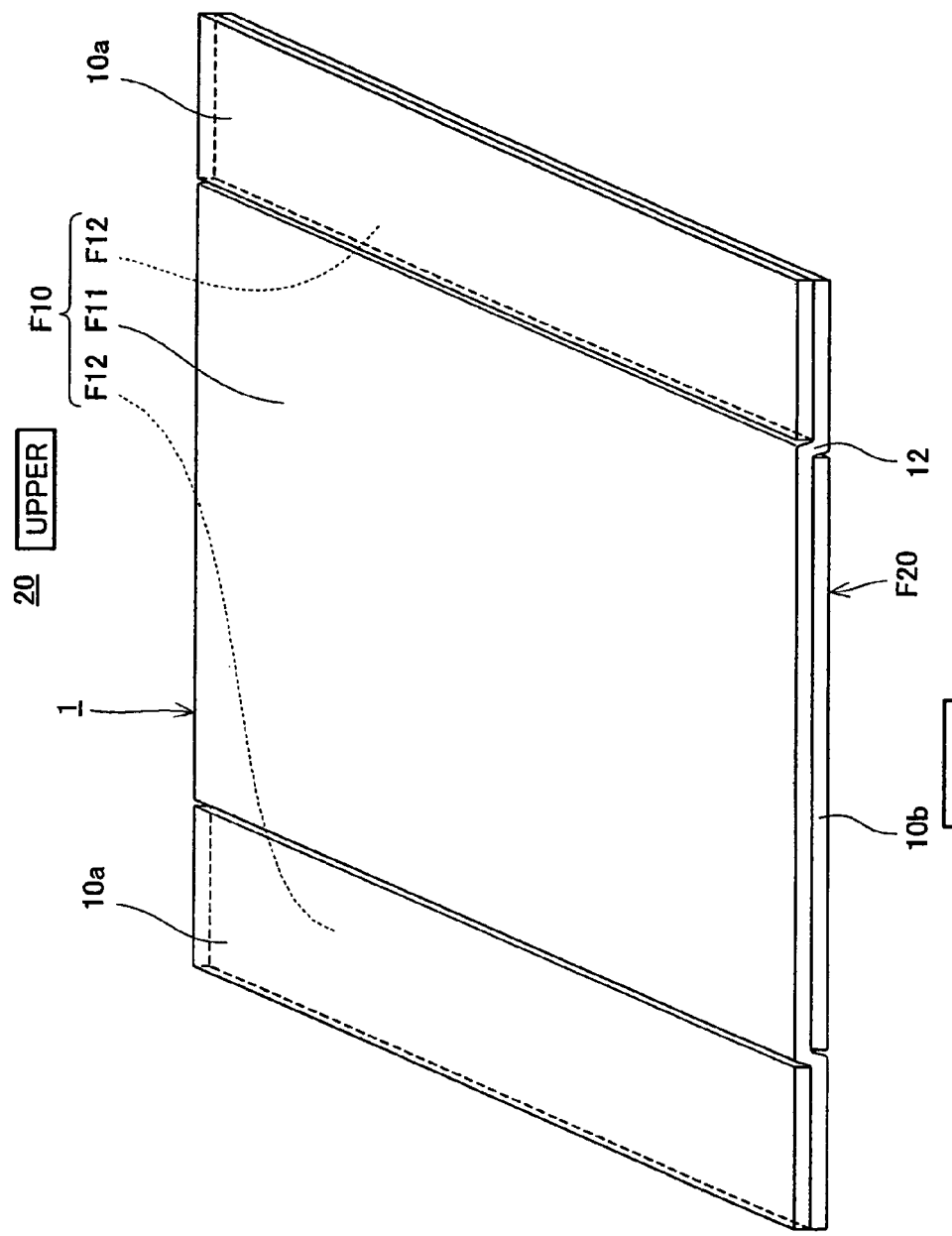
FIG. 20 is a perspective view schematically showing the membrane-membrane reinforcing member assembly in the polymer electrolyte fuel cell according to Embodiment 3 of the present invention when viewed obliquely from above.

FIG. 20 is a perspective view schematically showing the membrane-membrane reinforcing member assembly in the PEFC according to Embodiment 3 of the present invention when viewed obliquely from above. FIG. 21 is a perspective view schematically showing the membrane-membrane reinforcing member assembly 20 shown in FIG. 20 when viewed obliquely from below. In FIG. 20, a vertical direction of the membrane-membrane reinforcing member assembly 20 is shown as a vertical direction of the drawing.

As shown in FIG. 20, the polymer electrolyte membrane 1 is formed to have a substantially square (herein, rectangular) shape, includes a first main surface F10 and a second main surface F20 which are opposed to each other, and is bent in a step shape to have step portions 12. The first main surface F10 includes a substantially rectangular upper level surface F11 and a pair of substantially rectangular lower level surfaces F12. The lower level surfaces F12 are configured to extend along a pair of opposed sides, respectively, of four sides of the first main surface F10 over the entire lengths of the opposed sides. The upper level surface F11 is configured to be located higher than the lower level surfaces F12 by the height of the step portion 12.

Figure 21:
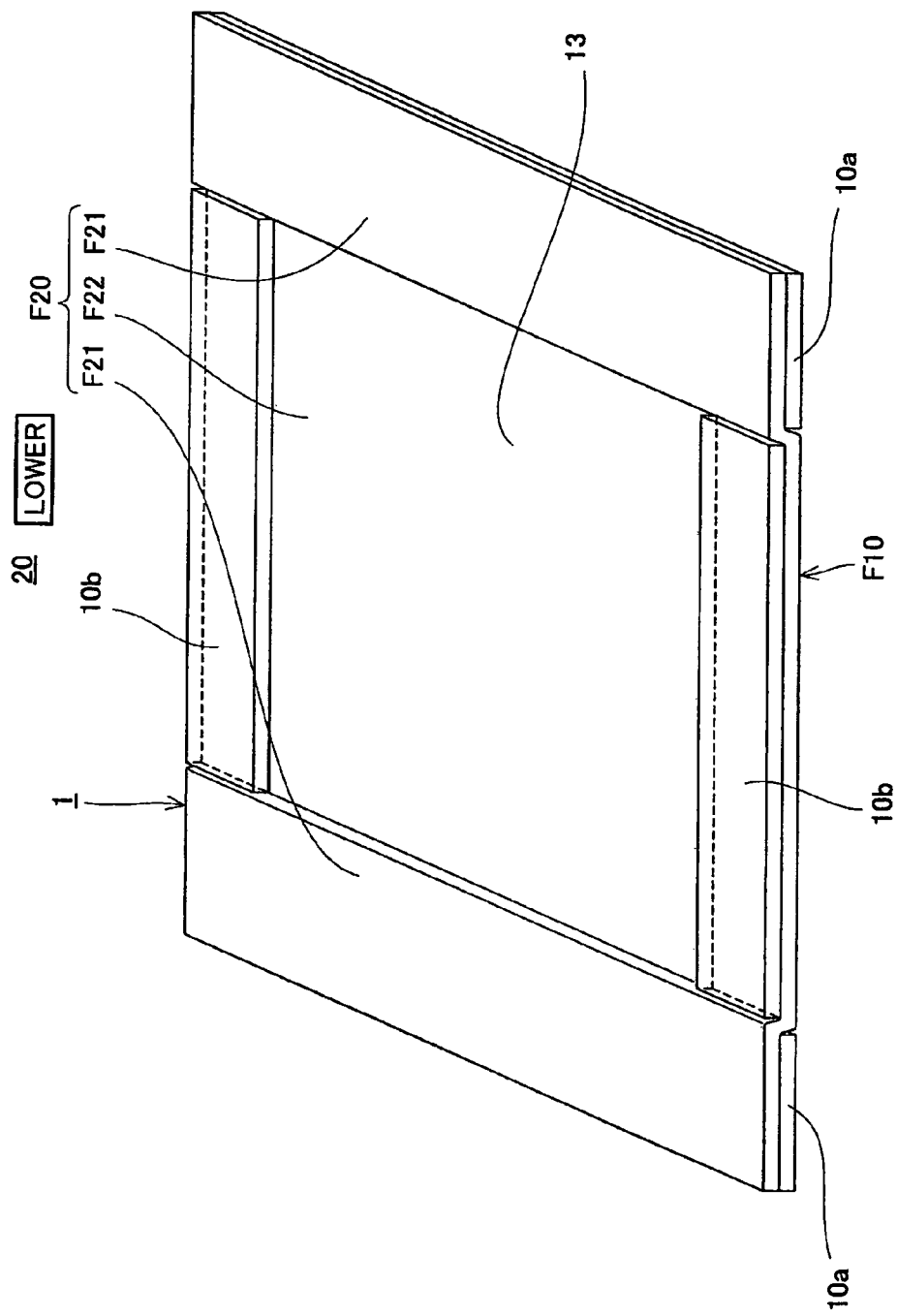
FIG. 21 is a perspective view schematically showing the membrane-membrane reinforcing member assembly shown in FIG. 20 when viewed obliquely from below.

Moreover, as shown in FIG. 21, the second main surface F20 includes lower level surfaces F21 and an upper level surface F22. A rear surface of the upper level surface F11 of the first main surface F10 is the upper level surface F22 of the second main surface F20. A rear surface of the lower level surface F12 of the first main surface F10 is the lower level surface F21 of the second main surface F20.

As above, the polymer electrolyte membrane 1 is configured such that the lower level surface F12 of the first main surface F10 is concave with respect to the upper level surface F11, and the upper level surface F22 of the second main surface F20 is concave with respect to the lower level surface F21.

Then, the first membrane reinforcing members 10a each having a substantially rectangular membrane-like shape are disposed on the lower level surfaces F12, respectively, of the first main surface F10, and the second membrane reinforcing members 10b each having a substantially rectangular membrane-like shape are disposed on the upper level surface F22 of the second main surface F20 so as to extend a pair of sides of the second main surface F20 such that both ends of each of the second membrane reinforcing members 10b contact the step portions 12, respectively, of the polymer electrolyte membrane 1. As above, the first membrane reinforcing members 10a and the second membrane reinforcing members 10b are disposed to extend along four sides, respectively, of the polymer electrolyte membrane 1 and surround a peripheral portion of the polymer electrolyte membrane 1 as a whole.

The polymer electrolyte membrane 1 is bent such that the upper level surface F11 of the first main surface F10 is flush with main surfaces of the first membrane reinforcing members 10a which surfaces are opposite to main surfaces contacting the polymer electrolyte membrane 1, and the lower level surfaces F21 of the second main surface F20 are flush with main surfaces of the second membrane reinforcing members 10b which surfaces are opposite to main surfaces contacting the polymer electrolyte membrane 1. Moreover, the polymer electrolyte membrane 1 is configured such that the size of a gap portion, at which the step portion 12 is formed, between a width-direction end surface of the first membrane reinforcing member 10a and a longitudinal-direction end surface of the second membrane reinforcing member 10b is substantially the same as the thickness of the polymer electrolyte membrane 1.

Here, being flush with each other denotes being located on a substantially same flat plane. That is, at least, the upper level surface F11 of the polymer electrolyte membrane 1 and the main surfaces of the first membrane reinforcing members 10a may be substantially the same in height as one another, and the gap may be formed between the upper level surface F11 of the polymer electrolyte membrane 1 and each of the main surfaces of the first membrane reinforcing members 10a. Similarly, at least, the lower level surface F21 of the polymer electrolyte membrane 1 and the main surfaces of the second membrane reinforcing members 10b may be substantially the same in height as one another, and the gap may be formed between the lower level surface F21 of the polymer electrolyte membrane 1 and each of the main surfaces of the second membrane reinforcing members 10b.

With this, the pressure applied to the main surfaces of the first membrane reinforcing members 10a and the pressure applied to the main surface F10 (to be precise, the upper level surface F11 of the main surface F10) of the polymer electrolyte membrane 1 when fastening the fuel cell (cell stack) can be equalized, and the pressure applied to the main surfaces of the second membrane reinforcing members 10b and the pressure applied to the main surface F20 (to be precise, the lower level surfaces F21 of the main surface F20) of the polymer electrolyte membrane 1 when fastening the fuel cell (cell stack) can be equalized.

Next, the membrane-catalyst layer assembly according to Embodiment 3 will be explained in reference to FIGS. 22 to 24.

Figure 22:
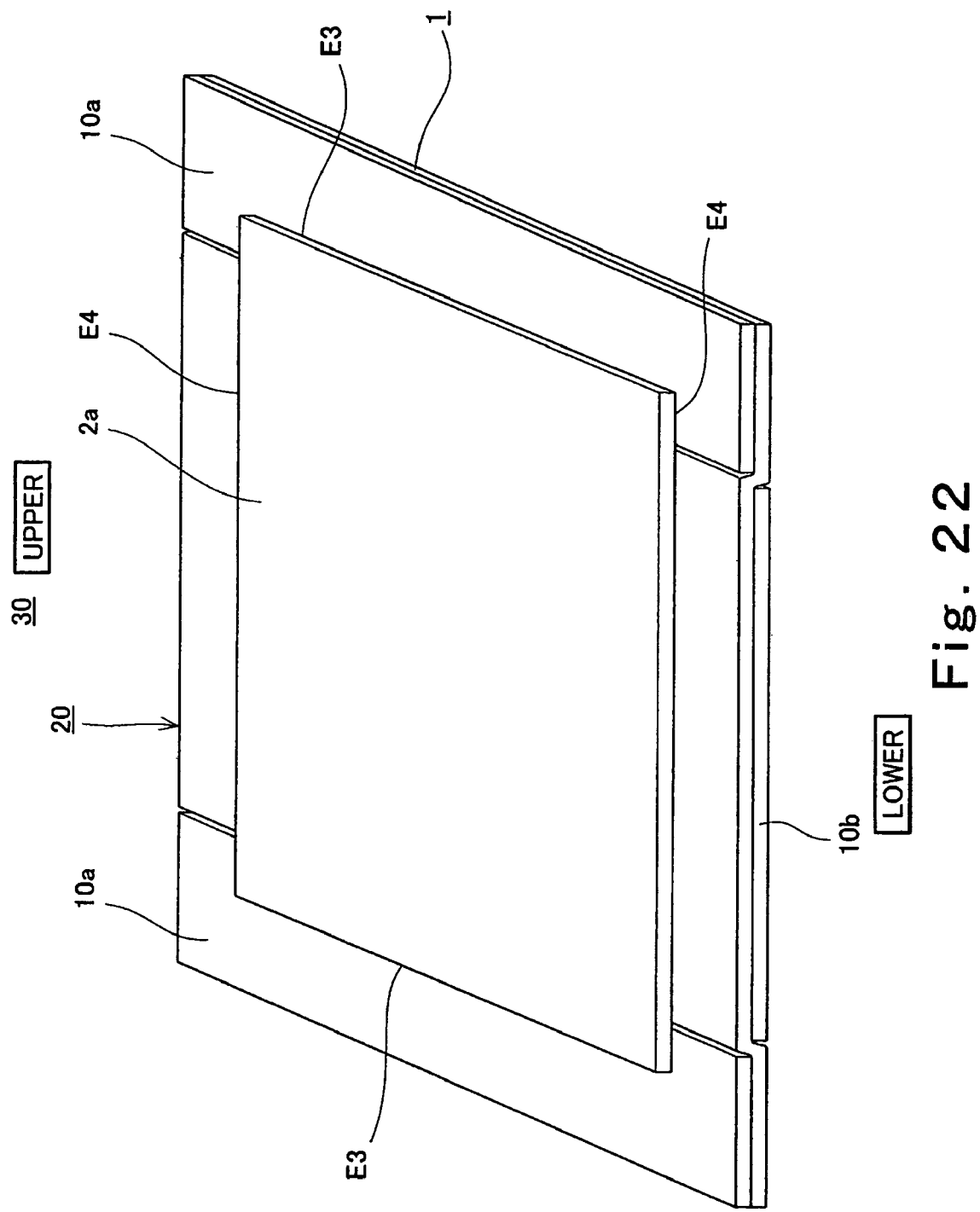
FIG. 22 is a perspective view schematically showing the membrane-catalyst layer assembly according to Embodiment 3 when viewed obliquely from above.

FIG. 22 is a perspective view schematically showing the membrane-catalyst layer assembly according to Embodiment 3 when viewed obliquely from above. FIG. 23 is a schematic diagram schematically showing the membrane-catalyst layer assembly shown in FIG. 22 when viewed obliquely from below. FIG. 24 is a cross-sectional view taken along line XXIV-XXIV of the membrane-catalyst layer assembly shown in FIG. 23. In FIG. 22, a vertical direction of the membrane-catalyst layer assembly 30 is shown as a vertical direction of the drawing.

Figure 23:
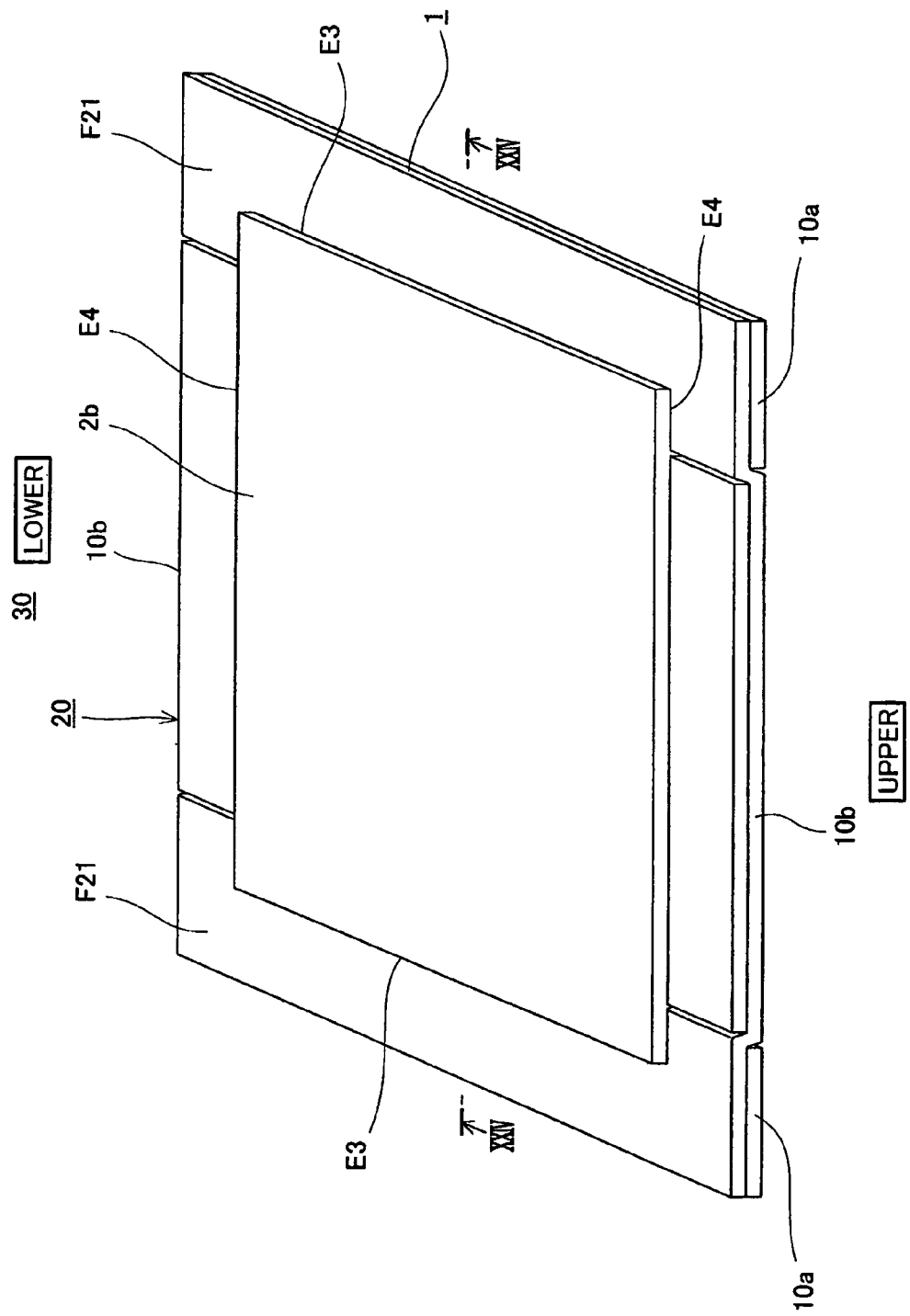
FIG. 23 is a schematic diagram schematically showing the membrane-catalyst layer assembly shown in FIG. 22 when viewed obliquely from below.

As shown in FIGS. 22 and 23, the membrane-catalyst layer assembly 30 includes the membrane-membrane reinforcing member assembly 20 and the catalyst layer 2 (the anode catalyst layer 2a and the cathode catalyst layer 2b).

Figure 24:
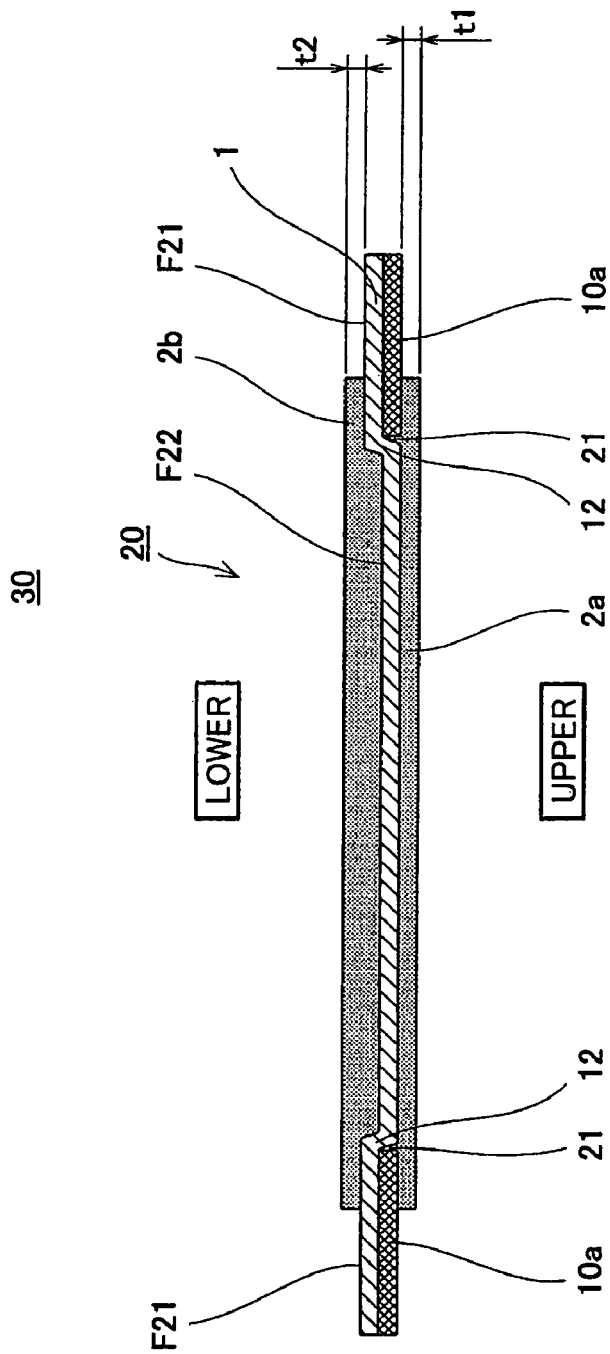
FIG. 24 is a cross-sectional view taken along line XXIII-XXIII of the membrane-catalyst layer assembly shown in FIG. 23.

As shown in FIGS. 22 and 24, the anode catalyst layer 2a is formed to fill gaps 21 between the step portion 12 of the polymer electrolyte membrane 1 and the first membrane reinforcing member 10a, and cover the upper level surface F11, where the first membrane reinforcing members 10a are not formed, of the first main surface F10 of the polymer electrolyte membrane 1 and a part of each of the main surfaces of the first membrane reinforcing members 10a.

Meanwhile, as shown in FIGS. 23 and 24, the cathode catalyst layer 2b is formed to fill a concave portion 13 (see FIG. 21) formed by the upper level surface F22 of the second main surface F20, the lower level surfaces F21 of the second main surface F20, and the second membrane reinforcing members 10b, and cover the lower level surfaces F21, where the second membrane reinforcing members 10b are not formed, of the second main surface F20 of the polymer electrolyte membrane 1 and a part of each of the main surfaces of the second membrane reinforcing members 10b.

Then, as shown in FIGS. 22 to 24, herein, the anode catalyst layer 2a and the cathode catalyst layer 2b are formed to have the same rectangular shape as the polymer electrolyte membrane 1, and are disposed such that peripheral portions thereof overlap the first membrane reinforcing members 10a and the second membrane reinforcing members 10b over the entire periphery when viewed from a thickness direction of the polymer electrolyte membrane 1. Moreover, a thickness (difference in height between the upper level surface F11 of the first main surface F10 and the main surface of the anode catalyst layer 2a) t1 of the anode catalyst layer 2a is substantially the same as a difference t2 in height between the lower level surface F21 of the second main surface F20 of the polymer electrolyte membrane 1 and the main surface of the cathode catalyst layer 2b.

Next, the reason why the polymer electrolyte membrane 1 of the MEA 5 in the PEFC according to Embodiment 1 is bent will be explained while comparing with Comparative Example 2.

COMPARATIVE EXAMPLE 2

Figure 25:
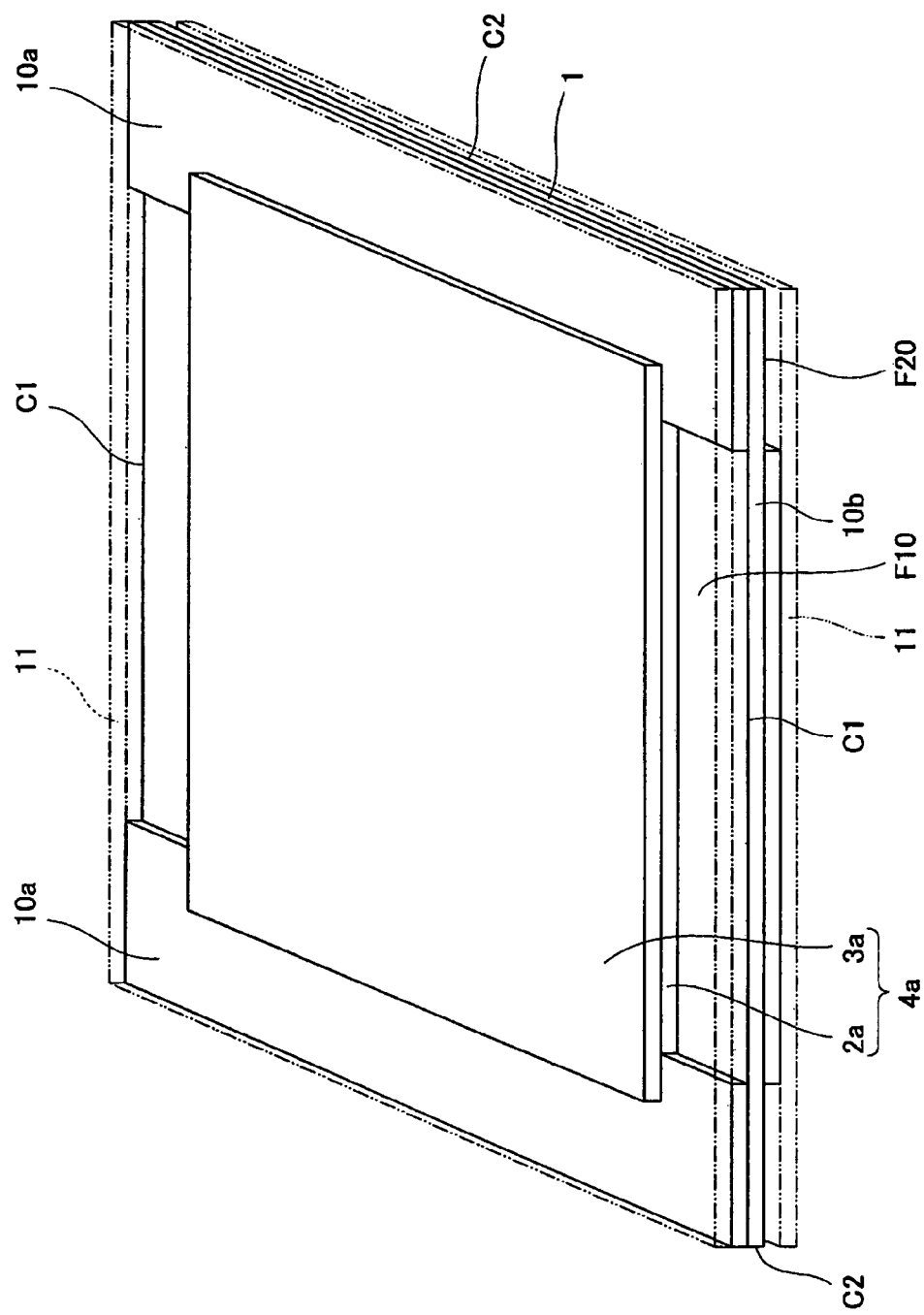
FIG. 25 is a schematic diagram showing a state where the polymer electrolyte membrane of the MEA is not bent (Comparative Example 2).

FIG. 25 is a schematic diagram showing a state where the polymer electrolyte membrane 1 of the MEA 5 is not bent (Comparative Example 2).

As shown in FIG. 25, since the polymer electrolyte membrane 1 of the MEA 5 of Comparative Example 2 is not bent, the main surfaces of the first membrane reinforcing members 10a are not flush with the first main surface F10 of the polymer electrolyte membrane 1, and the polymer electrolyte membrane 1 does not have a step portion. Therefore, in a case where the gasket 11 having a flat plate shape is disposed around the anode 4a of the MEA 5, gaps are formed at end portions (sides C1), where the first membrane reinforcing member 10a is not formed, of the first main surface F10 of the polymer electrolyte membrane 1. Similarly, gaps are formed at end portions (sides C2) of the second main surface F20 of the polymer electrolyte membrane 1. Therefore, in the case of constituting the PEFC using the MEA 5 of Comparative Example 2, the reactant gas leaks from the gaps to an outside of the PEFC, so that such PEFC is very low in efficiency. Moreover, although the leak of the reactant gas can be prevented by constituting the PEFC using the gasket 11 having a shape capable of filling the gap portions, the yield of the gasket 11 deteriorates, and the cost increases.

Therefore, in a case where the polymer electrolyte membrane 1 of the MEA 5 is bent as in the case of the PEFC according to Embodiment 3, the reactant gas can be prevented from leaking to the outside of the PEFC, and the PEFC can be manufactured at low cost.

Next, a method for manufacturing the cell in the PEFC according to Embodiment 3 will be explained.

Figure 26:
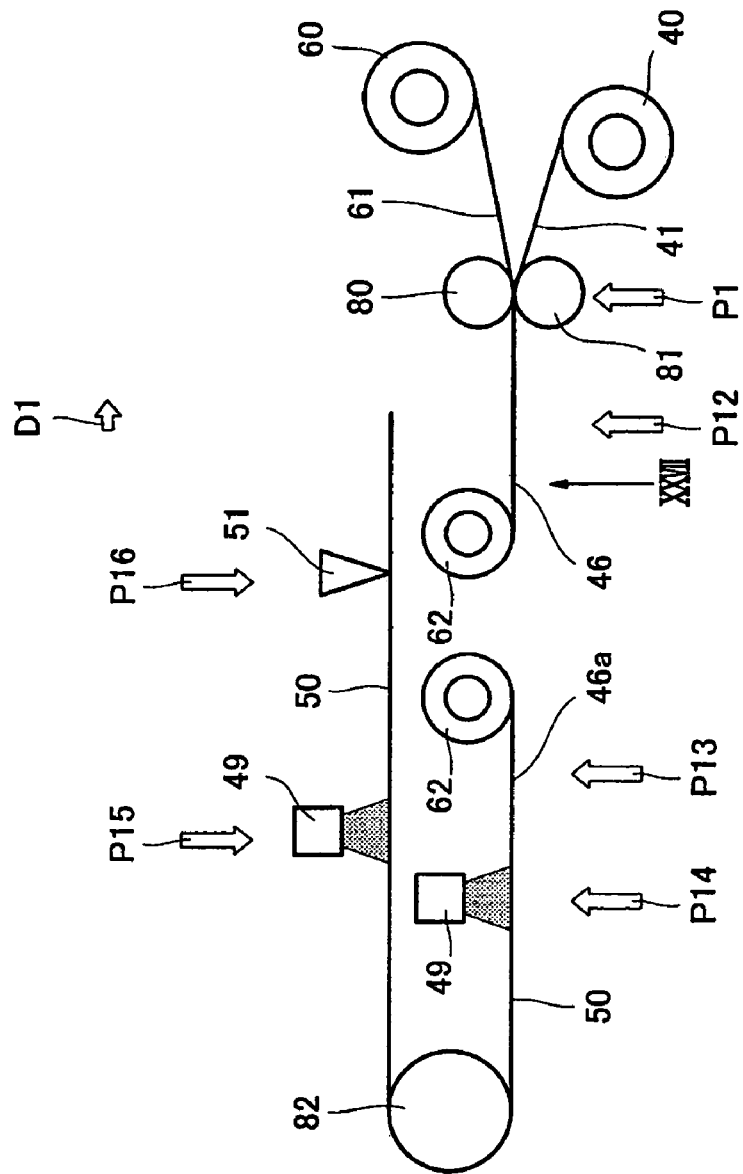
FIG. 26 is a schematic diagram schematically showing a part of a series of steps (treatment areas) of manufacturing the membrane-catalyst layer assembly shown in FIGS. 22 to 24, and a part of a manufacturing line for the membrane-catalyst layer assembly.

FIG. 26 is a schematic diagram schematically showing a part of a series of steps (treatment areas) of manufacturing the membrane-catalyst layer assembly 30 of the PEFC according to Embodiment 3 shown in FIGS. 22 to 24, and a part of a manufacturing line for the membrane-catalyst layer assembly 30.

As shown in FIG. 26, basically, the MEA in the cell of the PEFC according to Embodiment 3 is manufactured by the same manufacturing method as the MEA 5 in the cell of the PEFC according to Embodiment 1. However, a second step P12 and a third step P13 are carried out instead of the heat treatment step P2 and the thermocompression bonding step P3, and the membrane reinforcing member is joined to each of both surfaces of a polymer electrolyte membrane sheet 41. In addition, after the coating step P4, the membrane-catalyst layer sheet 50 turns by the roller 82. That is, the membrane-catalyst layer sheet 50 is turned over such that a rear surface thereof faces upward. Then, the catalyst layer 2 is formed on the rear surface of the membrane-catalyst layer sheet 50 (fifth step P15), and the membrane-catalyst layer sheet 50 is cut in a sixth step P16 such that each piece has a predetermined size. Thus, the membrane-catalyst layer assembly 30 shown in FIGS. 22 to 24 is obtained. Note that the fifth step P15 is the same as the coating step P4, and the sixth step P16 is the same as the cutting step P5, so that detailed explanations thereof are omitted.

Figure 27:
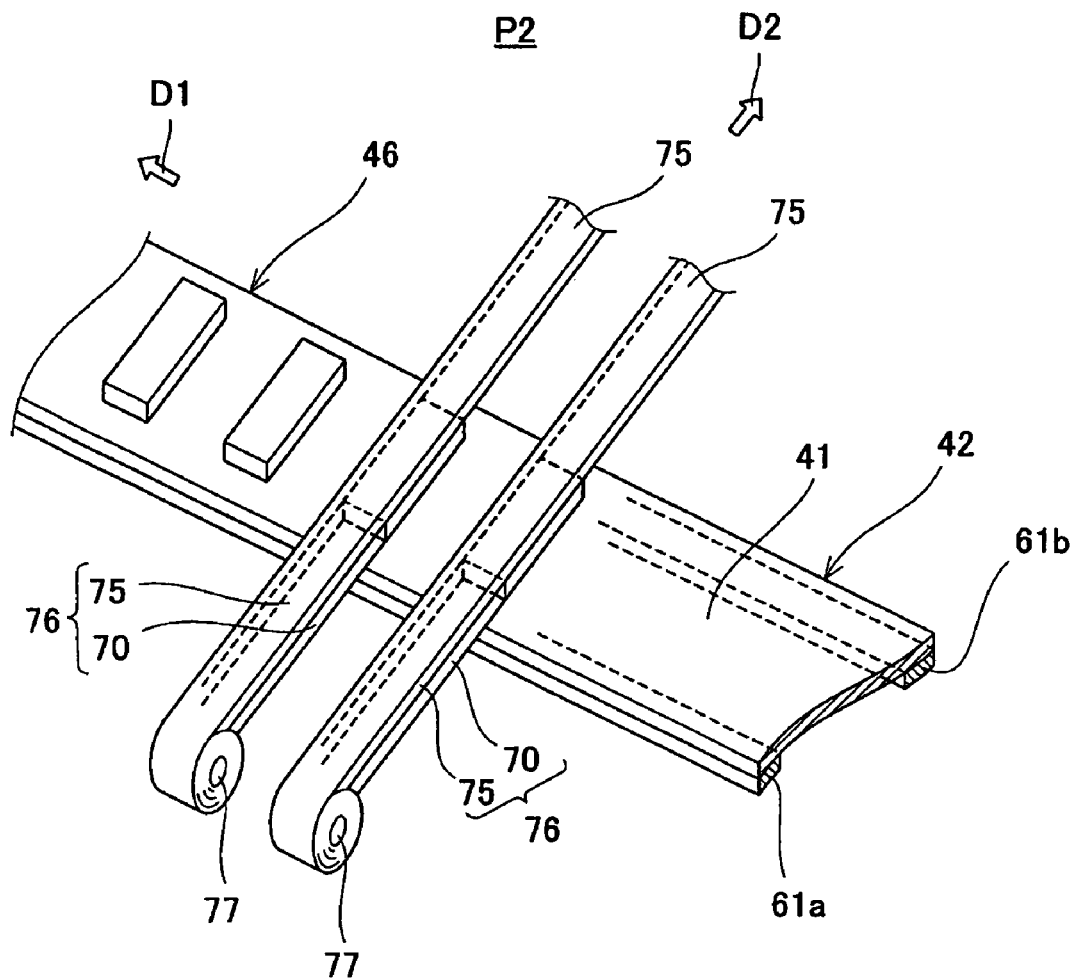
FIG. 27 is a schematic diagram for explaining a second step P2 in the step of manufacturing the membrane-catalyst layer assembly shown in FIG. 26.

FIG. 27 is a schematic diagram for explaining the second step P2 in the step of manufacturing the membrane-catalyst layer assembly 30 shown in FIG. 26, and is a diagram when viewed from a direction indicated by an arrow XXVII of FIG. 26.

First, the configuration of an area of the second step P2 will be explained.

As shown in FIG. 27, a pair of base material-membrane reinforcing member rolls 77 and two cutters, not shown, are disposed in the area of the second step P2. Each of the base material-membrane reinforcing member rolls 77 is formed by rolling a base material-membrane reinforcing member stack body 76 in which a second membrane reinforcing member tape 70 is stacked on a base material tape 75. The base material-membrane reinforcing member roll 77 is disposed such that a proceeding direction D2 of the base material-membrane reinforcing member stack body 76 pulled out from the base material-membrane reinforcing member roll 77 and the proceeding direction D1 of the membrane-membrane reinforcing member stack body 42 are perpendicular to each other. Moreover, the base material-membrane reinforcing member rolls 77 are disposed such that an interval therebetween in the direction D1 is set to a predetermined interval so as to be the same as the size of the cut polymer electrolyte membrane 1.

Next, the treatment of the second step P2 will be explained.

First, the membrane-membrane reinforcing member stack body 42 formed in the first step P1 proceeds to the area of the second step P2 and stops once. Then, the base material-membrane reinforcing member stack bodies 76 are pulled out in the proceeding direction D2 from the base material-membrane reinforcing member rolls 77 and stop once. Next, only the second membrane reinforcing member tapes 70 of the base material-membrane reinforcing member stack bodies 76 are cut by two cutters, not shown, such that each piece has a predetermined length (length corresponding to the second membrane reinforcing member 10b) from an end portion of the second membrane reinforcing member tape 70 of the base material-membrane reinforcing member stack body 76. At this time, the depth of cut by each of two cutters is adjusted to be the same as the thickness of the second membrane reinforcing member tape 70, so that the base material tape 75 of the base material-membrane reinforcing member stack body 76 is not cut. The base material tape 75 has an adequate mechanical strength (hardness, bendability) so as not to be cut by two cutters. Moreover, the second membrane reinforcing member tapes 70 are cut by two cutters herein, but may be cut by one cutter.

Next, the base material-membrane reinforcing member stack bodies 76 are further pulled out, and stop such that the main surfaces of the second membrane reinforcing member tapes 70 contact the rear surface of the membrane-membrane reinforcing member stack body 42. At this time, when viewed in the thickness direction of the membrane-membrane reinforcing member stack body 42, an end portion of the second membrane reinforcing member tape 70 is disposed to be spaced apart from an inner surface (surface opposed to the end portion of the second membrane reinforcing member tape 70 when viewed in the thickness direction of the membrane-membrane reinforcing member stack body 42) of a first the membrane reinforcing member tape 61b formed on the surface of the membrane-membrane reinforcing member stack body 42 by a distance slightly longer than the thickness of the second membrane reinforcing member tape 70. Then, the base material-membrane reinforcing member stack bodies 76 are subjected to a heat treatment by a pressing means, not shown, and is subjected to a pressure treatment so as not to be displaced with respect to the membrane-membrane reinforcing member stack body 42. With this, the polymer electrolyte membrane sheet 41 of the membrane-membrane reinforcing member stack body 42 and the second membrane reinforcing member tapes 70 of the base material-membrane reinforcing member stack bodies 76 are fusion-bonded to each other. Thus, a stack body of these members is fixed.

Next, the base material tape 75 is removed from the base material-membrane reinforcing member stack body 76 by a suitable means, and only the second membrane reinforcing member tape 70 (second membrane reinforcing member 10b) is fixed to the membrane-membrane reinforcing member stack body 42. Thus, the membrane-membrane reinforcing member assembly sheet 46 having a tape shape is formed. The membrane-membrane reinforcing member assembly sheet 46 formed as above moves in the proceeding direction D1. With this, the second membrane reinforcing members 10b are formed on the membrane-membrane reinforcing member assembly sheet 46 at predetermined intervals in a longitudinal direction of the membrane-membrane reinforcing member assembly sheet 46. Then, the membrane-membrane reinforcing member assembly sheet 46 is rolled. Thus, a membrane-membrane reinforcing member assembly roll 62 is formed.

Before carrying out the heat treatment by the pressing means, not shown, a pretreatment of applying an adhesive to the rear surfaces (contact surfaces) of the second membrane reinforcing member tapes 70 may be carried out. In this case, the pressure treatment may be carried out after the second membrane reinforcing member tape 70 is heated by the pressing means as described above, or only the pressure treatment may be carried out without heating the second membrane reinforcing member tape 70. Moreover, it is preferable that the adhesive does not deteriorate the battery characteristics. For example, it may be possible to use a dispersion medium or a solvent containing a polymer electrolyte material (shown above as the constituent material of the polymer electrolyte membrane 1) that is the same type as or different type (having an affinity so as to be able to be adequately integrated with the polymer electrolyte membrane sheet 41) from the polymer electrolyte membrane sheet 41.

Figure 28:
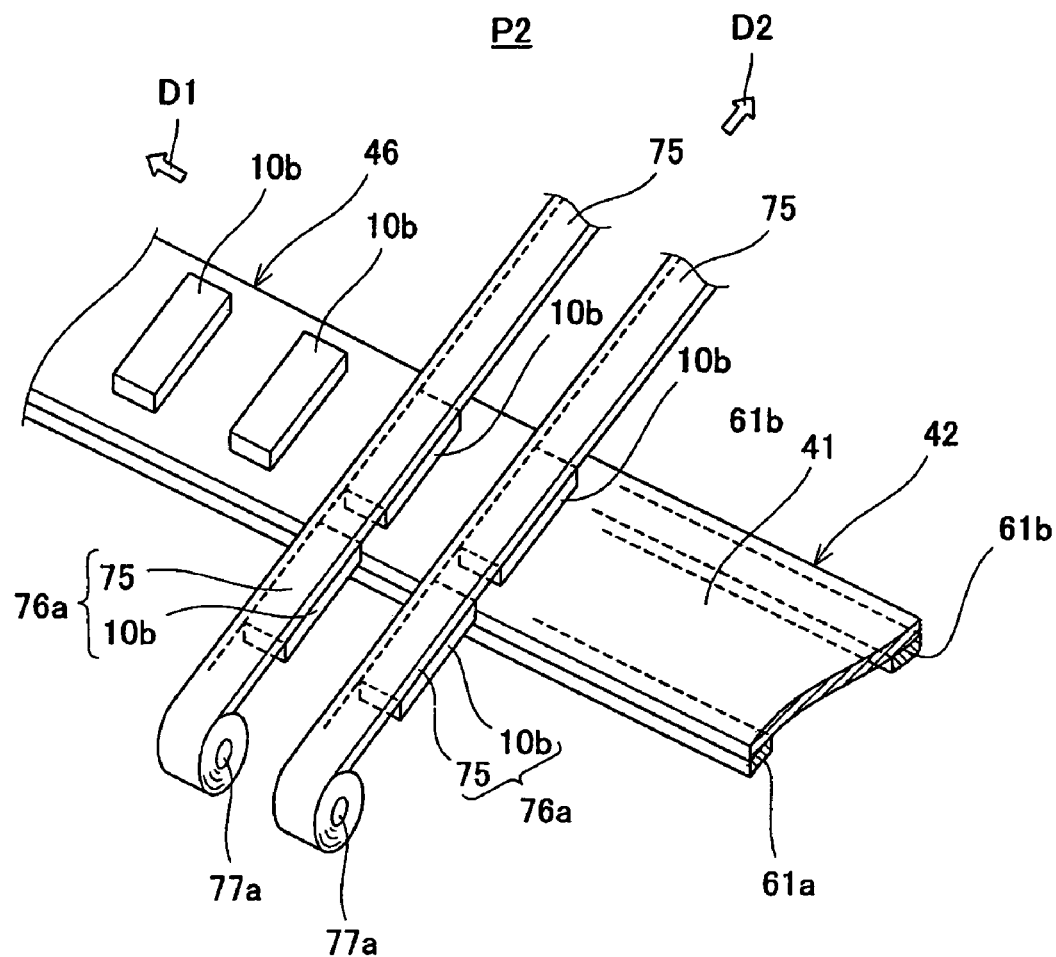
FIG. 28 is a schematic diagram showing yet another manufacturing method for forming the membrane-membrane reinforcing member assembly sheet.

Moreover, the membrane-membrane reinforcing member assembly sheet 46 may be formed as shown in FIG. 28.

FIG. 28 is a schematic diagram showing yet another manufacturing method for forming the membrane-membrane reinforcing member assembly sheet 46.

First, the second membrane reinforcing members 10b are stacked on the base material tape 75 at predetermined intervals to form a base material-membrane reinforcing member stack body 76a. Then, the base material-membrane reinforcing member stack body 76a is rolled to form a base material-membrane reinforcing member roll 77a. As described above, the base material-membrane reinforcing member rolls 77a are disposed. Then, the base material-membrane reinforcing member stack bodies 76a are pulled out such that the end portion of the second membrane reinforcing member 10b is located at a predetermined position, and stop once. Next, the second membrane reinforcing members 10b are fixed by the pressing means. Thus, the membrane-membrane reinforcing member assembly sheet 46 is formed. Note that the pretreatment of applying the adhesive as described above may be carried out for fixing the second membrane reinforcing members 10b.

Next, the third step P3 will be explained.

First, the membrane-membrane reinforcing member assembly sheet 46 is pulled out by the roller 82 in the proceeding direction D1 from the membrane-membrane reinforcing member assembly roll 62 formed in the second step P2. Next, the pressure treatment is carried out with respect to the membrane-membrane reinforcing member assembly sheet 46 by the pressing means, not shown, to bend the polymer electrolyte membrane sheet 41. Thus, a portion of the surface of the polymer electrolyte membrane sheet 41 on which portion the first membrane reinforcing member tapes 61a and 61b are not disposed becomes flush with the main surfaces of the first membrane reinforcing member tapes 61a and 61b. With this, a membrane-membrane reinforcing member assembly sheet 46a is formed. Herein, the membrane-membrane reinforcing member assembly sheet 46 is pulled out from the membrane-membrane reinforcing member assembly roll 62 and is subjected to the pressure treatment. However, without forming the membrane-membrane reinforcing member assembly roll 62 in the second step P2, the membrane-membrane reinforcing member assembly sheet 46 may be subjected to the pressure treatment to form the membrane-membrane reinforcing member assembly sheet 46*a*.

Then, the membrane-membrane reinforcing member assembly sheet 46*a* formed as above is subjected to the coating step P4, the fifth step P5, and the sixth step. Thus, the membrane-catalyst layer assembly 30 shown in FIGS. 22 to 24 is obtained.

The PEFC according to Embodiment 3 configured as above has the same operational advantages as the PEFC according to Embodiment 1.

Embodiment 4

Figure 29:
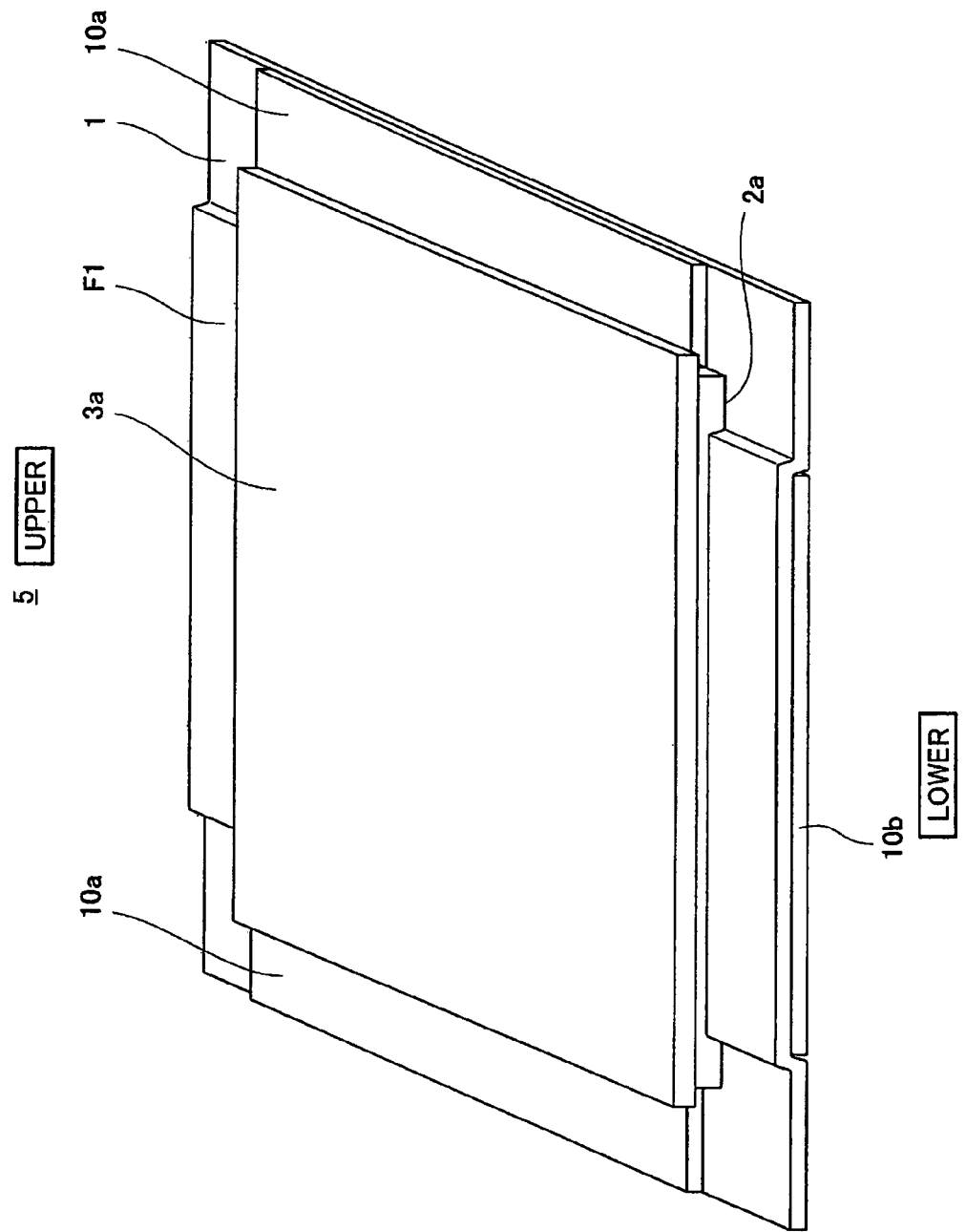
FIG. 29 is a schematic diagram showing a schematic configuration of the MEA in the cell of the polymer electrolyte fuel cell according to Embodiment 4 of the present invention.

FIG. 29 is a schematic diagram showing a schematic configuration of the MEA in the cell of the PEFC according to Embodiment 4 of the present invention.

The PEFC according to Embodiment 4 of the present invention and the PEFC according to Embodiment 3 of the present invention are the same in basic configuration as each other, but are different from each other as below.

As shown in FIG. 29, when viewed from the thickness direction of the polymer electrolyte membrane 1, in the MEA 5 in the cell of the PEFC according to Embodiment 2, the first membrane reinforcing members 10*a* and the second membrane reinforcing members 10*b* are disposed in the parallel-cross manner so as not to overlap each other. To prevent the damage of the polymer electrolyte membrane 1, it is preferable that the first and second membrane reinforcing members 10*a* and 10*b* be disposed such that non-overlap portions (four corner portions of the polymer electrolyte membrane 1) are small in size.

Since the first and second membrane reinforcing members 10*a* and 10*b* are not disposed at four corner portions of the polymer electrolyte membrane 1, the polymer electrolyte membrane 1 may be damaged. However, the first and second membrane reinforcing members 10*a* and 10*b* are disposed on the other portions of the polymer electrolyte membrane 1, and the membrane reinforcing members 10*a* and 10*b* prevent the pressure from being directly applied to the polymer electrolyte membrane 1. Therefore, the damage of the polymer electrolyte membrane 1 can be adequately prevented.

Moreover, the reactant gas (herein, a fuel gas) may leak to the outside from four corner portions where the upper level surface F11 of the first main surface F10 of the polymer electrolyte membrane 1 and the main surface of the first membrane reinforcing member 10*a* are not flush with each other. However, since the four corner portions are small in area, they are closed when the cell stack (PEFC) is fastened using the gasket 11. Therefore, the leak of the reactant gas can be adequately prevented.

Next, a method for manufacturing the MEA 5 in the cell of the PEFC according to Embodiment 4 will be explained.

Basically, the MEA 5 in the cell of the PEFC according to Embodiment 4 is manufactured by the same manufacturing method as the MEA 5 in the PEFC according to Embodiment 1. However, the bonding step P1 of the membrane-catalyst layer assembly 30 constituting the MEA 5 is different as below.

Figure 30:
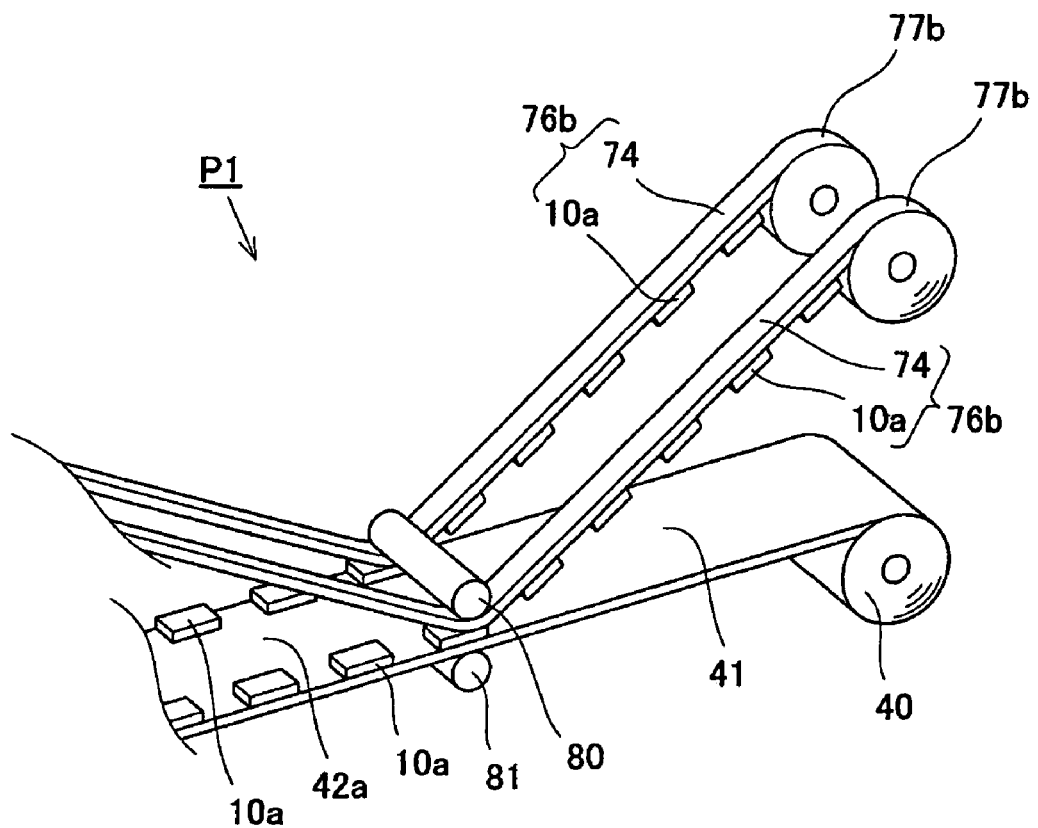
FIG. 30 is a schematic diagram for explaining a bonding step P1 in the step of manufacturing the membrane-catalyst layer assembly in the cell of the PEFC according to Embodiment 4.

FIG. 30 is a schematic diagram for explaining the bonding step P1 in the step of manufacturing the membrane-catalyst layer assembly 30 in the cell of the PEFC according to Embodiment 4.

First, the first membrane reinforcing members 10*a* are stacked on a base material tape 74 at predetermined intervals to form a base material-membrane reinforcing member stack body 76*b*. Then, the base material-membrane reinforcing member stack body 76*b* is rolled to form a base material-membrane reinforcing member roll 77*b*. As shown in FIG. 30, the polymer electrolyte membrane roll 40 and the base material-membrane reinforcing member rolls 77*b* are positioned such that the first membrane reinforcing members 10*a* are disposed at both side end portions, respectively, of the polymer electrolyte membrane sheet 41.

Next, the polymer electrolyte membrane sheet 41 is pulled out from the polymer electrolyte membrane roll 40, and the base material-membrane reinforcing member stack bodies 76*b* are pulled out from the base material-membrane reinforcing member rolls 77*b*. A stack body of the polymer electrolyte membrane sheet 41 and the base material-membrane reinforcing member stack bodies 76*b* is introduced into the thermocompression bonding device (not shown) including a pair of rollers 80 and 81. While the polymer electrolyte membrane sheet 41 and the base material-membrane reinforcing member stack bodies 76*b* proceed between the rollers 80 and 81 in the thermocompression bonding device in the proceeding direction D1, they are joined to each other. Thus, the base material-membrane reinforcing member stack bodies 76*b* (to be precise, the first membrane reinforcing members 10*a*) are fixed to the polymer electrolyte membrane sheet 41. Then, the base material tapes 74 are removed from the base material-membrane reinforcing member stack bodies 76*b* by a suitable means. Thus, a membrane-membrane reinforcing member stack body 42*a* having a tape shape is formed. Note that the pretreatment of applying the adhesive as described above may be carried out for fixing the first membrane reinforcing members 10*a*.

With this, when manufacturing the MEA 5, the first and second membrane reinforcing members 10*a* and 10*b* are easily positioned. In addition, since the polymer electrolyte membrane 1 can be bent even if the membrane reinforcing members 10*a* and 10*b* are slightly displaced, the cost of the PEFC can be further reduced.

Embodiment 5

Figure 31:
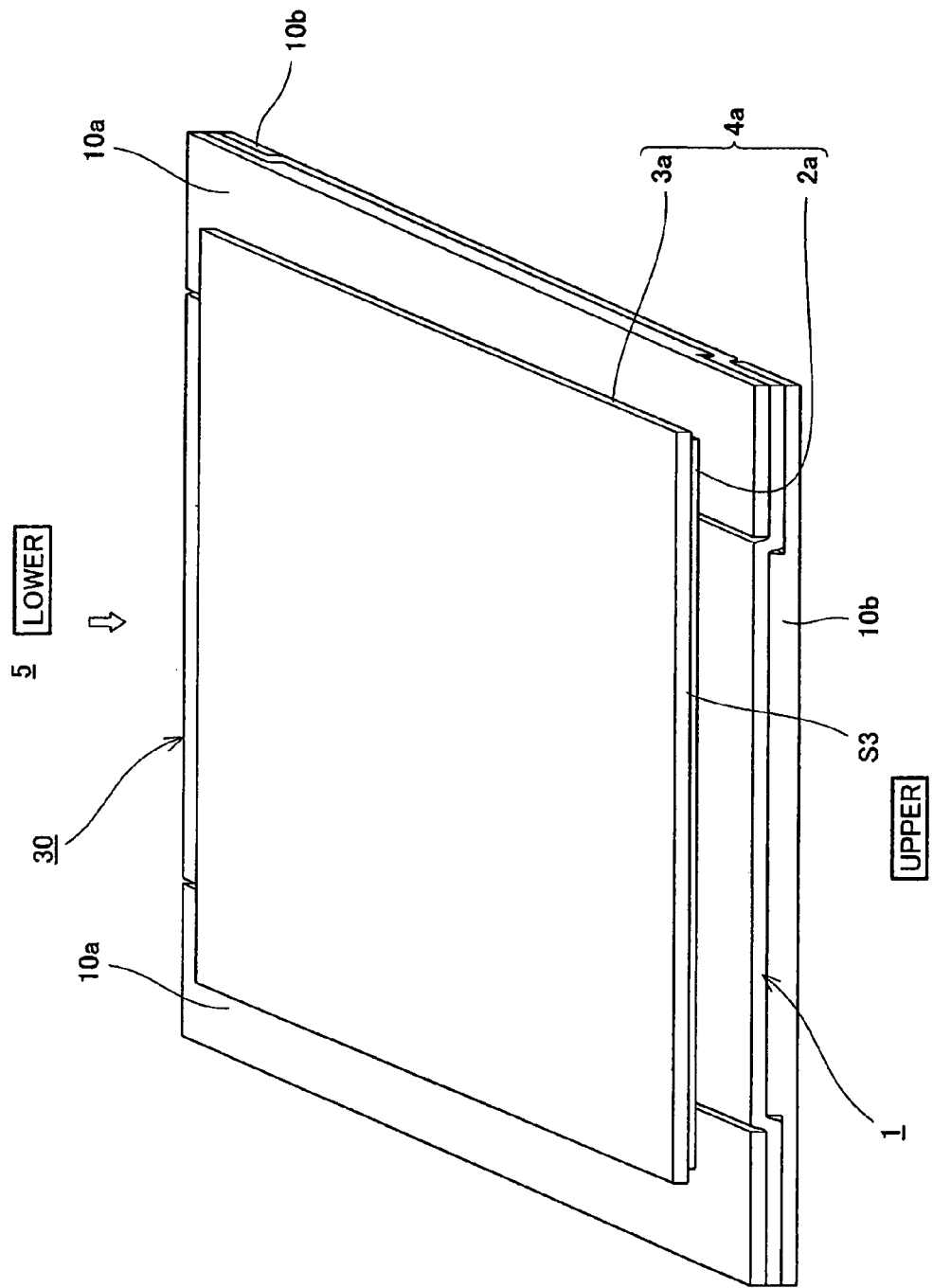
FIG. 31 is a perspective view schematically showing a schematic configuration of the MEA in the cell of the PEFC according to Embodiment 5 of the present invention.

FIG. 31 is a perspective view schematically showing a schematic configuration of the MEA in the cell of the PEFC according to Embodiment 5 of the present invention.

The PEFC according to Embodiment 5 of the present invention is the same in basic configuration as the PEFC according to Embodiment 1 of the present invention. The PEFC according to Embodiment 5 of the present invention is configured as below.

First, the configuration of the polymer electrolyte membrane 1 in the cell of the PEFC according to Embodiment 5 will be explained.

Figure 32:
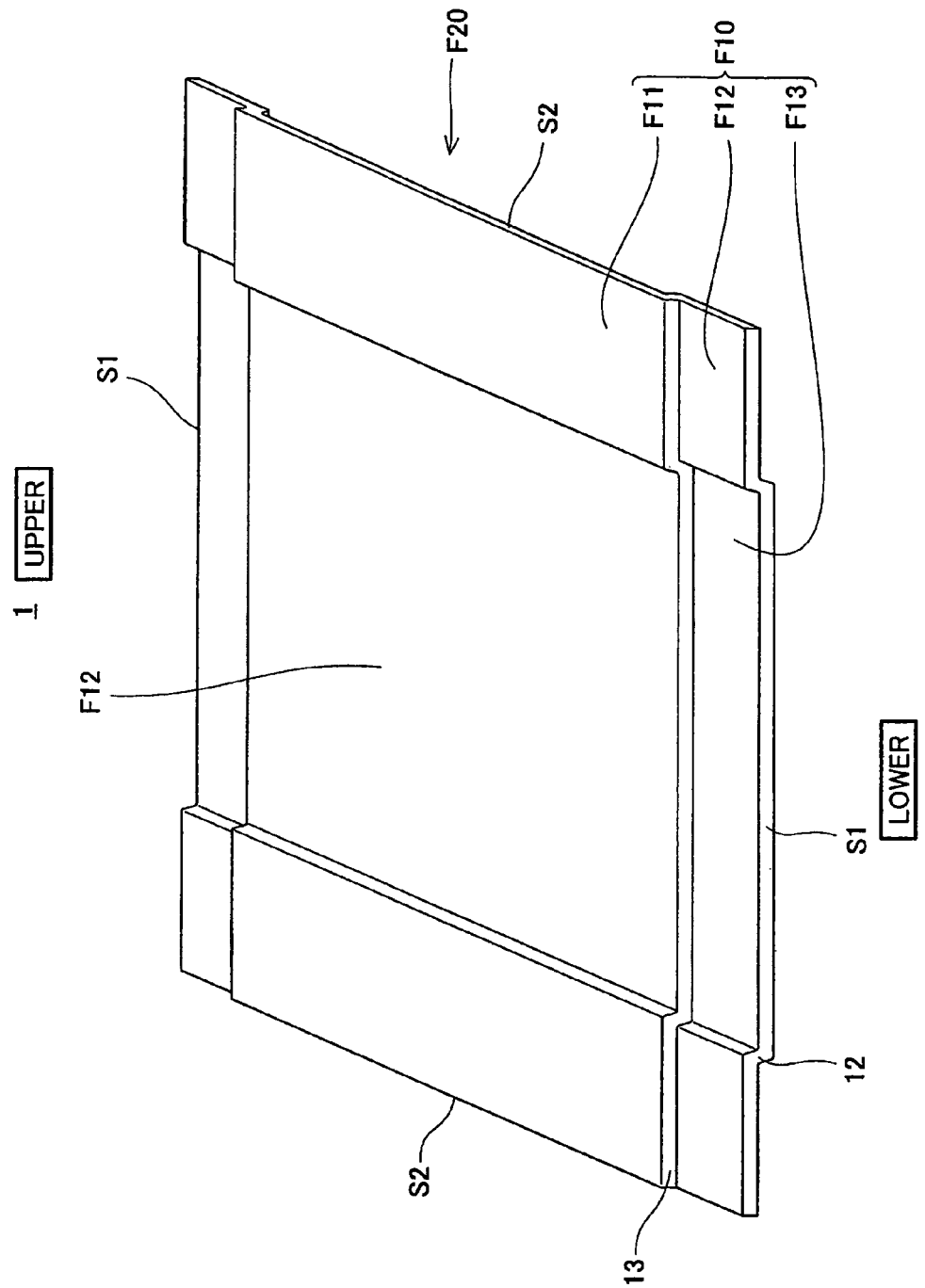
FIG. 32 is a perspective view schematically showing the polymer electrolyte membrane in the MEA shown in FIG. 31 when viewed obliquely from above.
Figure 33:
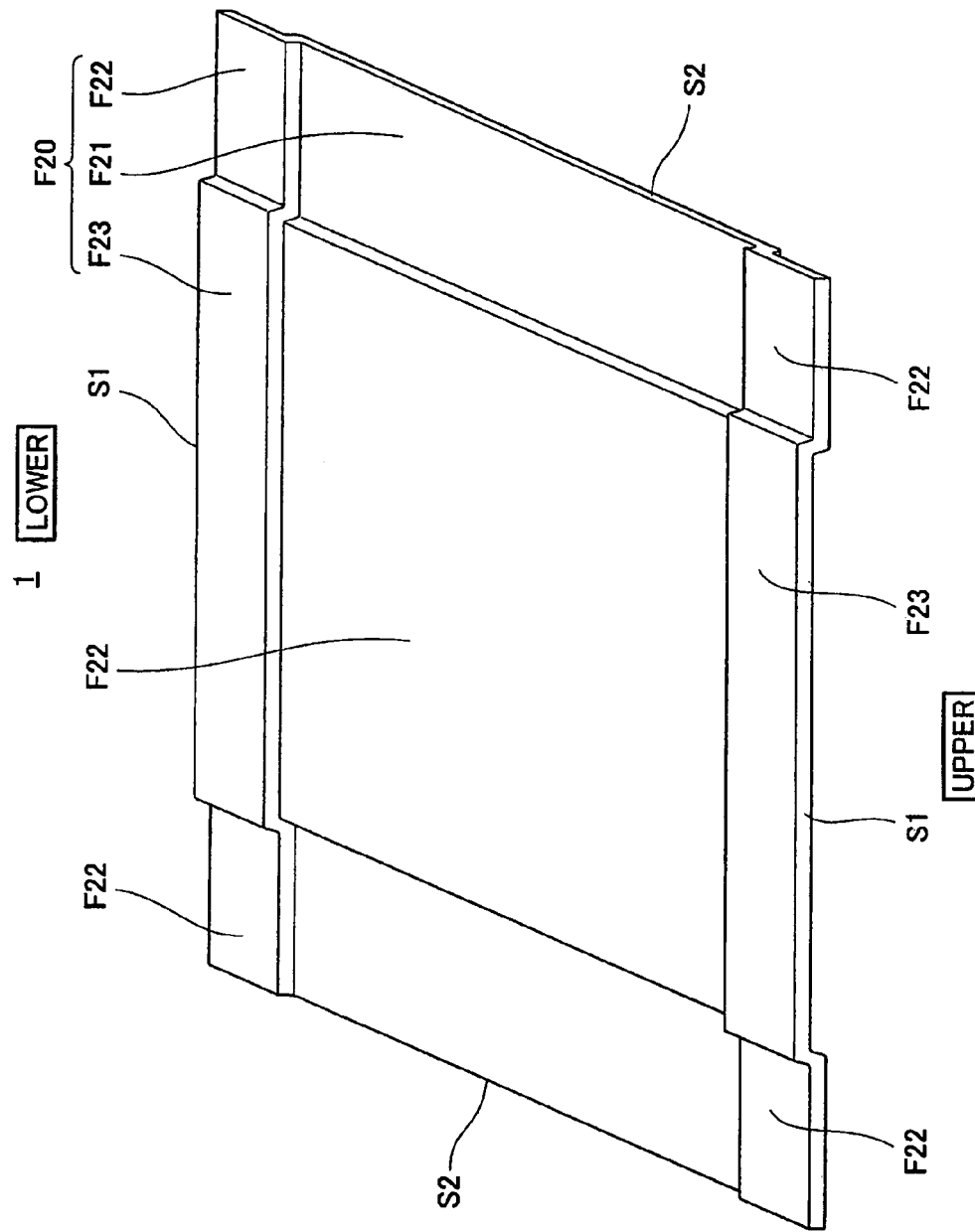
FIG. 33 is a perspective view schematically showing the polymer electrolyte membrane in the MEA shown in FIG. 31 when viewed obliquely from below.

FIG. 32 is a perspective view schematically showing the polymer electrolyte membrane 1 in the MEA 5 shown in FIG. 31 when viewed obliquely from above. FIG. 33 is a perspective view schematically showing the polymer electrolyte membrane 1 in the MEA 5 shown in FIG. 31 when viewed obliquely from below. In FIG. 32, a vertical direction of the polymer electrolyte membrane 1 is shown as a vertical direction of the drawing. In FIG. 33, the vertical direction of the polymer electrolyte membrane 1 in FIG. 32 is shown.

As shown in FIG. 32, the polymer electrolyte membrane 1 is formed to have a substantially square (herein, rectangular) shape, includes the first main surface F10 and the second main surface F20 which are opposed to each other, and is bent in a step shape to have step portions 12 and 13. The first main surface F10 includes substantially rectangular upper level surfaces F11, four substantially rectangular middle level surfaces F12, and a pair of substantially rectangular lower level surfaces F13. The lower level surfaces F13 extend along a pair of opposed sides S1, respectively, of four sides of the first main surface F10. Moreover, the middle level surfaces F12 are formed at both end portions of the lower level surface F13, and are located higher than the lower level surface F13 by the height of the step portion 12. The upper level surface F11 is formed between the lower level surfaces F13, and is located higher than the middle level surface F12 by the height of the step portion 13.

Moreover, as shown in FIG. 33, the second main surface F20 includes upper level surfaces F21, middle level surfaces F22, and lower level surfaces F23. A rear surface of the upper level surface F11 of the first main surface F10 is the upper level surface F21 of the second main surface F20. A rear surface of the middle level surface F12 of the first main surface F10 is the middle level surface F22 of the second main surface F20. A rear surface of the lower level surface F13 of the first main surface F10 is the lower level surface F23 of the second main surface F20.

As above, the polymer electrolyte membrane 1 is formed such that the middle level surface F12 and the lower level surface F13 are concave with respect to the upper level surface F11 on the first main surface F10, and the middle level surface F22 and the upper level surface F21 are concave with respect to the lower level surface F23 on the second main surface. It is preferable that the polymer electrolyte membrane 1 have extensibility so as to be bent as above.

Next, the membrane-membrane reinforcing member assembly 20 will be explained.

Figure 34:
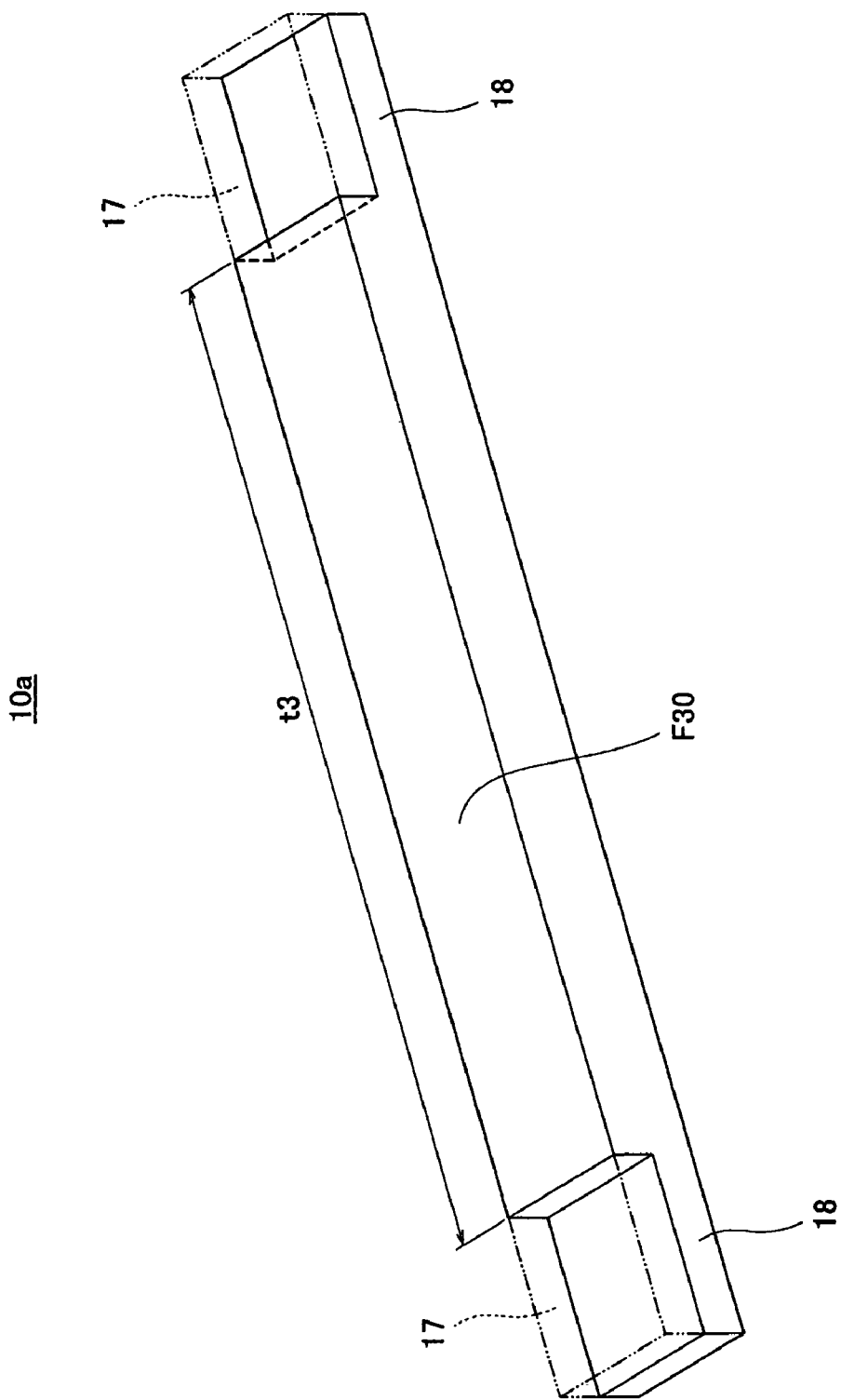
FIG. 34 is a perspective view schematically showing a first membrane reinforcing member in the MEA shown in FIG. 31 when viewed obliquely from above.
Figure 35:
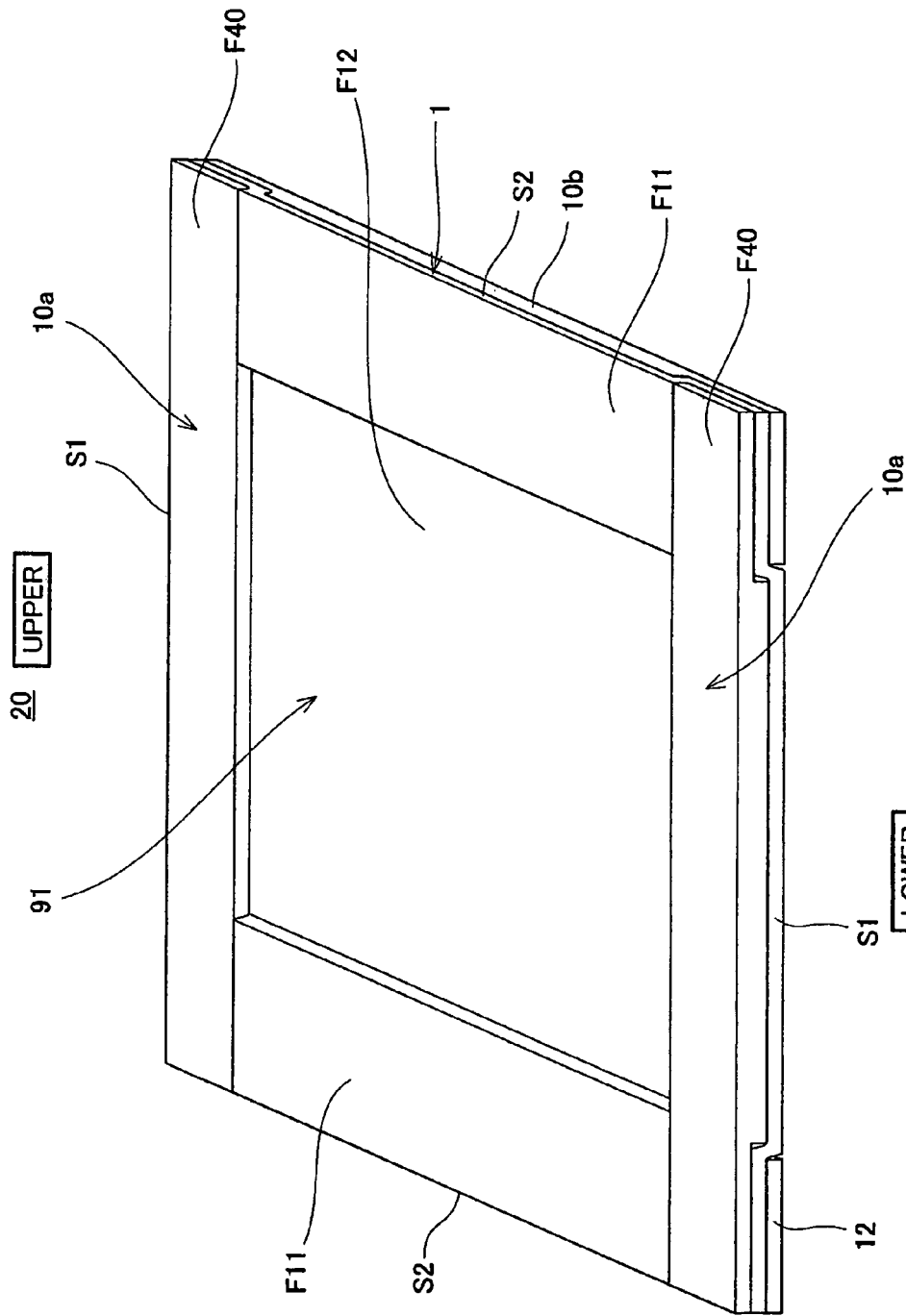
FIG. 35 is a perspective view schematically showing the membrane-membrane reinforcing member assembly in the MEA shown in FIG. 31 when viewed obliquely from above.
Figure 36:
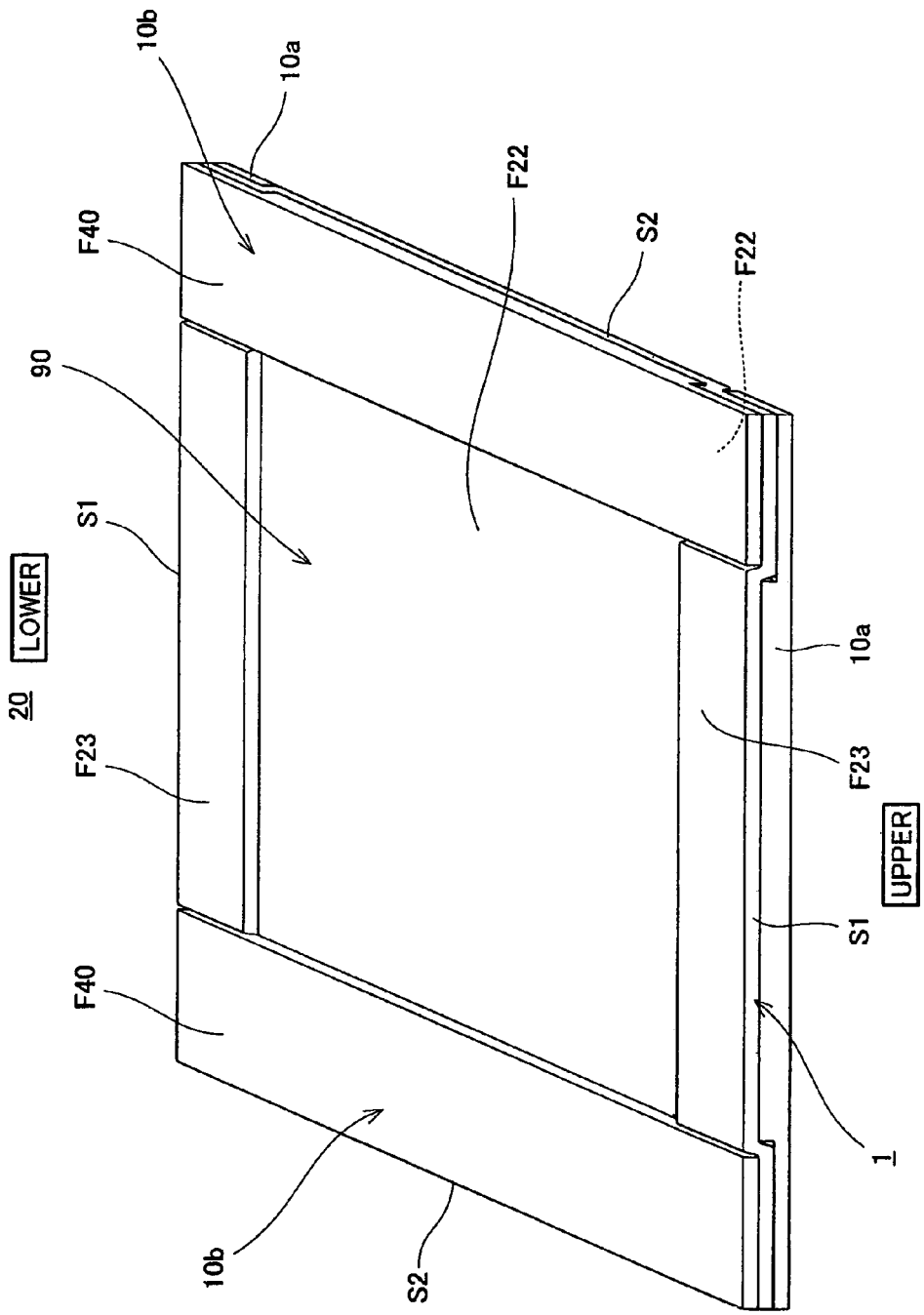
FIG. 36 is a perspective view schematically showing the membrane-membrane reinforcing member assembly in the MEA shown in FIG. 31 when viewed obliquely from below.

FIG. 34 is a perspective view schematically showing the first membrane reinforcing member 10a in the MEA 5 shown in FIG. 31 when viewed obliquely from above. FIG. 35 is a perspective view schematically showing the membrane-membrane reinforcing member assembly 20 in the MEA 5 shown in FIG. 31 when viewed obliquely from above. FIG. 36 is a perspective view schematically showing the membrane-membrane reinforcing member assembly 20 in the MEA 5 shown in FIG. 31 when viewed obliquely from below. In FIG. 35, a vertical direction of the membrane-membrane reinforcing member assembly 20 is shown as a vertical direction of the drawing. In FIG. 36, the vertical direction of the membrane-membrane reinforcing member assembly 20 in FIG. 35 is shown.

First, the shapes of the first membrane reinforcing member 10a and the second membrane reinforcing member 10b will be explained. In the present embodiment, the first membrane reinforcing member 10a and the second membrane reinforcing member 10b are formed to have the same shape.

As shown in FIG. 34, each of the first membrane reinforcing member 10a and the second membrane reinforcing member 10b is formed to have a band shape, and both end portions of each of the first membrane reinforcing member 10a and the second membrane reinforcing member 10b are cut to form cutout portions 17 each having a predetermined depth from one main surface F30 and extending from each end to have a predetermined length. A remaining portion other than the cutout portion 17 formed at each end portion is a lap portion 18.

As shown in FIG. 35, the first membrane reinforcing members 10a and the second membrane reinforcing members 10b are disposed on the polymer electrolyte membrane 1 such that the main surface F30 on which the cutout portions 17 are formed contacts the main surface F10 or F20 of the polymer electrolyte membrane 1. Specifically, each of the membrane-like first membrane reinforcing members 10a is disposed on the lower level surface F13 of the first main surface F10 of the polymer electrolyte membrane 1 and the middle level surfaces F12 formed at both ends of the lower level surface F13 so as to extend over the entire length of a side S1. In this case, the first membrane reinforcing member 10a is disposed such that the lap portions 18 contact the middle level surfaces F12, respectively, and the lower level surface F13 of the polymer electrolyte membrane 1.

Moreover, as shown in FIG. 36, each of the membrane-like second membrane reinforcing members 10b is disposed on the upper level surface F21 and the middle level surfaces F22 of the second main surface F20 so as to extend over the entire length of a side S2 of the second main surface F20. In this case, the second membrane reinforcing member 10b is disposed such that the lap portions 18 contact the middle level surfaces F22, respectively, and the upper level surface F21 of the polymer electrolyte membrane 1.

As above, the first membrane reinforcing members 10a and the second membrane reinforcing members 10b are disposed to extend along four sides, respectively, of the polymer electrolyte membrane 1 and surround the entire peripheral portion of the polymer electrolyte membrane 1 as a whole. Moreover, the lap portions 18 of the first membrane reinforcing members 10a and the second membrane reinforcing members 10b are disposed to sandwich the polymer electrolyte membrane 1 at four corners of the polymer electrolyte membrane 1 and be joined to each other in a lap joint (that is, the polymer electrolyte membrane 1 is interposed between the lap portions 18, and the lap portions 18 fit each other). In the present invention, "being joined to each other in a lap joint" means that the lap portions of two membrane reinforcing members overlap each other to sandwich the polymer electrolyte membrane. As a result, the lap portion of one membrane reinforcing member fits in the cutout portion of the other membrane reinforcing member such that the polymer electrolyte is interposed between those membrane reinforcing members.

In this case, to be precise, at least the upper level surface F11 of the first main surface F10 of the polymer electrolyte membrane 1, which overlaps the main surface F30 of the second membrane reinforcing member 10b other than lap portion 18, is flush with a main surface F40 of the first membrane reinforcing member 10a which surface is opposite to the surface contacting the polymer electrolyte membrane 1. Similarly, at least the lower level surface F23 of the second main surface F20 of the polymer electrolyte membrane 1, which overlaps the main surface F30 of the first membrane reinforcing member 10a other than the lap portion 18, is flush with the main surface F40 of the second membrane reinforcing member 10b which surface is opposite to the surface contacting the polymer electrolyte membrane 1.

Here, being flush with each other denotes being located on a substantially same flat plane. That is, at least, the upper level surface F11 of the polymer electrolyte membrane 1 and the main surface F40 of the first membrane reinforcing member 10a may be substantially the same in height, and the gap may be formed between the upper level surface F11 of the polymer electrolyte membrane 1 and the main surface F40 of the first membrane reinforcing member 10a. Similarly, at least, the lower level surface F23 of the polymer electrolyte membrane 1 and the main surface F40 of the second membrane reinforcing member 10b may be substantially the same in height, and the gap may be formed between the lower level surface F23 of the polymer electrolyte membrane 1 and the main surface F40 of the second membrane reinforcing member 10b.

The thickness and width of each of the first membrane reinforcing member 10a and the second membrane reinforcing member 10b are not especially limited as long as the effects of the present invention can be obtained. However, to surely obtain the effects of the present invention, it is preferable that the thickness and width of the first membrane reinforcing member 10a and the thickness and width of the second membrane reinforcing member 10b be the same as each other. Moreover, from the same viewpoint as above, it is preferable that the height of each of the cutout portions 17 of the first membrane reinforcing member 10a and the second membrane reinforcing member 10b be substantially the same as the thickness of the polymer electrolyte membrane 1, it is preferable that a longitudinal-direction length of the cutout portion 17 be longer than the width of each of the first membrane reinforcing member 10a and the second membrane reinforcing member 10b, and it is more preferable that the longitudinal-direction length of the cutout portion 17 be slightly longer than the total of the width of the first membrane reinforcing member 10a or the second membrane reinforcing member 10b and the thickness of the polymer electrolyte membrane 1.

Next, the membrane-catalyst layer assembly 30 will be explained.

Figure 37:
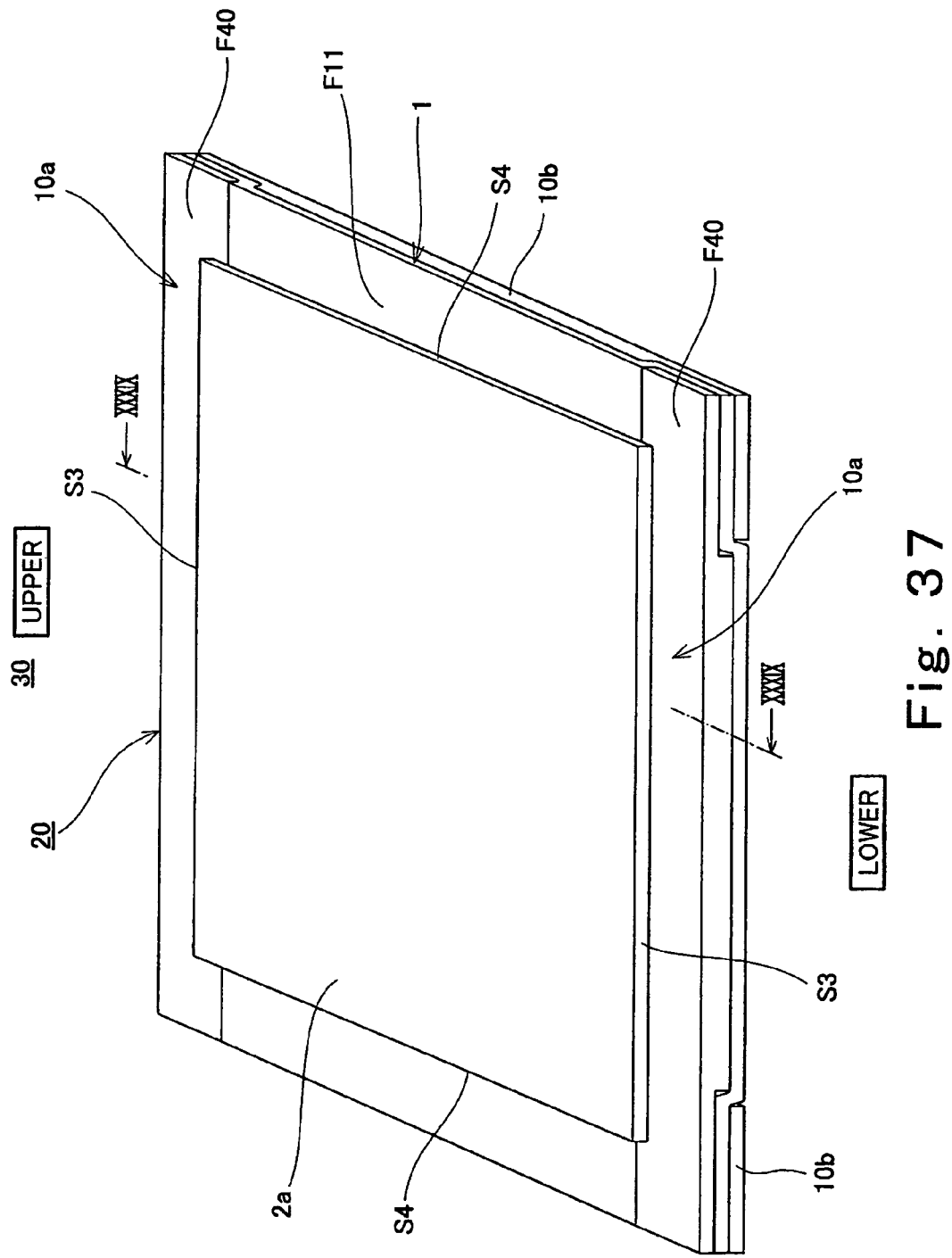
FIG. 37 is a perspective view schematically showing the membrane-catalyst layer assembly in the MEA shown in FIG. 31 when viewed obliquely from above.
Figure 38:
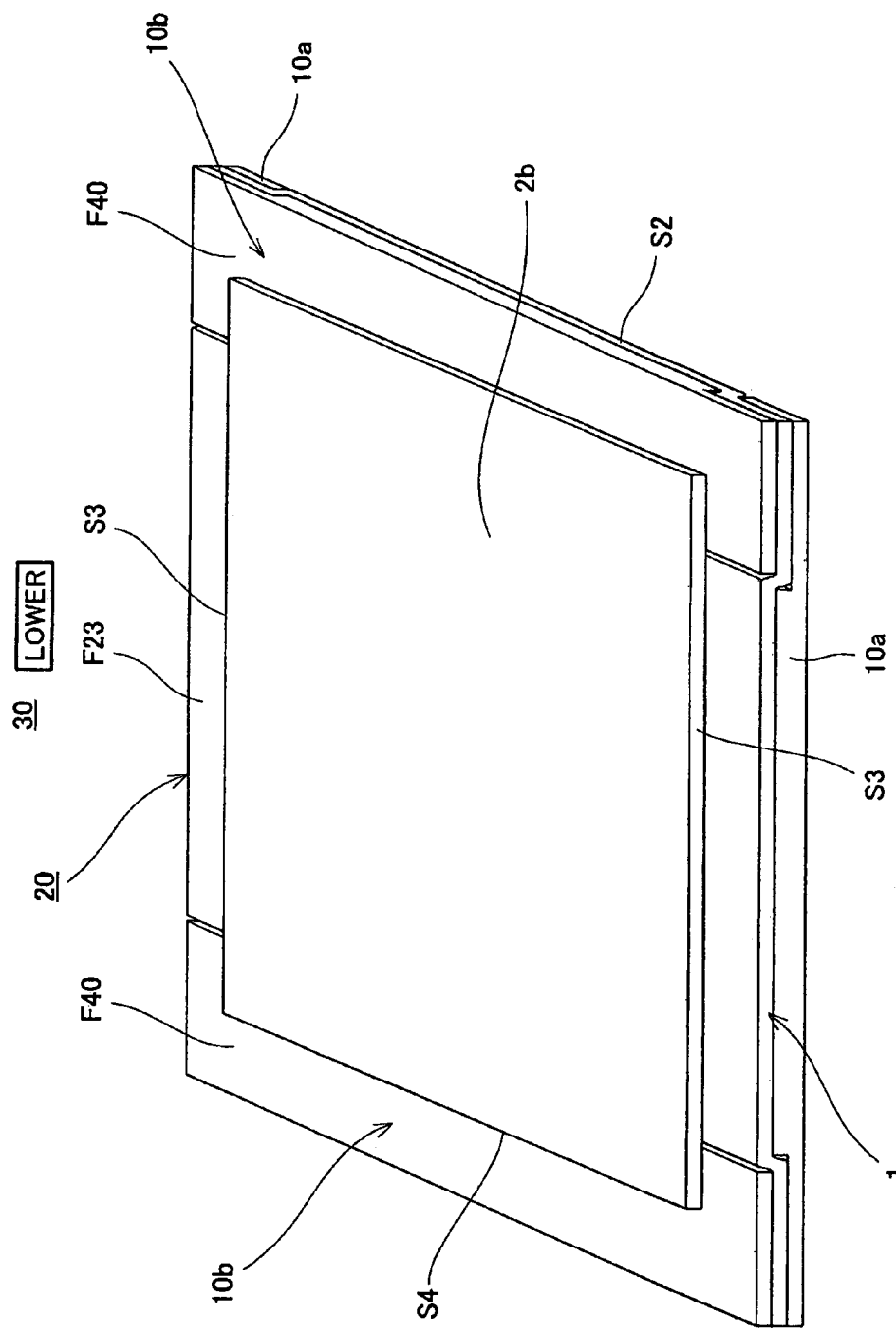
FIG. 38 is a schematic diagram schematically showing the membrane-catalyst layer assembly in the MEA shown in FIG. 31 when viewed obliquely from below.
Figure 39:
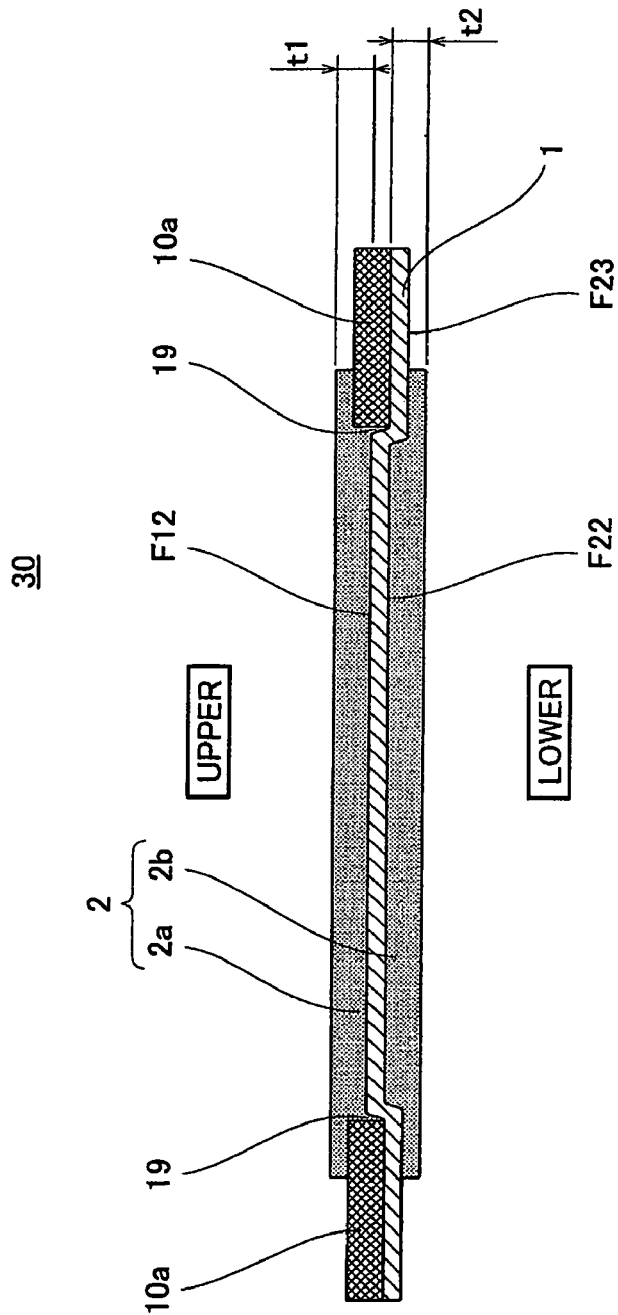
FIG. 39 is a cross-sectional view taken along line XXXIX-XXXIX of the membrane-catalyst layer assembly shown in FIG. 37.

FIG. 37 is a perspective view schematically showing the membrane-catalyst layer assembly 30 in the MEA 5 shown in FIG. 31 when viewed obliquely from above. FIG. 38 is a schematic diagram schematically showing the membrane-catalyst layer assembly 30 in the MEA 5 shown in FIG. 31 when viewed obliquely from below. FIG. 39 is a cross-sectional view taken along line XXXIX-XXXIX of the membrane-catalyst layer assembly 30 shown in FIG. 37. In FIGS. 37 and 39, a vertical direction of the membrane-catalyst layer assembly 30 is shown as a vertical direction of the drawing. In FIG. 38, the vertical direction of the membrane-catalyst layer assembly 30 in FIG. 37 is shown.

As shown in FIGS. 37 to 39, the membrane-catalyst layer assembly 30 includes the membrane-membrane reinforcing member assembly 20 and the catalyst layer 2 (the anode catalyst layer 2a and the cathode catalyst layer 2b).

As shown in FIGS. 37 and 39, the anode catalyst layer 2a is formed to cover a part of each of the upper level surfaces F11, where the first membrane reinforcing members 10a are not disposed, of the first main surface F10 of the polymer electrolyte membrane 1 and a part of each of the main surfaces of the first membrane reinforcing members 10a so as to fill a concave portion 91 (see FIG. 35) formed by the middle level surface F12 and the upper level surfaces F11 of the first main surface F10 of the polymer electrolyte membrane 1 and the first membrane reinforcing members 10a, and gaps 19 between the step portion 12 of the polymer electrolyte membrane 1 and the first membrane reinforcing member 10a.

Meanwhile, as shown in FIGS. 38 and 39, the cathode catalyst layer 2b is formed to cover a part of each of the lower level surfaces F23, where the second membrane reinforcing members 10b are not disposed, of the second main surface F20 of the polymer electrolyte membrane 1 and a part of each of the main surfaces of the second membrane reinforcing members 10b so as to fill a concave portion 90 (see FIG. 36) formed by the middle level surface F22 and the lower level surfaces F23 of the second main surface F20 of the polymer electrolyte membrane 1 and the second membrane reinforcing members 10b.

Then, as shown in FIGS. 37 to 39, herein, the anode catalyst layer 2a and the cathode catalyst layer 2b are formed to have the same rectangular shape as the polymer electrolyte membrane 1, and are disposed such that peripheral portions thereof overlap the first membrane reinforcing members 10a and the second membrane reinforcing members 10b over the entire periphery when viewed from a thickness direction of the polymer electrolyte membrane 1. Moreover, as shown in FIG. 39, herein, the thickness (difference in height between the middle level surface F12 of the first main surface F10 of the polymer electrolyte membrane 1 and the main surface of the anode catalyst layer 2a) t1 of the anode catalyst layer 2a is substantially the same as the thickness (difference in height between the middle level surface F22 of the second main surface F20 of the polymer electrolyte membrane 1 and the main surface of the cathode catalyst layer 2b) t2 of the cathode catalyst layer 2b.

Herein, as shown in FIG. 39, the anode catalyst layer 2a is formed such that the thickness between the main surface of the anode catalyst layer 2a and the middle level surface F12 and the thickness between the main surface of the anode catalyst layer 2a and the main surface of the first membrane reinforcing member 10a are different from each other. However, the present embodiment is not limited to this, and the anode catalyst layer 2a may be formed to have a uniform thickness as a whole (in FIG. 39, the anode catalyst layer 2a may be formed such that the thickness between the main surface of the anode catalyst layer 2a and the middle level surface F12 and the thickness between the main surface of the anode catalyst layer 2a and the main surface of the first membrane reinforcing member 10a are the same as each other). Similarly, the cathode catalyst layer 2b is formed such that the thickness between the main surface of the cathode catalyst layer 2b and the middle level surface F22 and the thickness between the main surface of the cathode catalyst layer 2b and the lower level surface F23 are different from each other. However, the present embodiment is not limited to this, and the cathode catalyst layer 2b may be formed to have a uniform thickness as a whole (in FIG. 39, the cathode catalyst layer 2b may be formed such that the thickness between the main surface of the cathode catalyst layer 2b and the middle level surface F22 and the thickness between the main surface of the cathode catalyst layer 2b and the lower level surface F23 are the same as each other). In this case, a center portion of the main surface of each of the anode catalyst layer 2a and the cathode catalyst layer 2b is concave with respect to the peripheral portion of each of the anode catalyst layer 2a and the cathode catalyst layer 2b. However, this concave at the center portion can be filled with the below-described gas diffusion layer 3.

Moreover, in FIG. 39, the thickness t1 of the anode catalyst layer 2a and the thickness t2 of the cathode catalyst layer 2b are substantially the same as each other. However, the thickness t1 of the anode catalyst layer 2a and the thickness t2 of the cathode catalyst layer 2b may be different from each other.

With this, a pair of opposed sides S3 of four sides of the main surface of the anode catalyst layer 2a contact the first membrane reinforcing members 10a, respectively, but do not directly contact the main surface F10 of the polymer electrolyte membrane 1. Therefore, the polymer electrolyte membrane 1 is not damaged (see FIG. 37). Similarly, a pair of opposed sides S4 of four sides of the main surface of the cathode catalyst layer 2b contact the second membrane reinforcing members 10b, respectively, but do not directly contact the main surface F20 of the polymer electrolyte membrane 1. Therefore, the polymer electrolyte membrane 1 is not damaged (see FIG. 38).

In contrast, the opposed sides S4 of the main surface of the anode catalyst layer 2a directly contact the main surface F10 (to be precise, the upper level surface F11) of the polymer electrolyte membrane 1. Therefore, the polymer electrolyte membrane 1 may be damaged at these contacting portions. However, even in this case, since the second membrane reinforcing members 10b are disposed at these contacting portions on the main surface F20 of the polymer electrolyte membrane 1, the cross leakage of the reactant gas does not occur. Similarly, the opposed sides S3 of the main surface of the cathode catalyst layer 2b directly contact the main surface F20 (to be precise, the lower level surface F23) of the polymer electrolyte membrane 1. Therefore, the polymer electrolyte membrane 1 may be damaged at these contacting portions. Even in this case, since the first membrane reinforcing members 10a are disposed at these contacting portions on the main surface F10 of the polymer electrolyte membrane 1, the cross leakage of the reactant gas does not occur.

Next, a method for manufacturing the MEA 5 in the cell of the PEFC according to Embodiment 5 will be explained.

Basically, the MEA 5 in the cell of the PEFC according to Embodiment 5 is manufactured by the same manufacturing method as the MEA 5 of the PEFC according to Embodiment 3. However, the bonding step P1 and the second step P12 are different as below.

Figure 40:
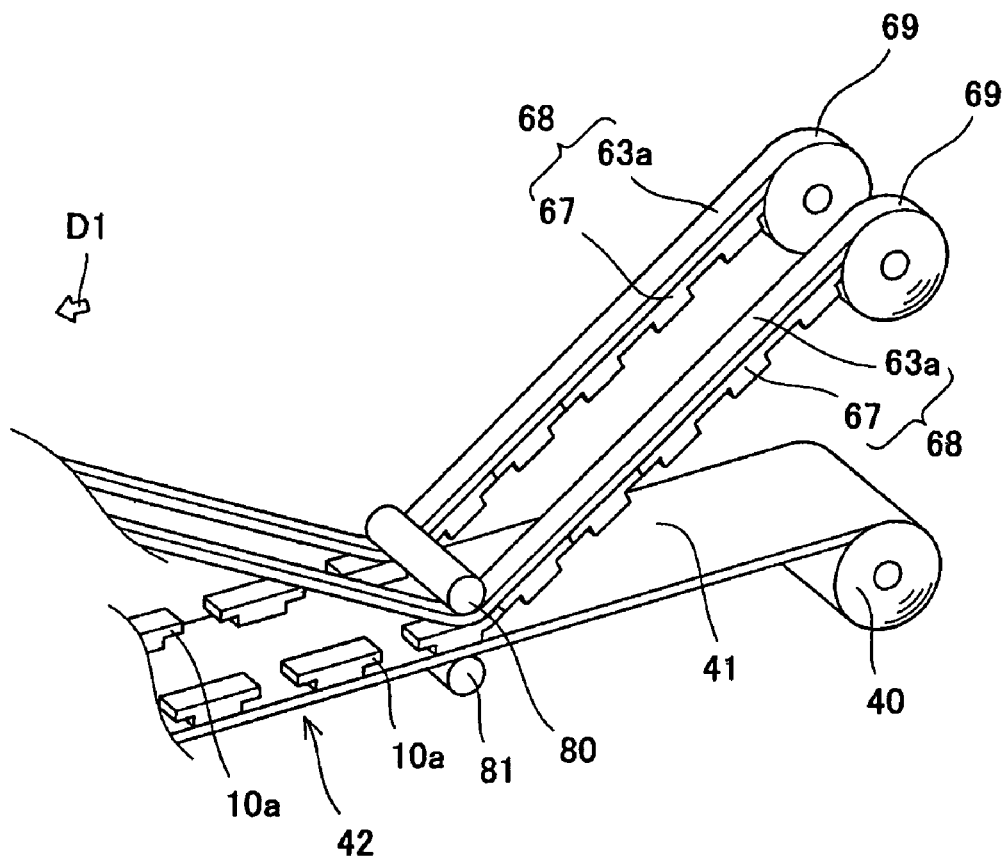
FIG. 40 is a schematic diagram for explaining the bonding step in the step of manufacturing the membrane-catalyst layer assembly in the cell of the PEFC according to Embodiment 5.

FIG. 40 is a schematic diagram for explaining the bonding step P1 in the step of manufacturing the membrane-catalyst layer assembly 30 in the cell of the PEFC according to Embodiment 5.

As shown in FIG. 40, a membrane reinforcing member roll 69 is used in the bonding step P1 of Embodiment 5 instead of the membrane reinforcing member roll 60.

Here, a method for manufacturing the membrane reinforcing member roll 69 will be explained.

Figure 41:
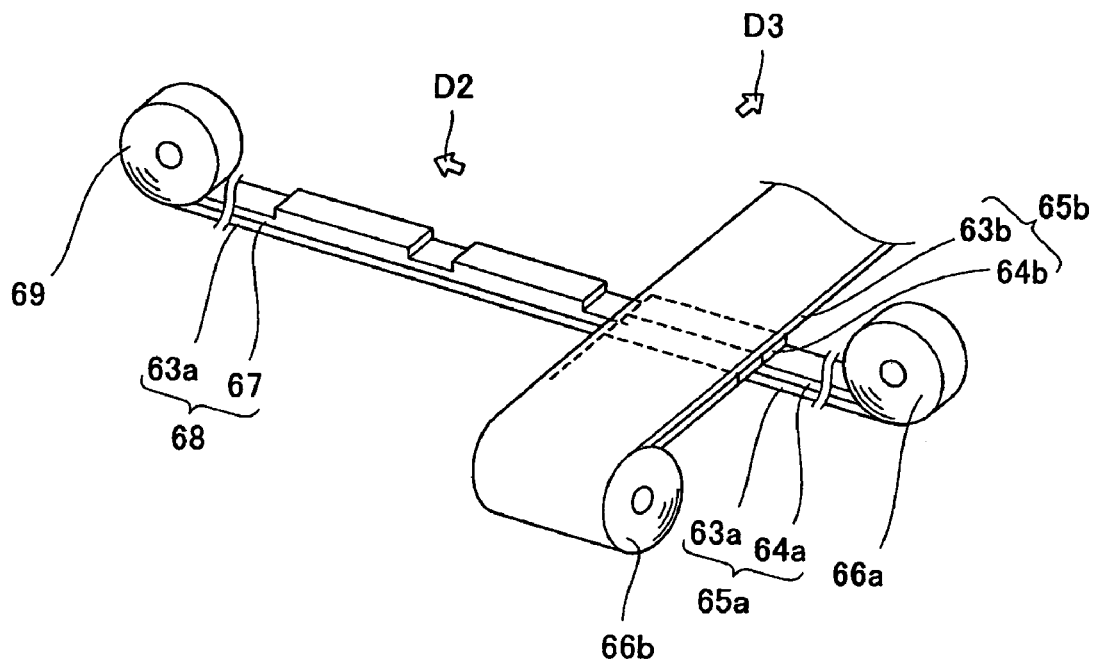
FIG. 41 is a schematic diagram schematically showing the treatment area of manufacturing a membrane reinforcing member roll, and the manufacturing line for the membrane reinforcing member roll.

FIG. 41 is a schematic diagram schematically showing the treatment area of manufacturing the membrane reinforcing member roll 69, and the manufacturing line for the membrane reinforcing member roll 69. In FIG. 41, a part of each of the treatment area and the manufacturing line is omitted.

First, the configuration of the treatment area will be explained.

As shown in FIG. 41, a base material-membrane reinforcing member roll 66a, a base material-membrane reinforcing member roll 66b, a cutter, not shown, and a pressing means, not shown, are disposed in the treatment area. The base material-membrane reinforcing member roll 66a is formed by rolling a base material-membrane reinforcing member stack body 65a in which a membrane reinforcing member tape 64a is stacked on a base material tape 63a, and the base material-membrane reinforcing member roll 66b is formed by rolling a base material-membrane reinforcing member stack body 65b in which a membrane reinforcing member tape 64b is stacked on a base material tape 63b.

Specifically, the base material-membrane reinforcing member roll 66a and the base material-membrane reinforcing member roll 66b are disposed such that the proceeding direction D2 of the base material-membrane reinforcing member stack body 65a pulled out from the base material-membrane reinforcing member roll 66a and a proceeding direction D3 of the base material-membrane reinforcing member stack body 65b pulled out from the base material-membrane reinforcing member 66b are substantially perpendicular to each other. A width-direction length of the base material-membrane reinforcing member roll 66a is the same as a width-direction length of the first membrane reinforcing member 10a, and a width-direction length of the base material-membrane reinforcing member roll 66b is the same as a longitudinal-direction length t3 of the main surface F30 of the first membrane reinforcing member 10a (see FIG. 39).

Next, a method for manufacturing the reinforced member roll 69 will be explained.

The base material-membrane reinforcing member stack body 65a is pulled out from the base material-membrane reinforcing member roll 66a in the proceeding direction D2, and the base material-membrane reinforcing member stack body 65b is pulled out from the base material-membrane reinforcing member roll 66b in the proceeding direction D3. Then, the base material-membrane reinforcing member stack bodies 65a and 65b stop once. Next, only the membrane reinforcing member tape 64b of the base material-membrane reinforcing member stack body 65b is cut by the cutter, not shown, such that each piece has a predetermined length (length corresponding to the width of the first membrane reinforcing member 10a) from an end portion of the membrane reinforcing member tape 64b of the base material-membrane reinforcing member stack body 65b. At this time, the depth of cut by the cutter is adjusted to be the same as the thickness of the membrane reinforcing member tape 64b, so that the base material tape 63b of the base material-membrane reinforcing member stack body 65b is not cut. The base material tape 63b has an adequate mechanical strength (hardness, bendability) so as not to be cut by the cutter.

Next, the base material-membrane reinforcing member stack body 65b is further pulled out in the proceeding direction D3, and stop once. Then, the membrane reinforcing member tape 64a of the base material-membrane reinforcing member stack body 65a and the membrane reinforcing member tape 64b of the base material-membrane reinforcing member stack body 65b are fixed to each other by a pressing means, not shown.

Next, the base material tape 63b is removed from the base material-membrane reinforcing member stack body 65b by a suitable means, and only the membrane reinforcing member tape 64b is fixed to the main surface of the membrane reinforcing member tape 64a of the base material-membrane reinforcing member stack body 65a. Thus, a membrane reinforcing member assembly 67 is formed. The membrane reinforcing member assembly 67 formed as above moves with the base material tape 63a in the proceeding direction D2 (the membrane reinforcing member assembly 67 and the base material tape 63a are referred to as "base material-membrane reinforcing member assembly tape 68"). With this, the membrane reinforcing member tapes 64b are fixed on the base material-membrane reinforcing member assembly tape 68 at predetermined intervals in a longitudinal direction of the base material-membrane reinforcing member assembly tape 68. Then, the base material-membrane reinforcing member assembly tape 68 is rolled. Thus, a membrane reinforcing member roll 69 is formed.

Before carrying out the pressure treatment by the pressing means, not shown, a pretreatment of applying an adhesive to the surface (contact surface) of the membrane reinforcing member tape 64b may be carried out. In this case, the pressure treatment of the membrane reinforcing member tape 64b may be carried out by the pressing means as above, or the pressure treatment may be carried out after heating the membrane reinforcing member tape 64b. Moreover, it is preferable that the adhesive does not deteriorate the battery characteristics. For example, it may be possible to use a dispersion medium or a solvent containing a polymer electrolyte material (shown above as the constituent material of the polymer electrolyte membrane 1 for example) that is the same type or different type (having an affinity so as to be able to be adequately integrated with the polymer electrolyte membrane sheet 41) from the polymer electrolyte membrane sheet 41.

Next, the configuration of the bonding step P1 will be explained.

As shown in FIG. 40, the polymer electrolyte membrane roll 40, the membrane reinforcing member rolls 69 manufactured as above, and a cutter, not shown, are disposed in the area of the first step P1. The polymer electrolyte membrane roll 40 and the membrane reinforcing member rolls 69 are positioned such that a pair of base material-membrane reinforcing member assembly tapes 68 are disposed on both side end portions, respectively, of the polymer electrolyte membrane sheet 41.

Next, the treatment of the bonding step P1 will be explained.

As shown in FIG. 40, the polymer electrolyte membrane sheet 41 is pulled out from the polymer electrolyte membrane roll 40, and the base material-membrane reinforcing member assembly tapes 68 are pulled out from the membrane reinforcing member rolls 69.

Next, the membrane reinforcing member assembly 67 is cut by the cutter, not shown, such that each piece has a predetermined length (herein, length corresponding to the first membrane reinforcing member 10a) from an end portion of the membrane reinforcing member assembly 67 of the base material-membrane reinforcing member assembly tape 68. At this time, the depth of cut by the cutter is adjusted to be the same as the thickness of the membrane reinforcing member assembly 67, so that the base material tape 63a of the base material-membrane reinforcing member assembly tape 68 is not cut.

Next, the base material-membrane reinforcing member assembly tapes 68 are introduced into a thermocompression bonding device (not shown) including a pair of rollers 80 and 81. While the polymer electrolyte membrane sheet 41 and the base material-membrane reinforcing member assembly tapes 68 proceed between the preheated rollers 80 and 81 in the proceeding direction D1 in the thermocompression bonding device, they are joined to each other.

Next, the base material tape 63a is removed from the base material-membrane reinforcing member assembly tape 68 by a suitable means, and only the membrane reinforcing member assembly 67 (first membrane reinforcing member 10a) is fixed to the polymer electrolyte membrane sheet 41. Thus, the membrane-membrane reinforcing member stack body 42 is formed. The membrane-membrane reinforcing member stack body 42 formed as above moves in the proceeding direction D1. With this, the first membrane reinforcing members 10a are formed on the membrane-membrane reinforcing member stack body 42 at predetermined intervals in a longitudinal direction of the membrane-membrane reinforcing member stack body 42. Then, the membrane-membrane reinforcing member stack body 42 formed as above proceeds to the area of the second step P12.

Before causing the base material-membrane reinforcing member assembly tapes 68 to contact the polymer electrolyte membrane sheet 41, a pretreatment of applying an adhesive to the surfaces (contact surfaces) of the base material-membrane reinforcing member assembly tapes 68 may be carried out. In this case, the pressure treatment may be carried out after the rollers 80 and 81 are preheated as above, or only the pressure treatment may be carried out without preheating the rollers 80 and 81.

Next, the second step P12 will be explained.

Figure 42:
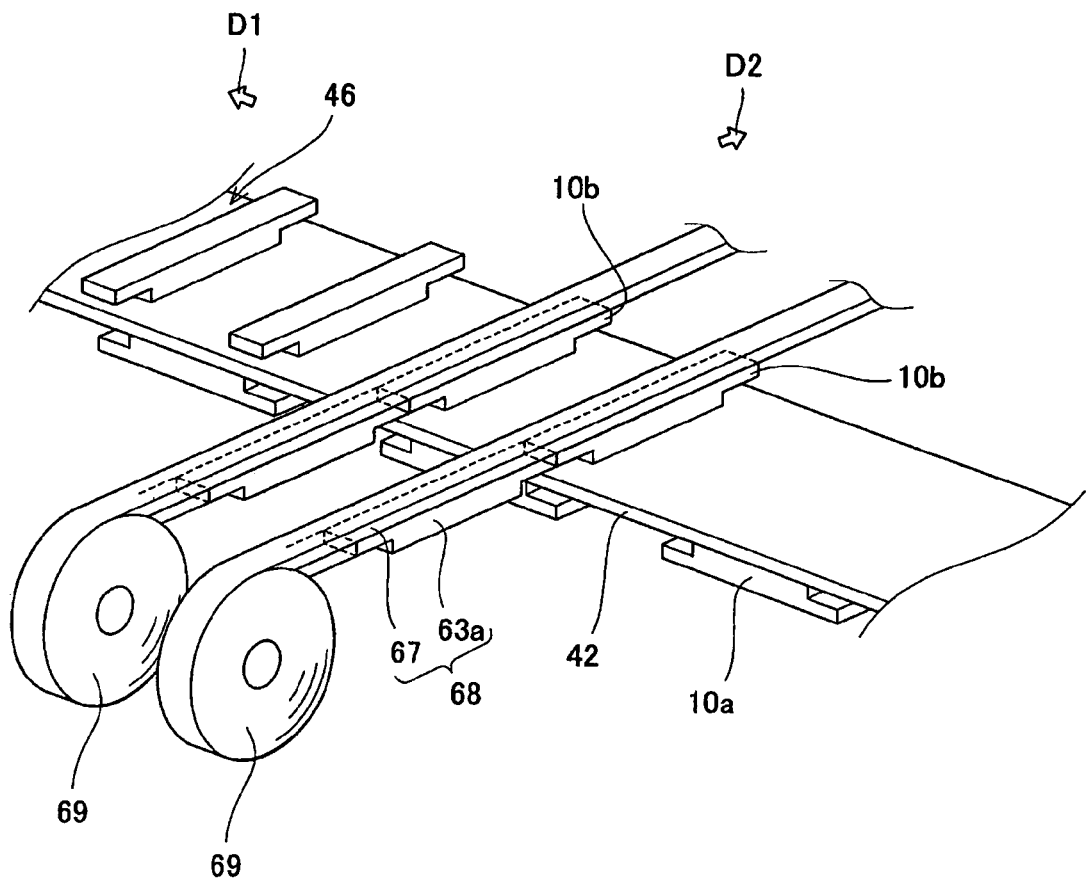
FIG. 42 is a schematic diagram for explaining the second step of the step of manufacturing the membrane-catalyst layer assembly in the cell of the PEFC according to Embodiment 5.

FIG. 42 is a schematic diagram for explaining the second step P12 of the step of manufacturing the membrane-catalyst layer assembly 30 in the cell of the PEFC according to Embodiment 5.

As shown in FIG. 42, the second step P2 of Embodiment 5 is different from the second step P2 of Embodiment 3 in that the membrane reinforcing member roll 69 is used instead of the base material-membrane reinforcing member roll 77. Since the other configurations and treatments of Embodiment 5 are the same as those of Embodiment 3, detailed explanations thereof are omitted.

The PEFC according to Embodiment 5 configured as above has the same operational advantages as the PEFC according to Embodiment 1.

The foregoing has explained the embodiments of the present invention in detail. However, the present invention is not limited to these embodiments.

For example, the above embodiments of the present invention have explained a case where outer peripheral portions (edges) of the first membrane reinforcing member and the second membrane reinforcing member correspond to a peripheral portion (edge) of the polymer electrolyte membrane (case where when viewed from a substantially normal direction of the main surface of the polymer electrolyte membrane, the outer edges of the first membrane reinforcing member and the second membrane reinforcing member overlap the edge of the polymer electrolyte membrane, and the edge of the polymer electrolyte membrane cannot be seen because it is not protruding). However, the present invention is not limited to this. As long as the effects of the present invention can be obtained, the edge of the first membrane reinforcing member and/or the edge of the second membrane reinforcing member may entirely or partially protrude from the edge of the polymer electrolyte membrane, or the edge of the polymer electrolyte membrane may entirely or partially protrude from the edge of the first membrane reinforcing member and/or the edge of the second membrane reinforcing member.

Moreover, the polymer electrolyte membrane 1 may have a substantially square shape. For example, each of four interior angles of the polymer electrolyte membrane 1 does not have to be 90 degrees. Four sides of the polymer electrolyte membrane 1 may be bent to some extent. Four corners of the polymer electrolyte membrane 1 may be chamfered.

From the foregoing explanation, many modifications and other embodiments of the present invention are obvious to one skilled in the art. Therefore, the foregoing explanation should be interpreted only as an example, and is provided for the purpose of teaching the best mode for carrying out the present invention to one skilled in the art. The structures and/or functional details may be substantially modified within the spirit of the present invention.

INDUSTRIAL APPLICABILITY

The membrane-membrane reinforcing member assembly, the membrane-catalyst layer assembly, and the membrane-electrode assembly according to the present invention are useful as parts of the polymer electrolyte fuel cell which can be mass produced.

The polymer electrolyte fuel cell of the present invention is expected to be preferably used as a main power supply or an auxiliary power supply of, for example, movable bodies, such as a car, and distributed (on-site) power generating systems (domestic cogeneration systems).

The invention claimed is:

1. A membrane-membrane reinforcing member assembly comprising:
    a polymer electrolyte membrane having a substantially square shape;
    a pair of first membrane reinforcing members disposed on one main surface of the polymer electrolyte membrane so as to extend along a pair of opposed sides, respectively, of four sides of said one main surface; and
    a pair of second membrane reinforcing members disposed on another main surface of the polymer electrolyte membrane so as to extend along a pair of opposed sides, respectively, of four sides of said another main surface, wherein:
    portions of the polymer electrolyte membrane at which portions the first membrane reinforcing members and the second membrane reinforcing members are disposed are concave;
    the first membrane reinforcing members and the second membrane reinforcing members are disposed such that main surfaces thereof are exposed, and the first membrane reinforcing members and the second membrane reinforcing members surround a peripheral portion of the polymer electrolyte membrane as a whole;
    the first membrane reinforcing members are disposed on the polymer electrolyte membrane such that exposed main surfaces thereof are located on a substantially same flat plane as said one main surface of the polymer electrolyte membrane; and
    the second membrane reinforcing members are disposed on the polymer electrolyte membrane such that exposed main surfaces thereof are located on a substantially same flat plane as said another main surface of the polymer electrolyte membrane.

2. The membrane-membrane reinforcing member assembly according to claim 1, wherein the first membrane reinforcing members and the second membrane reinforcing members are disposed to sandwich four corner portions of the polymer electrolyte membrane.

3. The membrane-membrane reinforcing member assembly according to claim 1, wherein:
the first membrane reinforcing members and the second membrane reinforcing members are disposed on the peripheral portion of the polymer electrolyte membrane so as not to overlap each other when viewed from a thickness direction of the polymer electrolyte membrane as a whole; and
the polymer electrolyte membrane is bent in a step shape such that the exposed main surfaces of the first membrane reinforcing members and a portion of said one main surface of the polymer electrolyte membrane which portion is located between the first membrane reinforcing members are located on a substantially same flat plane.

4. The membrane-membrane reinforcing member assembly according to claim 3, wherein the first membrane reinforcing members are disposed to extend along the pair of opposed sides, respectively, over entire lengths of the pair of opposed sides.

5. The membrane-membrane reinforcing member assembly according to claim 4, wherein the second membrane reinforcing members are disposed such that both ends of each of the second membrane reinforcing members contact step portions, respectively, of the polymer electrolyte membrane.

6. The membrane-membrane reinforcing member assembly according to claim 5, wherein each of the second membrane reinforcing members has such a thickness that the main surface of the second membrane reinforcing member which surface is opposite to a main surface contacting the polymer electrolyte membrane and portions of said another main surface of the polymer electrolyte membrane which portions are located outside both ends of the second membrane reinforcing member are located on a substantially same flat plane.

7. The membrane-membrane reinforcing member assembly according to claim 1, wherein:
lap portions are formed at both end portions, respectively, of each of the first membrane reinforcing members and the second membrane reinforcing members; and
the lap portions of the first membrane reinforcing members and the lap portions of the second membrane reinforcing members are joined to each other in a lap joint so as to sandwich four corner portions of the polymer electrolyte membrane.

8. The membrane-membrane reinforcing member assembly according to claim 7, wherein the lap portions of the first membrane reinforcing members and the lap portions of the second membrane reinforcing members are joined to each other in the lap joint by causing the polymer electrolyte membrane to be bent in a step shape such that the main surfaces of the first membrane reinforcing members which surfaces are opposite to main surfaces contacting the polymer electrolyte membrane and at least a portion of said one main surface of the polymer electrolyte membrane which portion overlaps portions of the second membrane reinforcing members other than the lap portions of the second membrane reinforcing members are located on a substantially same flat plane.

9. The membrane-membrane reinforcing member assembly according to claim 7, wherein:
the first membrane reinforcing members are disposed to extend along the pair of opposed sides, respectively, over entire lengths of the pair of opposed sides; and
the second membrane reinforcing members are disposed to extend along the pair of opposed sides, respectively, over entire lengths of the pair of opposed sides.

10. The membrane-membrane reinforcing member assembly according to claim 7, wherein the lap portions of the first membrane reinforcing members and the lap portions of the second membrane reinforcing members are joined to each other in the lap joint by causing the polymer electrolyte membrane to be bent in a step shape such that the main surfaces of the second membrane reinforcing members which surfaces are opposite to main surfaces contacting the polymer electrolyte membrane and at least a portion of said another main surface of the polymer electrolyte membrane which portion overlaps portions of the first membrane reinforcing members other than the lap portions of the first membrane reinforcing members are located on a substantially same flat plane.

11. The membrane-membrane reinforcing member assembly according to claim 1, wherein the polymer electrolyte membrane includes an inner reinforcing membrane having therein a through hole that serves as an ion conduction path.

12. A membrane-catalyst layer assembly comprising:
the membrane-membrane reinforcing member assembly according to claim 1;
a first catalyst layer disposed to cover said one main surface of the polymer electrolyte membrane; and
a second catalyst layer disposed to cover said another main surface of the polymer electrolyte membrane, wherein:
the first catalyst layer is disposed to cover a part of each of the exposed main surfaces of the first membrane reinforcing members and a portion of said one main surface of the polymer electrolyte membrane which portion is located between the first membrane reinforcing members; and
the second catalyst layer is disposed to cover a part of each of the exposed main surfaces of the second membrane reinforcing members and a portion of said another main surface of the polymer electrolyte membrane which portion is located between the second membrane reinforcing members.

13. The membrane-catalyst layer assembly according to claim 8, wherein a first catalyst layer and a second catalyst layer are disposed such that peripheral portions thereof overlap the first membrane reinforcing members and the second membrane reinforcing members over entire peripheries of the first catalyst layer and the second catalyst layer when viewed from a thickness direction of the polymer electrolyte membrane.

14. A membrane-electrode assembly comprising:
the membrane-catalyst layer assembly according to claim 8;
a first gas diffusion layer disposed to cover the first catalyst layer of the membrane-catalyst layer assembly; and
a second gas diffusion layer disposed to cover the second catalyst layer of the membrane-catalyst layer assembly.

15. A polymer electrolyte fuel cell comprising the membrane-electrode assembly according to claim 14.

* * * * *